United States Patent
Moroto et al.

[19]

[11] Patent Number: 5,876,300
[45] Date of Patent: Mar. 2, 1999

[54] VEHICULAR AUTOMATIC TRANSMISSION

[75] Inventors: Shuzo Moroto; Takao Taniguchi; Shoichi Miyagawa; Kazumasa Tsukamoto; Masahiro Hayabuchi; Masaaki Nishida; Satoru Kasuya; Takashi Morimoto; Minoru Todo, all of Anjo, Japan

[73] Assignee: Aisin AW Co., Ltd., Japan

[21] Appl. No.: 873,014

[22] Filed: Jun. 11, 1997

Related U.S. Application Data

[63] Continuation-in-part of Ser. No. 621,032, Mar. 22, 1996, abandoned.

[30] Foreign Application Priority Data

Mar. 24, 1995 [JP] Japan .................................... 7-90145
Sep. 25, 1995 [JP] Japan .................................... 7-269040

[51] Int. Cl.⁶ .................................................. F16H 3/66
[52] U.S. Cl. ........................ 475/275; 475/284; 475/288
[58] Field of Search .................................... 475/269, 275, 475/281, 284, 286, 287, 288

[56] References Cited

U.S. PATENT DOCUMENTS

| | | | |
|---|---|---|---|
| 3,251,247 | 5/1966 | Lamburn . | |
| 3,722,300 | 3/1973 | Crooks | 475/276 X |
| 5,213,552 | 5/1993 | Ito | 475/278 X |
| 5,234,090 | 8/1993 | Haka | 192/70.25 |
| 5,334,117 | 8/1994 | Ito | 475/276 |
| 5,334,177 | 8/1994 | Cohen | 604/378 |
| 5,683,325 | 11/1997 | Moroto et al. | 475/276 |
| 5,700,223 | 12/1997 | Park et al. | 475/269 |
| 5,743,824 | 4/1998 | Park | 475/276 |
| 5,769,749 | 6/1998 | Funahashi et al. | 475/276 |

FOREIGN PATENT DOCUMENTS

| | | |
|---|---|---|
| 733827 | 8/1996 | European Pat. Off. . |
| 733834 | 8/1996 | European Pat. Off. . |
| 62-52249 | 3/1987 | Japan . |
| 2248721 | 10/1990 | Japan . |
| 2290731 | 11/1990 | Japan . |
| 4285331 | 10/1992 | Japan . |
| 6241287 | 8/1994 | Japan . |

OTHER PUBLICATIONS

Patent Abstracts of Japan, vol. 13, No. 289, 1989 & JP 1–83927A.

*Primary Examiner*—Khol Q. Ta
*Attorney, Agent, or Firm*—Lorusso & Loud

[57] ABSTRACT

A vehicular automatic transmission for establishing a plurality of forward gear stages, includes: a transmission case; an input shaft; a transmission mechanism connected to the input shaft and including a plurality of transmission elements; an output shaft connected to the transmission mechanism; first and second clutches at opposite ends of the transmission mechanism and drivably connecting the input shaft with at least one of the transmission elements; and first and second hydraulic servos for applying the first and second clutches responsive to feed of an oil pressure. The transmission case encloses the transmission mechanism, the clutches and the hydraulic servos, and includes axial end walls forming cylinders for the hydraulic servos. First and second bearings are arranged between the pistons of the hydraulic servos and the first and second clutches, respectively, for allowing the relative rotation between the pistons and the clutches and for transmitting the thrust forces from the pistons to the respective clutches.

38 Claims, 30 Drawing Sheets

| | C-1 | C-2 | B-0$_L$ | B-0$_H$ | B-1 | B-2 |
|---|---|---|---|---|---|---|
| P | | | | | | |
| REV | ○ | | | | | ○ |
| N | | | | | | |
| 1ST | ○ | | | | ○ | |
| 2ND | | ○ | | | ○ | |
| 3RD | ○ | ○ | | | | |
| 4TH | | ○ | ○ | | | |
| 5TH | | ○ | | ○ | | |

FIG. 30

|      | C-1 | C-2 | B-1 | B-2 | B-R |
|------|-----|-----|-----|-----|-----|
| 1ST  | O   |     |     | O   |     |
| 2ND  |     | O   |     | O   |     |
| 3RD  | O   | O   |     |     |     |
| 4TH  |     | O   | O   |     |     |
| Rev  | O   |     |     |     | O   |

5,876,300

VEHICULAR AUTOMATIC TRANSMISSION

CROSS-REFERENCE TO RELATED APPLICATION

This application is a continuation-in-part of applicants' U.S. application Ser. No. 08/621,032, filed Mar. 22, 1996 and entitled "AUTOMATIC TRANSMISSION FOR VEHICLES" now abandoned.

BACKGROUND OF THE INVENTION

1. Field of the Invention

The invention relates to an automatic transmission for a vehicle and, more particularly, to an automatic transmission having a clutch operated by a hydraulic servo with a stationary type cylinder for shifting gear stages.

2. Description of the Prior Art

Generally in automatic transmissions for vehicles, at least two clutches are required for engaging and disengaging rotary members to shift gear stages, irrespective of the structure of the gear train in the transmission. In the prior art, the automatic transmission clutches are a wet type multiple disk clutch, in which both the clutch hub and the clutch drum supporting the friction plate portions are fixed to rotary members. It is customary that the hydraulic servo for bringing the friction plate portion into engagement be integrated with the clutch drum. This structure (called the "clutch drum type") has a cylinder formed in the rotating clutch drum, with a piston slidable in the cylinder to define an oil chamber. The clutch of this structure is exemplified by Japanese Patent Laid Open No. 52249/1987.

In contrast to the prior art clutches in automatic transmissions, wet type multiple disk brakes in prior art automatic transmissions have stationary reaction elements mounted on the transmission case or the like.

It is desirable to reduce the size of automatic transmissions and particularly the rotating members. However, the clutch drum type structure, as described above, limits the ability to reduce the size of the transmission because the rotary members must accommodate the cylinders of the hydraulic servos. This, and the requirement for at least two clutches for establishing a plurality of forward gear stages, prevent size reduction of the automatic transmission.

The rotary members in an automatic transmission undergo a change in rotational speed during a shift operation. Forces from inertia (inertia torque) produced by the rotational speed change and the weight of the rotary members result in fluctuations of the output shaft torque to cause shift shocks. In automatic transmissions employing clutches of the clutch drum type in which the hydraulic servos are contained in the rotary members, the weight of the rotary members is increased by the hydraulic servos to increase the inertia torque, thus increasing the severity of shift shocks.

Additionally, the prior art hydraulic servo of the clutch drum type produces a centrifugal oil pressure by centrifugal force acting upon the oil in the servo cylinder. This centrifugal oil pressure adds to the oil pressure from the hydraulic control system on the piston so that the oil pressure characteristics are changed during the shift operation by the raised oil pressure. Specifically, the centrifugal oil pressure acts to accelerate the release of the clutches being released and to quicken the engagement of clutches being engaged during the shift operation. For these reasons, the prior art includes an oil chamber for offsetting the centrifugal oil pressure as exemplified in Japanese Patent Laid Open No. 52249/1987. However, this provision of the centrifugal oil pressure offsetting chamber tends to further increase shift shocks because of an increase in the weight of the rotary members. Further the provision of the centrifugal oil pressure offsetting chamber enlarges the size of the system.

In the case of the hydraulic servo of the clutch drum type of the prior art, the inside of the rotating cylinder is fed with an oil pressure from a stationary member such as a transmission case so that a seal member is required for preventing oil leakage from between the relatively rotating portions of the cylinder and the stationary member. However, the seal member establishes a dragging loss to lower the transmission efficiency of the automatic transmission.

In order to eliminate such sliding resistance and to thereby prevent generation of excessive centrifugal oil pressure, therefore, it is effective to provide a stationary servo cylinder, separate from the clutch drum, so that only the servo forces are applied to the engagement element. When this design is adopted, the cylinder is fixed to structure which does not rotate, such as the transmission case. If the cylinder is formed in the transmission case, the overall structure can be made more compact because it requires neither an additional stationary member nor a separate cylinder wall member.

In an automatic transmission, however, two or three sets of clutches are usually required for the speed change mechanism. Even in the case of a speed change mechanism requiring only two sets of clutches, these two clutches are not always arranged at the end portions of the speed change mechanism. Despite the aforementioned advantage, however, there has never been realized, in actual practice, an automatic transmission structure in which the hydraulic servos of the clutches are of the stationary cylinder type formed in the transmission case. Moreover, when the hydraulic servos of the clutches are of the stationary cylinder type, their oil pressures are not balanced in the clutch drum, thereby creating another problem in that a reaction force receiving structure is required for bearing the hydraulic servo forces.

However, clutch servos having their cylinders formed in the two end walls of the case have been used in the prior art in a torque distribution mechanism, i.e. the differential unit of a vehicle, which requires that the clutches be disposed in the final output unit of the mechanism and be arranged symmetrically with respect to the case. These clutches are exemplified by those disclosed in Japanese Patent Application Laid-Open ("Kokai") No. 248721/1990 and Japanese Patent Application Laid-Open ("Kokai") No. 241287/1994.

The reaction force receiving structure in the torque distributing mechanism of Kokai No. 248721/1990 is disposed at the inner circumferential side of the cylinder and uses a bearing so as to restore the hydraulic servo force at the same case end wall in which the servo cylinder is formed. In this arrangement, the cylinder and the bearing are radially overlapped to limit the diameter of the cylinder and to thereby allow a larger hydraulic servo diameter. On the other hand, Kokai No. 24128/1994 discloses reaction receiving structure in which a step portion is formed radially outward of the clutch drum and in which the bearing is arranged between the step portion and the inner circumference of the case, so that the hydraulic servo force may be transmitted to and borne by the case. In this latter design, although the bearing is radially enlarged, it can give satisfactory service when the rotation is at a relatively low circumferential speed, equal to that of the rotation of the axle, as in the case of the clutch of the differential unit. If, however, this latter design is applied to structure rotating at a relatively high speed, e.g. structure transmitting the engine rotation substantially as is, as in the clutch for connecting the input shaft of the automatic transmission and the speed change mechanism, the circumferential speed of the bearing is so high that large-sized bearings with matching load capacity must be used to provide the required durability. Thus, this latter design cannot be adopted consistent with the objective of a compact transmission. So long as the concept of the prior art for receiving the hydraulic servo force in the vicinity of the hydraulic servos is thus followed, it is impossible to realize effective support for bearing the force of the hydraulic servo in an automatic transmission.

SUMMARY OF THE INVENTION

It is, therefore, a first object of the invention to provide a more compact vehicular automatic transmission with two hydraulic clutch servos employed in forward gear shifts, by mounting the hydraulic clutch servos in the transmission case. Mounting of the clutch servos in the transmission case decreases the weight and the size of the rotary members to reduce the inertia torque and to lighten the shift shocks. The size of the transmission system is reduced by adopting hydraulic servos of the stationary cylinder type to make the hydraulic servo non-rotatable. The non-rotatable hydraulic servos eliminate the need for the centrifugal oil pressure offsetting oil chamber to permit further reduction in system size, as well as the weight and size of the rotary members, to further lighten the shift shocks.

A second object is to provide a reaction force receiving structure in an automatic transmission with the hydraulic servos of input clutches formed in the walls of the transmission case so as to improve the efficiency and to enhance the compactness. In other words, the second object is to provide structure for bearing the axial force, inevitably produced by such hydraulic servos, without sacrifice of compactness or durability of the mechanism.

A third object of the invention is to make use of the end walls of the transmission case as a reaction force receiving structure, but without requiring a new reaction supporting plate arranged, in a common axial force transmitting line.

A fourth object of the invention is to make use of the intermediate wall of the case, which supports the output gear, as a reaction force receiving structure.

A fifth object of the invention is to use the existing individual walls of the transmission case as a reaction force receiving structure, i.e. transmitting the axial force to the transmission case.

A sixth object of the invention is to lighten the load upon the wall of the automatic transmission case and to improve the durability of the transmission by offsetting, at least partially, the axial forces transmitted to the wall of the transmission case.

A seventh object of the invention is to prevent individual axial forces from influencing the axial clutches by transmitting the axial forces along lines independent of each other.

An eighth object of the invention is to improve controllability, by minimizing clearances between the members in a common axial force transmitting line, i.e. by minimizing the number of members in the common axial force transmitting line.

A ninth object of the invention is to provide a reaction receiving structure with minimal number of bearings for supporting the reaction force, by utilizing the position regulating bearings, normally found in the planetary gearing of the speed change mechanism, for receiving the reaction force.

A tenth object of the invention is to maximize the degree of freedom for setting the gear ratio in a speed change mechanism by establishing an axial force transmitting line suitable for the speed change mechanism.

An eleventh object of the invention is to effectively utilize the position regulating bearings of the speed change mechanism as the reaction receiving structure by arranging the speed change mechanism, including the planetary gearing, between the two end walls and the intermediate wall of the transmission case.

A twelfth object of the invention is to make the axial force transmitting line, as defined by two input clutches, a line which avoids the high-speed rotating portions of the bearings, in accordance with the gear stages achieved by the transmission.

A thirteenth object of the invention is to minimize the gear noise which is generated when the axial force transmitting line is formed through the speed change mechanism including the planetary gearing.

A fourteenth object of the invention is to provide a simple structure by which the axial force of one clutch is transmitted to the intermediate wall through the speed change mechanism including the planetary gearing and the axial force of the other clutch is transmitted to an end wall of the casing through the input shaft.

A fifteenth object of the invention is to provide a simple structure which transmits the axial force through the input shaft to the end walls of the transmission case.

A sixteenth object of the invention is to make the transmission a compact structure by rationally using the end wall of the transmission case to support the input shaft, the cylinders of the hydraulic servos and the reaction receiving bearing.

A seventeenth object of the invention is to retain the durability of the bearings in the axial force transmitting line passing through the planetary gear in the speed change mechanism.

An eighteenth object of the invention is to utilize the support bearings of the output gear of the speed change mechanism in the axial force transmitting line for receiving the reaction force, thereby avoiding need for additional components.

A nineteenth object of the invention is to maintain the durability of the bearings supporting the output gear by protecting these bearings from the axial thrust force which is generated in the output gear in the speed change mechanism.

A twentieth object of the invention is to reduce the facial pressure for the axial force transmission along the axial force transmitting line between the output element of the speed change mechanism and the output gear.

A twenty-first object of the invention is to prevent a load offset by the eccentricity of the support shaft, upon engagement of the band brake with the bearing transmitting the axial force.

In the case of the clutch drum type cylinder of the prior art, moreover, the axial forces of the hydraulic servos in the clutch drums are balanced by the reaction forces, whereby only these balanced forces are applied to the clutches, i.e. no other axial force (exterior force) is applied to the clutches. However, in the case of the so-called "stationary type cylinder", the application of the clutch results in an unbalanced force, so that the reaction force must be borne by other members such as the transmission mechanism, the input shaft and so on. As a result, various forces, such as the axial force resulting from operation of the helical gear structure, act upon the clutches. With these forces being in effect at the time of releasing the clutches, therefore, the clearances between the friction plates of the clutches will change in accordance with the existing conditions. In applying a clutch, the clutch application characteristics will always change with the change in the clearances thus reducing controllability of the oil pressure at the time of shifting and causing shift shock. Therefore, a twenty-second object of the invention is to prevent loss of the controllability of the oil pressure at the time of shifting and to prevent shift shock, as described above, by having the return springs associated with the clutches act to hold the clearances within the clutches constant against the exterior axial forces.

In the standard clutch the reactions to the piston axial forces are borne by a plurality of separator plates axially arranged alternating with a plurality of friction members having friction facings adhered to their opposing faces, by interposing pressure plates between the friction members and the piston, and by bringing the friction members, located at the opposite ends, into abutment against the backing plates. These backing plates are fixed by snap rings, usually to the clutch drums, at the side supporting the separator plates. In the case of this prior art structure, an excessive axial space is required for fixing the backing plates, and these backing plates are supported in a cantilevered manner only at their radially outer side. Thus, in order to prevent the backing plates from becoming warped, into a dish-spring shape by the axial forces of the pistons, thereby producing non-uniform frictional engagement between the friction members and the separator plates, the backing plates must be made considerably thicker, requiring additional axial space. Therefore, a twenty-third object of the invention is to eliminate the need for thicker backing plates by utilizing the friction members (plates), which drivably connect the transmission mechanisms and the clutches, as the backing plates to eliminate need for fixation by snap rings and to thereby reduce the required axial space.

In order to control the automatic transmission, generally speaking, the r.p.m. of the input shaft of the transmission is monitored. In the case of the clutch drum type prior art, the input r.p.m. is easily detected by attaching the rotor to the outer circumference of the drum. In the case of arranging the hydraulic servos on the two end walls of the transmission case, on the other hand, the hubs supporting the inner circumferences of the friction plate portions of the clutch are necessarily connected to the input shaft. As a result, it is difficult to detect the rotational speed of the input shaft at the outer circumferential side of the clutch, opposite the hubs which are located at the inner circumferential side of the clutch. Therefore, a twenty-fourth object of the invention is to realize a structure which can detect the r.p.m. of the input shaft from the outer circumferential side of the clutch.

It is desirable that the friction plates of the clutch be steadily fed with lubricating oil, so as to prevent generation of heat, in both the applied and released states, and to achieve stable frictional characteristics during the application and release. In the clutch drum type prior art, however, most of the transmission elements of the transmission mechanism come to a standstill when the vehicle is stopped and in a gear stage in which the transmission elements do not participate. Accordingly, in structure in which the rim side is connected to the input shaft, whereas the hub side is connected to one of the transmission elements, the still hub obstructs the feed of the lubricating oil from the radially inner side of the hub to the friction plates, there impeding achievement of the aforementioned objects of prevention of the heat generation and the maintenance of the stable frictional characteristics. These problems are necessarily created when the clutch drum is connected to the input shaft. Therefore, a twenty-fifth object of the invention is to enable the clutch, having the stationary cylinder type hydraulic servo structure, to feed the friction plates with the lubricating oil at all times by connecting the hub to the input shaft.

Incidentally, when the hydraulic servos of the subject two clutches are of the stationary cylinder type serve as input clutches, the input shaft, connected to both these input clutches, extends to the two end portions of the transmission case, and the transmission mechanism is sandwiched between the input clutches, thus providing a structure from which it is difficult to extract the output. Therefore, a twenty-sixth object of the invention is to provide a rational power extraction arrangement for the aforementioned structure.

A twenty-seventh object of the invention is to make the speed change mechanism as simple as possible.

Moreover, in the general transmission mechanism of the prior art it is usually required to provide three clutches so as to establish the four forward stages. However, the requirement for three clutches enlarges the size of the system and is disadvantageous from the viewpoint of making the transmission compact. Therefore, a twenty-eighth object of the invention is to make the system more compact by providing only two clutches for the transmission mechanism, while retaining the capability to establish four forward and one reverse gear stages by selective applying and releasing the clutches and brakes, and making the structure as compact as the stationary cylinders permit by arranging the hydraulic servos of the aforementioned two clutches at the two ends of the transmission case.

The twenty-ninth object of the invention is to provide a variety of modified transmission mechanisms for establishing four forward speeds by use of the aforementioned two clutches.

A thirtieth and final object of the invention is to provide a transmission mechanism for establishing five forward speeds using the two clutches.

In order to achieve the aforementioned first object, the present invention provides a vehicular automatic transmission for establishing a plurality of forward gear stages, including: a transmission case; an input shaft; a transmission mechanism connected to the input shaft and including a plurality of transmission elements; an output shaft connected to the transmission mechanism; first and second clutches drivably connecting any two of the input shaft and the transmission elements individually; and first and second hydraulic servos for applying the first and second clutches when fed with an oil pressure. The transmission case encloses the transmission mechanism, the first and second clutches and the first and second hydraulic servos and includes individual end walls at its axially opposed end portions and the first and second clutches are arranged at the opposing axial ends of the transmission mechanism. The first and second hydraulic servos individually include: first and second stationary type cylinders respectively formed in the opposing end walls of the transmission case so as to face each other; first and second pistons arranged slidably in the first and second cylinders, respectively, and individually defining, together with the first and second cylinders, oil chambers for receiving the oil pressure; and first and second bearings arranged between the first and second pistons and the first and second clutches, respectively, for allowing relative rotation between the first and second pistons and the first and second clutches, respectively, and for transmitting the axial forces, generated by the first and second pistons, responsive to the oil pressure feeds, to the respective first and second clutches.

In order to achieve the aforementioned second object, the two hydraulic servos are of the stationary cylinder type, the cylinders of which are formed at the two end walls of the transmission case and are individually arranged in association with the input clutches. In this arrangement the axial forces applied to an input clutch by the action of the associated hydraulic servo is transmitted to the walls of the transmission case, instead of to the opposing hydraulic servo, by reaction members which are arranged between the individual input clutches and the opposing walls of the transmission case.

In order to achieve the aforementioned third object, the opposing walls of the transmission case supporting the individual hydraulic servos are the two end walls of the transmission case.

In order to achieve the aforementioned fourth object, the transmission case is provided with an intermediate wall between the two end walls for supporting an output gear connected to the output element, and one wall of the transmission case, which supports a hydraulic servo, is an end wall of the transmission case whereas the opposing wall of the transmission case, which supports the other hydraulic servo, is the intermediate wall of the transmission case. Provision of an intermediate wall between the two end walls also serves to achieve the aforementioned fifth object because reaction members define axial force transmitting lines for transmitting the axial forces to the intermediate wall of the transmission case.

In order to achieve the aforementioned sixth object, the reaction members form a common axial force transmitting line between the two input clutches.

In order to achieve the aforementioned seventh object, the reaction members form axial force transmitting lines independent of each other for the individual input clutches.

In order to achieve the aforementioned eighth object, the reaction members include the input shaft and the common axial force transmitting line passes through the input shaft.

In order to achieve the aforementioned ninth object, the speed change mechanism, including a planetary gear unit, is arranged between the intermediate wall and the one end wall; the reaction members include the speed change mechanism and the input shaft; and the axial force is transmitted from the first input clutch to the intermediate wall through the speed change mechanism and from the second input clutch to the end wall through the input shaft.

In order to achieve the aforementioned tenth object, the speed change mechanism, including a planetary gear unit, is arranged between the intermediate wall and the one end wall; the reaction members include the input shaft; and the axial force is transmitted from the second input clutch to the intermediate wall, not through the speed change mechanism, but from the first input clutch to the end wall through the input shaft.

In order to achieve the aforementioned eleventh object, two speed change mechanisms, individually including planetary gear units, are separately arranged between the intermediate wall and the one of the end wall and between the intermediate wall and the other of the end walls; the reaction members include the speed change mechanisms; and the axial force is transmitted to the intermediate wall through the speed change mechanisms.

In order to achieve the aforementioned twelfth object, the first input clutch is applied at a low gear stage and/or a direct-coupled stage, whereas the second input clutch is applied at a high gear stage. The first input clutch may be applied only for establishing that low gear stage and/or a direct-coupled state whereas the second input clutch is applied only for establishing the high gear stage.

In order to achieve the aforementioned thirteenth object, the first input clutch is applied only for establishing a low gear stage and/or a direct-coupled stage.

In order to achieve the aforementioned fourteenth object, the reaction members include two flange portions for receiving the axial forces from the individual input clutches and for transmitting the torque from the input shaft to the individual input clutches. The flange portion at the side of the second input clutch, which serves to transmit the axial force through the input shaft to the end wall, is axially fixed with respect to the input shaft, whereas the flange portion at the side of the first input clutch, which serves to transmit the axial force through the speed change mechanism to the intermediate wall, is axially movable and connected to the input shaft.

In order to achieve the aforementioned fifteenth object, the power to the automatic transmission is introduced to the input shaft from the second input clutch side. In order to transmit the axial force from the second input clutch, a section of the input shaft between an end wall and the adjacent flange portion of the first input clutch is radially reduced to form a step portion (shoulder) so that the race of the bearing for transmitting the axial force to the end wall is held in abutment against the step portion.

In order to achieve the aforementioned sixteenth object, the power to the automatic transmission is introduced to the input shaft from the second input clutch side. The end wall has an annular boss portion for supporting the input shaft so that the outer circumference of the boss portion provides a cylinder wall of the hydraulic servo operating the first input clutch, whereas the end face of the boss portion receives the axial force which is transmitted to the end wall.

In order to achieve the aforementioned seventeenth object, the speed change mechanism includes a plurality of planetary gear units and a plurality of thrust bearings which have the same radial dimensions as the sun gears of the planetary gear units, and the axial force of the first input clutch is transmitted through the thrust bearings to the intermediate wall.

In order to achieve the aforementioned eighteenth object, the output gear is supported on the intermediate wall through a bearing, and the output gear is so connected to the output element of the speed change mechanism that the axial force from the first input clutch can be transmitted to the intermediate wall.

In order to achieve the aforementioned nineteenth object, the output gear is a helical gear so that the direction of the thrust force established in drive works against the axial force from the first input clutch.

In order to achieve the aforementioned twentieth object, the intermediate wall has an axially extending cylindrical portion which supports the output gear on its outer circumference.

In order to achieve the aforementioned twenty-first object, the speed change mechanism includes a band brake for braking one of its rotary elements on the transmission case, the drum of the band brake being axially supported by the input shaft. The first input clutch is applied only at a gear stage at which the band brake is not applied.

In order to achieve the aforementioned twenty-second object, the first and second hydraulic servos include first and second return springs, for applying axial forces against the movements of the first and second pistons which accompany the feed of the oil pressures, and first and second thrust members between the first and second bearings and the first and second clutches, respectively, and wherein the first and second return springs abut against the first and second thrust members and the first and second reaction members, respectively.

In order to achieve the aforementioned twenty-third object, the input shaft extends between the end walls, across the entire transmission mechanism. The transmission mechanism includes first and second flange portions arranged adjacent to the first and second clutches, respectively, so that the axial forces from the first and second pistons are transmitted thereto through the first and second clutches, respectively. The first and second clutches are actuated by the first and second hydraulic servos, respectively, to drive the input shaft and transmission elements. The hubs are connected to the input shaft through the first and second flange portions, respectively, and the rims are each connected to one of the transmission elements and arranged around the outer circumferences of the hubs separated therefrom by friction plate portions. The friction plate portion of at least one of the first and second clutches includes a plurality of friction members having two faces, to which friction facings are adhered; and a plurality of separator plates arranged axially alternating with the friction members. The friction members are splined at their radially outer edges to the inner circumferential surfaces of the rims, while the separator plates are splined at their radially inner edges to the outer circumferential surfaces of the hubs. At least one of the first and second hydraulic servos includes a thrust member splined on the outer circumferential surface of the hub between the first or second bearing of that one hydraulic servo and the clutch corresponding to the one hydraulic servo. The thrust member and the flange portions are confronted by the outermost friction members.

In order to achieve the aforementioned twenty-fourth object, the input shaft extends between the end walls, through the entire transmission mechanism, and the first and second clutches are actuated by the first and second hydraulic servos to drive the input shaft and certain of the transmission elements. The hubs of the clutches are connected to the input shaft and the rims are each drivably connected to one of the transmission elements and arranged around the outer circumference of the hubs across friction plate portions.

One of the first and second hydraulic servos includes a thrust member between the first or second bearing of the hydraulic servo and the clutch associated with the hydraulic servo. The thrust member is connected to the hub in a manner prohibiting relative rotation while allowing axial sliding relative to the hub and includes a rotor portion including a cylindrical member having a plurality of notches formed therein and axially extending over the radially outermost side of the rim, confronting a rotation sensor.

In order to achieve the aforementioned twenty-fifth object, the clutch hubs each have individual oil passages for providing communication between the inner and outer circumferences of the hubs to introduce the lubricating oil fed from their radially inner side onto the friction plate portions.

In order to achieve the aforementioned twenty-sixth object, the vehicular automatic transmission is provided with a counter shaft arranged in parallel with the output shaft and drivably connected to the wheels, a counter drive gear integral with the output shaft and a counter driven gear meshing with the counter drive gear and integral with the counter shaft. The counter drive gear is interposed between the first and second clutches which are actuated by the first and second hydraulic servos to connect the input shaft with any of the speed change mechanism elements.

In order to achieve the aforementioned twenty-seventh object, the speed change mechanism is a gear train for establishing all the forward gear stages and the reverse gear stage using only the first and second input clutches.

In order to achieve the aforementioned twenty-eighth object, the transmission mechanism includes a first planetary gear set including a first ring gear, a first carrier rotatably supporting a first pinion gear meshing with the first ring gear and a first sun gear meshing with the first pinion gear; and a second planetary gear set including a second ring gear connected to the first carrier, a second carrier rotatably supporting a second pinion gear meshing with the second ring gear and connected to the first ring gear and a second sun gear meshing with the second pinion gear. The first ring gear and the second carrier are connected to the output shaft, whereas the first sun gear is connected to the input shaft by the first clutch and fixed on the case by a first brake. The second sun gear is fixed on the case by a second brake, and the first carrier and the second ring gear are fixed on the case by a third brake and connected to the input shaft by the second clutch.

In order to achieve the aforementioned twenty-ninth object, the transmission mechanism includes a first planetary gear set including a first ring gear, a first carrier rotatably supporting a first pinion gear meshing with the first ring gear and a first sun gear meshing with the first pinion gear; and a second planetary gear set including a second ring gear, a second carrier rotatably carrying a second pinion gear meshing with the second ring gear and connected to the first ring gear and a second sun gear meshing with the second pinion and connected to the first sun gear. The first ring gear and the second carrier are connected to the output shaft, whereas the first sun gear and the second sun gear are connected to the input shaft by the first clutch and fixed to the case by a first brake. The second ring gear is fixed on the case by a second brake, and the first carrier is fixed on the case by a third brake and connected to the input shaft by the second clutch.

In another approach to satisfaction of the twenty-ninth object, the transmission includes a planetary gear set including a ring gear, a carrier rotatably supporting a first pinion gear meshing with the ring gear and a second pinion gear meshing with the first pinion gear, a first sun gear meshing with the first pinion gear and a second sun gear meshing with the second pinion gear. The carrier is connected to the output shaft, whereas the second sun gear is connected to the input shaft by the first clutch and fixed on the case by a first brake, the first sun gear is fixed on the case by a second brake, and the ring gear is fixed on the case by a third brake and connected to the input shaft by the second clutch.

In yet another approach to achieving the aforementioned twenty-ninth object, the transmission mechanism includes a planetary gear set including a ring gear, a carrier rotatably supporting a first pinion gear meshing with the ring gear and a second pinion gear meshing with the first pinion gear; a first sun gear meshing with the first pinion gear; and a second sun gear meshing with the second pinion gear. The difference in this latter design is that the ring gear is connected to the output shaft, the first sun gear is connected to the input shaft by the first clutch and fixed relative to the case by a first brake, the second sun gear is fixed on the case by a second brake, and the carrier is fixed relative to the case by a third brake and connected to the input shaft by the second clutch.

In order to achieve the aforementioned thirtieth object, the transmission mechanism includes a planetary gear set including a first ring gear, a first carrier rotatably supporting a first pinion gear meshing with the first ring gear, a first sun gear meshing with the first pinion gear, a second ring gear connected to the first carrier, a second carrier rotatably supporting a second pinion gear meshing with the second ring gear and connected to the first ring gear, a second sun gear meshing with the second pinion gear, and a third sun gear meshing with a third pinion gear. The third pinion gear is borne by the first carrier and is connected to the first pinion gear in a manner preventing relative rotation therebetween and has a smaller diameter than that of the first pinion gear. In this design the first ring gear and the second carrier are connected to the output shaft, the first sun gear is connected to the input shaft by the first clutch and is fixed relative to the case by a first brake. The second sun gear is braked on the case by a second brake, the first carrier and the second ring gear are braked on the case by a third brake and are selectively connected to the input shaft by the second clutch, and the third sun gear is braked on the case by a fourth brake.

In the present invention, the first and second clutches are arranged at the opposing axial ends of the transmission with the transmission mechanism in between, and the cylinders of the first and second hydraulic servos for applying those clutches are formed in the two end walls of the case to give a compact structure. Thanks to the aforementioned structure of the hydraulic servos for applying the clutches, the servo oil chamber to offset the centrifugal oil pressure is not required, unlike the prior art, so that the weights of the rotary members can be reduced to thereby reduce the shift shocks from the inertia torque at the time of a shift.

In a preferred embodiment wherein the input shaft spans the entire axial length of the case, extending through the speed change mechanism, the axial forces generated by the servos are transmitted to the walls of the transmission case and, unlike the prior art, a reaction force receiving structure need not be disposed at the inner circumferential side of each hydraulic servo. As a result, the effective pressure receiving area of the hydraulic servos can be accordingly enlarged to make the transmission compact. Unlike the prior art wherein the reaction receiving structure of the prior art which supports the outer circumference of the clutch drum, the diameter of the bearings can be reduced to increase the durability of the bearings by reducing their circumferential speed. Thus, the present invention makes use of the existing walls of the transmission case, avoids need for an additional (dedicated) reaction force receiving structure and allows a compact construction of the automatic transmission.

In the preferred embodiment wherein the case includes an intermediate wall, only the hydraulic forces act upon the two end walls and the two servo forces are transmitted to the intermediate wall where they cancel each other. Only one servo force acts at the maximum upon the intermediate wall so that the two axial forces generated by the hydraulic servos can be dispersed and received by the individual walls to improve durability. Because no additional wall is required, i.e. the existing walls can be utilized to receive the axial forces, a compact construction can be provided for automatic transmission.

When the individual clutches are simultaneously applied by the first and second hydraulic servos, the axial forces are at least partially cancelled in the common axial force transmitting line so that the loads upon the walls, to which the axial forces are applied, are lightened and durability is improved.

When a speed change is made by changing the engaged/disengaged states of the clutches with the first and second hydraulic servos, the axial forces are transmitted along independent transmission lines so that the axial forces will not influence each other, thus improving the controllability of the two input clutches.

In another preferred embodiment, by using the input shaft as a reaction member, the number of reaction members interposed between the hydraulic servos and the side walls can be reduced to better allow for clearances in the input clutches. Because, the hydraulic servo forces do not act upon the speed change mechanism large-sized bearings are not needed in the speed change mechanism. In addition, the bearings are limited to those between the input shaft and the end walls.

As is conventional, the speed change mechanism is provided with thrust bearings for receiving the thrust forces of those planetary gears which are in the form of helical gears. By arranging the speed change mechanism between an intermediate wall and one end wall and causing the axial force transmitting line for transmitting the axial force of the first clutch, extending to the intermediate wall, to pass through the speed change mechanism acting as a reaction member, no bearing need be added, as might otherwise be required by the stationary cylinder type clutch. Further, because the axial force transmitting line also passes through the input shaft, also serving as a reaction element, only one bearing need be added. As a result, the number of bearings to be added can be minimized to make a compact transmission.

With the speed change mechanism located between an intermediate wall and one end wall, the axial force of a first hydraulic servo located at that one end wall is transmitted to the end wall through the input shaft, whereas the axial force transmitted to the intermediate wall does not pass through the speed change mechanism. The reason for preference of such structure is as follows. The speed change mechanism is usually provided with thrust bearings for receiving the thrust forces of the planetary gears which are helical gears. If the hydraulic servo forces are applied to the speed change mechanism, the thrust bearings must be large-sized. Especially if the thrust bearing adjacent the sun gear is large-sized, there arises a problem that the diameters of the sun gears cannot be reduced, thus reducing the degree of freedom in designing the gear ratio. However, thanks to the present invention, it is possible to have a greater degree of freedom in setting the gear ratio.

In embodiments wherein the speed change mechanism includes plural planetary gear units separated by an intermediate wall, i.e. each is arranged between the intermediate wall and an end wall, so that the axial forces can be transmitted to the intermediate wall by utilizing the thrust bearings associated with the individual planetary gears, without need for any additional bearing. As a result, it is possible to make the transmission more compact.

The transmission loss can be minimized, i.e. the transmission efficiency can be maximized, by applying a first input clutch which has the speed change mechanism as a reaction member, at a low gear stage, i.e. at a stage wherein the planetary gears do not rotate at a high speed, and by applying a second input clutch, which has the input shaft at as a reaction member, at a high gear stage, i.e. at high-speed rotation. The first input clutch is also applied at the direct-coupled stage, but no rotation occurs within the bearings with the speed change mechanism direct-coupled, so that the efficiency will not drop. This arrangement offers a considerable advantage because the axial force transmitting line through the speed change mechanism passes through so many bearings that use of the speed change mechanism as a reaction element under a high load of axial force of the hydraulic servo would cause a very high transmission loss. If a high axial force acts through the speed change mechanism including a planetary gear set, high gear noise may be generated, especially at a high gear stage, due to distortion of the gears. Thus, by keeping the first input clutch disengaged at the high gear stage, the gear noise can be suppressed to a low level. Incidentally, at the direct-coupled stage, the planetary gears are integrally rotated so that there would be no noise problem even if the first input clutch were to be applied.

When the power from the engine is transmitted from the second clutch side to the input shaft, the input shaft portion between the first hydraulic servo and the flange portion at the side of the clutch engaged by the hydraulic servo does not transmit torque so that it may be radially reduced. By making use of this fact, the input shaft portion is radially reduced to form a step (shoulder), and the race of the bearing is made to abut against this step. As a result, the axial forces can be transmitted without providing any snap ring, thereby simplifying the structure.

In preferred embodiments wherein the end wall is provided with an annular boss supporting the input shaft, the outer cylindrical wall of the boss serves as the inner cylindrical surface of the servo cylinder and the transmission can be given a compact structure by integrating the shaft support structure, the cylinder of the first hydraulic servo and the bearing abutment surface, in a rational arrangement without any wasted space.

By transmitting the axial force of one clutch to an intermediate wall through thrust bearings of the same radial dimensions as the sun gears, the circumferential speed is lowered to improve the durability of the bearings.

In an embodiment wherein an intermediate wall supports the output gear through a bearing, when the axial force of the first hydraulic servo is transmitted to the intermediate wall through the output shaft. By utilizing the bearing indispensable for supporting the output gear in the line of axial force transmission, therefore, the number of bearings can be reduced to reduce the overall number of parts.

Where the output gear is a helical gear, the direction of the thrust force established in drive by the helical gear is opposite the axial force from the first input clutch. Accordingly, the thrust forces cancel each other so that the thrust force acting on the bearing supporting the output gear can be minimized and the durability of the bearing can be maximized.

Where the output gear is supported at the outer circumferential surface of the cylindrical extension of the intermediate wall, the connection to the output element can be positioned radially further outward to thereby lower the facial pressure on the connection in transmitting the axial force. Since a high drive torque from the speed change mechanism acts upon the connection, the load on the connection can be minimized by lowering the axial force to allow the mechanism to be somewhat smaller, i.e. by integrating the torque transmission function and the axial force transmission function into the one connection.

In another preferred embodiment the speed change mechanism includes a band brake for braking one of its rotary elements on the transmission case, the drum of the band brake is axially supported by the input shaft, and the first input clutch is applied only at a gear stage at which the band brake is not applied. In this preferred embodiment the durability of the bearing is protected by not allowing application of the input clutch which is associated with the first hydraulic servo, simultaneously with engagement of the band brake. Such simultaneous engagement is avoided because, at the time of applying the band brake, an eccentric load is applied to the band drum. As a result, when the band drum is axially supported, an axial eccentricity may tend to incline the rotary members, thereby causing an offset of the abutment against the thrust bearing. If, at this time, the input clutch is applied to transmit the axial force through the speed change mechanism, the offset of the abutment of the thrust bearing occurs under the action of a high axial force. Thus, the aforementioned avoidance of simultaneous engagement avoids an undesirable affect on the durability of the bearing.

In other embodiments, first and second hydraulic servos include first and second return springs for applying axial forces in opposition to forward movements of the first and second pistons, responsive to the feed of the oil pressure to the oil chamber; and first and second thrust members between said first and second bearings and said first and second clutches, respectively, and wherein the first and second return springs abut against first and second thrust members and said first and second reaction members, respectively. In such embodiments, the return springs, arranged between the reaction members and the thrust members, serve, when the clutch is released, to hold the clearances of the clutches constant against the axial forces from the outside, so that the controllability of the clutches is maintained and the shift shocks can be suppressed to a minimum.

In yet another preferred embodiment, the input shaft spans the end walls through the transmission mechanism, and the transmission mechanism includes first and second flange portions arranged adjacent the first and second clutches, respectively, so that the axial forces from the first and second pistons are transmitted thereto through said first and second clutches, respectively. The first and second clutches are actuated by the first and second hydraulic servos, respectively, to drive said input shaft and any of the transmission elements. Hubs are connected to the input shaft through said first and second flange portions, respectively, and rims are each drivably connected to one of said transmission elements and are arranged around the outer circumference of the hubs with the friction plate portions therebetween. The friction plate portion of at least one of the first and second clutches includes a plurality of friction members, each having two faces to which frictional facings are adhered; and a plurality of separator plates alternating axially with the friction members. The friction members are splined at their outer edges to the inner circumference of the rims, and the separator plates are splined at their inner edges to the outer circumferential surfaces of said hubs. At least one of the first and second hydraulic servos includes a thrust member splined on the outer circumference of the hub between the first or second bearing of the hydraulic servo and the clutch operated by the hydraulic servo. The thrust member and said flange portions confront the outer ends of the respective friction elements. Because the thrust members and the flange portions are made to confront the friction members, the axial dimension can be shortened by utilizing the flange portions as the backing plates, thus requiring no special axial stop member. Moreover, it is unnecessary to increase the thickness of the backing plates to prevent loss of the friction characteristics.

In a preferred embodiment the hubs are connected to the input shaft; and the rims are drivably connected to one of the transmission elements and are arranged around the outer circumferences of said hubs, separated therefrom by friction plates. One of the first and second hydraulic servos includes a thrust member between the first or second bearing of said hydraulic servo and the clutch operated by that hydraulic servo, and the thrust member is slidably connected, with prevention of relative rotation, to the hub and includes a rotor having a plurality of notches extended to the radially outer side of the rim and confronting a rotation sensor. With two hydraulic servos are arranged at the opposite ends of the transmission case so that the rotation of the input shaft is transferred from the hubs to the outer circumferential sides of the clutches through the thrust members, detection of the r.p.m. of the input shaft is enabled at the outer circumferential side of a clutch.

In another preferred embodiment the first and second clutches are actuated by the first and second hydraulic servos to drive the input shaft and certain transmission elements. The clutches each include hubs connected to the input shaft; and rims drivably connected to one of the transmission elements and arranged around the outer circumferences of the hubs with friction plates in between. The hubs each have oil passages for providing communication between their inner and outer circumferences to introduce the lubricating oil fed from their radially inner sides to the friction plates. Because the hubs of the clutches continuously rotate together with the input shaft the oil is stably fed from the radially inner side by the centrifugal force via the through oil passages of the hubs to the friction plate portions, thereby improving the lubrication efficiency and the cooling effect.

In another preferred embodiment, the shift output is extracted at a counter shaft which is arranged in parallel with the input shaft so that it can be taken off at a counter driven gear without any interference with the input shaft, in spite of the input clutches being arranged at the opposing ends of an input shaft which is coextensive with the axial length of the transmission.

A significant advantage of the present invention is that it provides a gear train capable of establishing all the forward gear stages and reverse, using only the first and second (two) input clutches. Accordingly, the gear train structure maximizes the compactness afforded by use of the stationary cylinder type hydraulic servos.

Various embodiments of the present invention offer the advantage of provision of four forward stages and one reverse stage using only two clutches operated by compact hydraulic servos of the stationary cylinder type, with the two clutches arranged at the two axially opposite ends of the transmission case.

Another embodiment provides the five forward stages and one reverse stage with a transmission mechanism having only the two clutches, again in a compact design.

BRIEF DESCRIPTION OF THE DRAWINGS

Other objects and novel features and advantages of the invention will become apparent from the following description to be made with reference to the accompanying drawings, in which:

FIG. 30 is a table of operations of the automatic transmission of the twentieth embodiment;

DESCRIPTION OF THE PREFERRED EMBODIMENTS

Figures 1, 2:
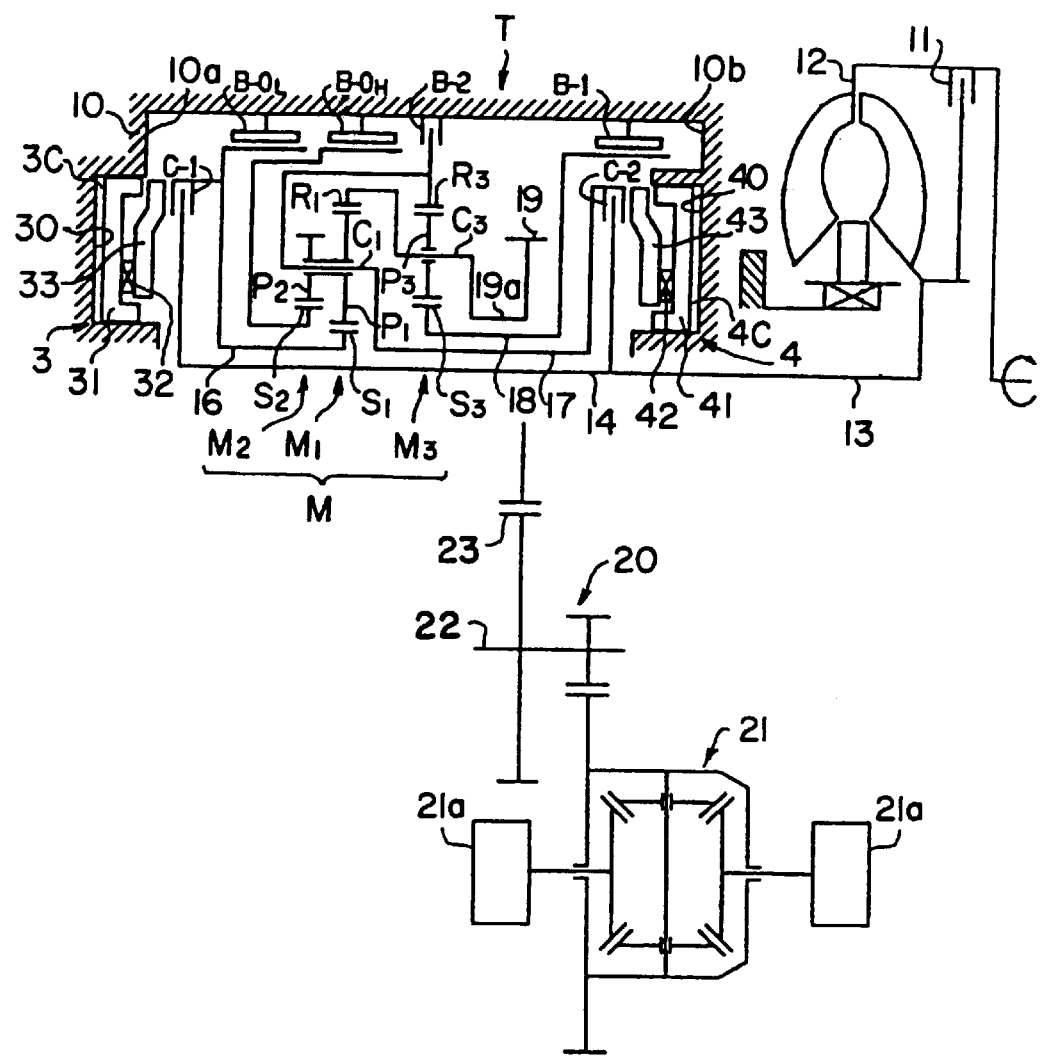
FIG. 1 is a schematic diagram showing the entire structure of a vehicular automatic transmission according to a first embodiment of the invention.
FIG. 2 is a table of operations of the aforementioned transmission.

The embodiments of the invention will now be described with reference to the accompanying drawings. FIG. 1 shows a first embodiment with two clutches for controlling the transmission mechanisms, in which the carriers and ring gears of planetary gear units are directly connected to each other. As shown in the schematic of FIG. 1, this automatic transmission T for a vehicle includes: a transmission case 10; an input shaft 14; a transmission mechanism M connected to the input shaft 14 and having a plurality of transmission elements (e.g., carriers or ring gears for bearing sun gears or pinion gears, as will be herein described); an output shaft 19a connected to the transmission mechanism M; first and second clutches (C-1 and C-2) for drivably connecting the input shaft 14 and any two of a plurality of transmission elements such as a sun gear $S_1$ and a carrier $C_1$; and first and second hydraulic servos 3 and 4 for bringing the first and second clutches, when supplied with the oil pressure, into respective engagements, to thereby establish a plurality of (e.g., five in the present embodiment) forward gear stages.

The transmission case 10 includes, at its two axial end portions, end walls 10a and 10b between which are housed the transmission mechanism M, the first and second clutches (C-1 and C-2) and the first and second hydraulic servos 3 and 4. The first and second clutches (C-1 and C-2) are individually arranged at the two axial ends of the transmission mechanism M. The first and second hydraulic servos 3 and 4 respectively include: first and second cylinders 30 and 40 of the stationary type, which are formed on the respective end walls 10a and 10b of the transmission case 10 and which confront each other; first and second pistons 31 and 41 which are slidably arranged in those cylinders 30 and 40, respectively, to define oil chambers 3C and 4C for receiving the oil pressure; and first and second bearings 32 and 42 which are arranged between the pistons 31 and 41 and the first and second clutches (C-1 and C-2), respectively, to allow relative rotation between the first and second pistons 31 and 41 and the first and second clutches (C-1 and C-2) and to transmit the axial forces, responsive to the feed of oil pressure, from the first and second pistons 31 and 41 to the first and second clutches (C-1 and C-2), respectively.

Figure 3:
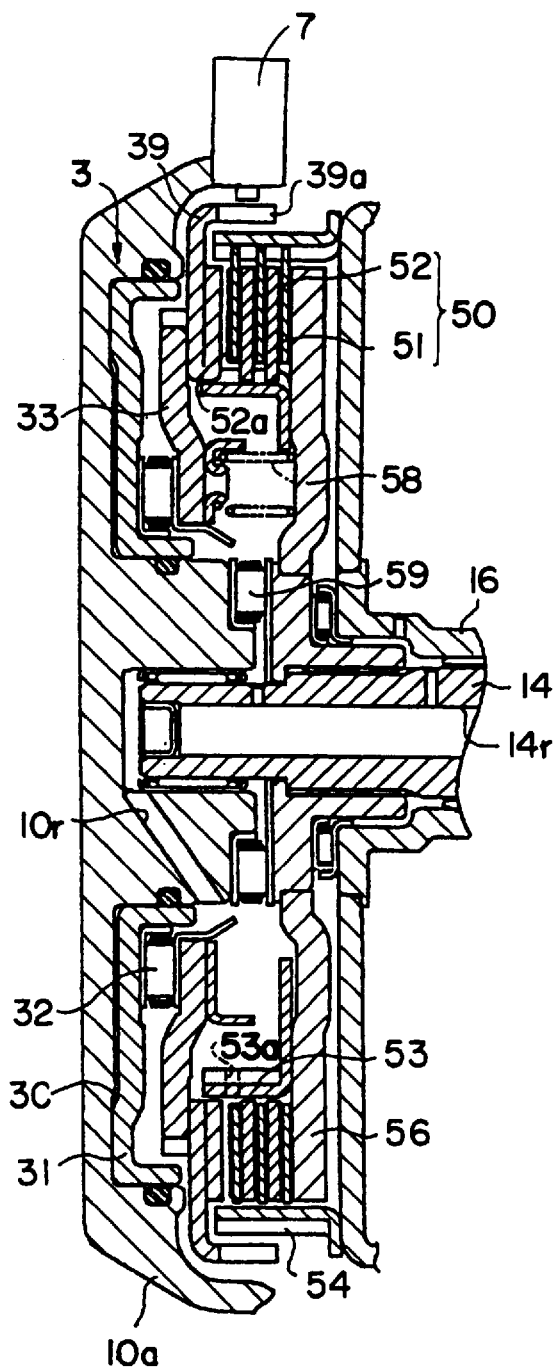
FIG. 3 is a sectional view showing a portion of one clutch and its hydraulic servo of the vehicular automatic transmission according to the first embodiment.
Figure 4:
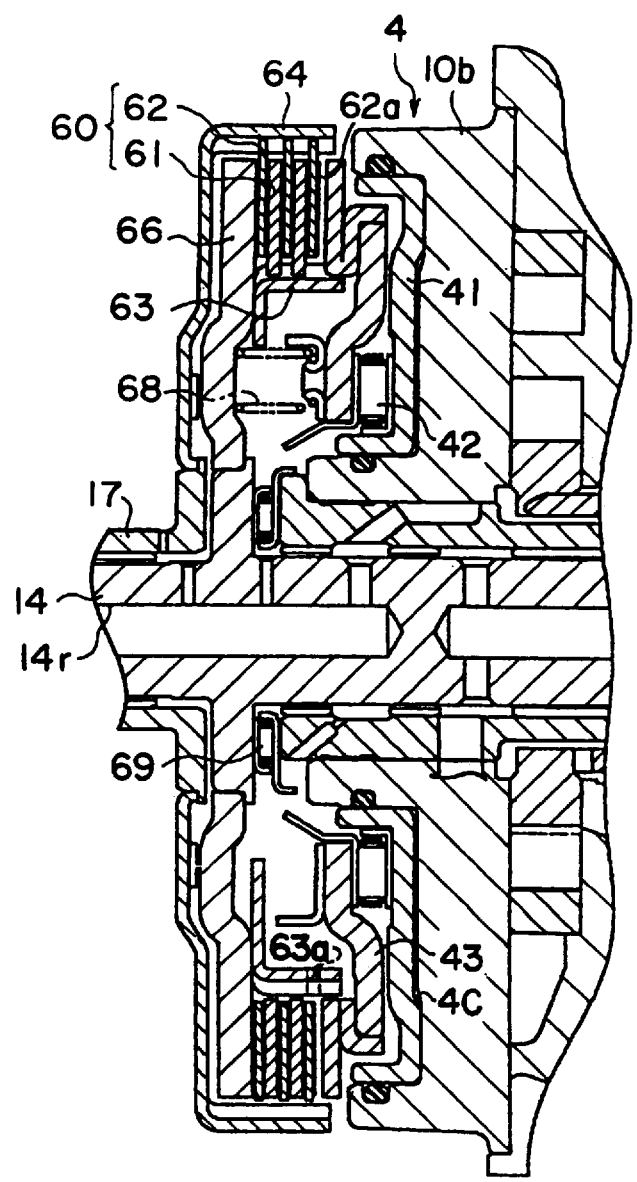
FIG. 4 is a sectional view showing a portion of the clutch and its hydraulic servo of the vehicular automatic transmission according to the first embodiment.

As shown in the detailed sectional views of FIGS. 3 and 4, the first and second hydraulic servos 3 and 4 further include, between the first and second bearings 32 and 42 and the first and second clutches (C-1 and C-2), thrust members 33 and 43 which are splined to the outer circumferences of hubs 53 and 63, respectively, and thereby held against relative rotation while allowed to axially slide; and first and second return springs 58 and 68 for applying axial forces in opposition the forward (clutch engaging) movements of the first and second pistons 31 and 41, responsive to the oil pressure fed to the oil chambers 3C and 4C. The first and second return springs 58 and 68 abut against the first and second thrust members 33 and 43 and against first and second flange portions 56 and 66, acting as reaction members, respectively.

The thrust members 33 and 43 confront the bearings 32 and 42 at a radially inward portion and the clutches (C-1 and C-2) at a radially outward portion. In the present embodiment, more specifically, the thrust members 33 and 43 have abutment portions, located at the radially outer side, against friction members 52 and 62, and the inner circumference of the abutment portions are splined, like separator plates 51 and 61, to the hubs 53 and 63 so as not to rotate relative to each other, while allowing relative sliding in the axial direction. The radially outer side of the abutment portion of one (associated with hydraulic servo 3 in the present embodiment) thrust member 33 carries a rotor portion 39 which has an axial extension covering the radially outerside of a rim 54 and which is formed with a plurality of notches 39a confronting a rotation sensor 7 mounted on the transmission case.

The input shaft 14 extends through the transmission mechanism M between the end walls 10a and 10b. The transmission mechanism M includes the first and second flange portions 56 and 66 which are so arranged adjacent to the first and second clutches (C-1 and C-2), respectively, that the axial forces from the first and second pistons 31 and 41 are transmitted thereto through the first and second clutches (C-1 and C-2), respectively. These flange portions 56 and 66 transmit the axial forces of the first and second pistons 31 and 41, respectively, to the input shaft 14. Thus, the abutting portions of the thrust members 33 and 34 and the flange portions 56 and 66 are confronted by friction members 52 and 62, respectively. Between the input shaft 14 and the respective end walls 10a and 10b are interposed third and fourth bearings 59 and 69 for regulating the axial movements of the input shaft 14 caused by the axial forces of the first and second pistons 31 and 41.

The first and second clutches (C-1 and C-2) include: the hubs 53 and 63 which are connected to the input shaft 14 through the first and second flange portions 56 and 66; and the annular rim 54 and a drum-shaped rim 64, which are drivably connected to the sun gear $S_1$ and the carrier $C_1$, respectively, through a sun gear shaft 16 and a carrier shaft 17, respectively. Rims 54 and 64 are arranged at the radially outer sides of the hubs 53 and 63 and are separated therefrom by friction plate portions 50 and 60.

The friction plate portions 50 and 60 of the first and second clutches (C-1 and C-2) include: a plurality of friction members 52 and 62 having friction facings 52a and 62a applied to their opposing faces; and a plurality of separator plates 51 and 61 arranged alternating with the friction members 52 and 62 in the axial direction. These friction members 52 and 62 are splined at their radially outer edges to the inner circumferential surfaces of the rims 54 and 64, and the separator plates 51 and 61 are splined at their radially inner edges to the outer circumferential surfaces of the hubs 53 and 63.

Hubs 53 and 63 have oil passages 53a and 63a therethrough for providing oil communication between the inner and outer circumferential surfaces of the hubs 53 and 63 for feeding lubricating oil from the radially inner surfaces of the hubs 53 and 63, to the friction plate portions 50 and 60.

As shown in FIGS. 3 and 4 an in-shaft oil passage 14r feeds the lubricating oil to the various portions of the transmission in cooperation with an in-housing oil passage 10r. The oil passage for feeding the working oil to the hydraulic servo 3 is not shown.

Reverting to FIG. 1, the automatic transmission T includes: a counter shaft 22 arranged in parallel with the output shaft 19a and drivably connected to the wheels 21a; a counter drive gear 19 integrally connected to the output shaft 19a; and a counter driven gear 23 meshing with the counter drive gear 19 and integrally connected to the counter shaft 23. The counter drive gear 19 is located between the first and second clutches (C-1 and C-2).

As shown in FIG. 1, the gear train of the automatic transmission T includes: a torque converter 12 having a lock-up clutch 11; three stages of planetary gear sets $M_1$, $M_2$ and $M_3$; brakes (B-OL, B-OH, B-1 and B-2); and the aforementioned clutches (C-1 and C-2). The planetary gear sets $M_1$ and $M_3$ are composed of sun gears $S_1$ and $S_3$, ring gears $R_1$ and $R_3$, and carriers $C_1$ and $C_3$ bearing pinion gears $P_1$ and $P_3$ meshing with them rotatably, and the planetary gear set $M_2$ is composed of a sun gear $S_2$, and a pinion gear $P_2$ meshing with the former and having a smaller diameter than that of the aforementioned pinion gear $P_1$. The pinion gear $P_2$ is rotatably borne by the carrier $C_1$ and is connected to the pinion gear $P_1$ in a manner prohibiting relative rotation therebetween. The respective ring gears $R_1$ and $R_3$ and carriers $C_3$ and $C_1$ of the two gear sets $M_1$ and $M_3$ are connected to each other, and the sun gear $S_1$ and the carrier $C_1$ of the gear set $M_1$ are connected as input elements through the clutches (C-1 and C-2), respectively, to the input shaft 14 leading to the turbine shaft 13 of the torque converter 12. The ring gear $R_1$ and the carrier $C_3$, which are connected to each other, are further connected through the output shaft 19a to the counter drive gear 19 acting as an output element.

Moreover, the sun gear $S_1$ of the gear set $M_1$ can be fixed on the transmission case 10 by the brake (B-OL), and the sun gear $S_3$ of the gear set $M_3$ can also be fixed on the transmission case 10 by the brake (B-1). The ring gear $R_3$, as connected to the carrier $C_1$, can also be fixed on the transmission case 10 by the brake (B-2). More specifically, in the present embodiment the sun gear $S_1$ is connected to the clutch (C-1) through the sun gear shaft 16 which is fitted around the input shaft 14; the carrier $C_1$ is connected to the clutch (C-2) through the carrier shaft 17 which is fitted around the input shaft 14; and the sun gear $S_3$ is connected to the brake (B-1) through a sun gear shaft 18 which is fitted around the carrier shaft 17. Moreover, the individual brakes are all band brakes except for brake (B-2) which is a wet type multiple disk brake, although not limited thereto. Incidentally, the counter drive gear 19 of this embodiment is connected through a counter gear 20 to a differential unit 21 to provide a horizontal structure for the transmission.

Under the control of the hydraulic control system (not shown), oil pressures are fed to the hydraulic servos associated with the various individual clutches and brakes, to apply (as indicated by symbols ○) and release (as indicated by blanks) them and to thereby establish the individual gear stages, as tabulated in FIG. 2. Specifically, the first speed (1ST) is established when the clutch (C-1) and the brake (B-1) are applied. At this stage, the rotation of the input shaft 14 is transmitted through the clutch (C-1) to the sun gear $S_1$ and is output as the rotation of the carrier $C_3$, which is decelerated by the fixation of the sun gear $S_3$, by application of the brake (B-1), to the counter drive gear 19. On the other hand, the second speed (2ND) is established when the clutch (C-2) and the brake (B-1) are applied. At this stage, the input is through the clutch (C-2) to the carrier shaft 17 and from the carrier shaft 17 is introduced as is through the carrier $C_1$ into the ring gear $R_3$, until it is output as the differential rotation of the carrier $C_3$, which exemplifies a reaction element with the sun gear $S_3$ fixed by the applied brake (B-1), to the counter drive gear 19. The third speed (3RD) is established by the direct connection of the first planetary gear set $M_1$, as achieved by the application of the two clutches (C-1 and C-2). At this stage, the rotation of the input shaft 14 is output, as is, as the rotation of the carrier $C_3$, to the counter drive gear 19.

The fourth speed (4TH) (overdrive) is established when the clutch (C-2) and the brake (B-OL) for fixing the sun gear $S_1$ are applied. At this stage, the rotation of the input shaft 14 is transmitted as the rotation of the ring gear $R_1$, which is accelerated by the revolution of the pinion gear $P_1$ with respect to the rotation of the carrier $C_1$, from the carrier $C_3$ to the counter drive gear 19. On the other hand, the fifth speed is established when the clutch (C-2) and the brake (B-OH) are applied. At this stage, the rotation of the input shaft 14 is transmitted as the rotation of the ring gear $R_1$, which is accelerated by the revolution of the radially smaller pinion gear $P_2$, exerting a reaction force upon the radially larger sun gear $S_2$, to a greater extent than in establishing the fourth speed, and is output from the carrier $C_3$ to the counter drive gear 19.

Incidentally, reverse (REV) is established when the clutch (C-1) and the brake (B-2) are applied. At this stage, the rotation of the ring gear $R_1$, as decelerated and reversed from the input of the sun gear $S_1$ by the fixation of the carrier $C_1$, is output through the carrier $C_3$ from the counter drive gear 19.

When the oil chambers 3C and 4C are fed with the oil pressure from the in-housing oil passage (not shown), the pistons 31 and 41 are actuated. Since the bearings 32 and 42 and the thrust members 33 and 43 are interposed between the pistons 31 and 41 and the clutches (C-1 and C-2) according to the invention, these clutches (C-1 and C-2) can transmit the axial forces from the pistons 31 and 41 to the friction plate portions 50 and 60 while allowing relative rotation between themselves and the pistons 31 and 41.

In these operations, the axial force from the piston 31 of the first hydraulic servo 3 is transmitted through the bearing 32, the thrust member 33 and the friction plate portion 50 of the first clutch (C-1) to the first flange portion 56, from which the axial force is further transmitted through the input shaft 14 to the second hydraulic servo 4. This axial force is finally transmitted to the case end wall 10b at the opposite end through the fourth bearing 69 which is associated with the second hydraulic servo 4 between the input shaft 14 and the case end wall 10b. On the other hand, the reaction force which is reverse to the axial force of the piston 31, acts upon the case end wall 10a, where the first hydraulic servo 3 is located. As a result, the axial force of the piston 31 and the reaction force in the reverse direction are transmitted to both the case end walls 10a and 10b, i.e., to the transmission case 10, so that they offset each other. This function is likewise achieved in the second hydraulic servo 4. Thus, the axial forces from the two pistons 31 and 41 are prevented from influencing operation of the transmission mechanisms. In addition, both the flange portions 56 and 66 themselves function as the equivalent of the backing plates of the clutches of the prior art with regard to bearing the aforementioned axial forces while also functioning as power transmission members for drivably connecting the input shaft 14 to the hubs 53 and 63.

The foregoing design allows the size of the system to be reduced, and the weights of the sun gear shaft 16, the carrier shaft and related components can be reduced to lighten the shift shocks due to inertia torque at the time of a shift. Moreover, the feed of the oil pressure to the oil chambers 3C and 4C will not adversely affect the hydraulic control characteristics, as might otherwise be caused at the time of a shift by the establishment of centrifugal oil pressure, because the cylinders 31 and 41 are stationary, i.e. formed in the transmission case 10.

Thanks to the aforementioned simple reaction force supporting structure, moreover, the axial forces from the first and second hydraulic servos 3 and 4 to the first and second clutches (C-1 and C-2) are not applied to each other, so that the control of these two clutches is simplified.

The return springs 58 and 68, interposed between the flange portions 56 and 66 (serving as the reaction members) and the thrust members 33 and 43, act to retain a constant clearance 10 between the friction members 51 and 61 of the friction plate portions 50 and 60 of the clutches and the separator plates 52 and 62, against exterior axial forces when the clutches are released, so that controllability of the clutches can be maximized and the shift shocks can be minimized.

Furthermore, the friction members 51 and 61 of the clutches (C-1 and C-2) are splined to the rims 54 and 64, and the separator plates 52 and 62 are splined to the hubs 53 and 63 which are shared with the thrust members 33 and 43. Because these thrust members 33 and 43 and the flange portions 56 and 66 confront each other, the axial dimension can be shortened by utilizing the flange portions 56 and 66 as the backing plates. Further, flanges 56 and 66 do not require any special axial stop. In addition, it is unnecessary to make the backing plates thicker to prevent loss of the friction characteristics.

Furthermore, since both the hydraulic servos 3 and 4 are arranged at the ends of the transmission case 10, the rotation of the input shaft 14 can be transmitted to the outer circumferential side of the clutches, through the thrust members 33 and 43, with the hubs 53 and 63 fixed to the input shaft 14 at the inner circumferential side of the clutches. The rotation of the notches 39a of the rotor portion 39 is detected as pulses by the rotation sensor 7 so that the r.p.m. of the input shaft 14 can be continuously monitored, regardless of whether the clutch (C-1) is applied or released.

Furthermore, the hubs 53 and 63 of the clutches (C-1 and C-2) always rotate with the input shaft 14 so that the oil, fed from the in-shaft oil passage 14r at the radially inner side, is stably fed by the centrifugal force to the friction plate portions 50 and 60 via the oil passages 53a and 63a of the hubs 53 and 63, to provide the lubricating and cooling functions.

Because the shift output is transmitted through the counter shaft 22 arranged in parallel with the input shaft 14, the shift output can be extracted at the counter driven gear 23 without any interference with the input shaft 14, in spite of the input clutches (C-1 and C-2) being arranged at the two ends of the input shaft 14 extends between the two end portions of the transmission T.

Furthermore, since the transmission mechanism M can establish the five forward and one reverse stages with only two clutches and, further, because of a compact hydraulic servo structure of the stationary cylinder type in which the two clutches are arranged at the two ends of the transmission case 10, the overall structure of the system can be made more compact.

Figure 5:
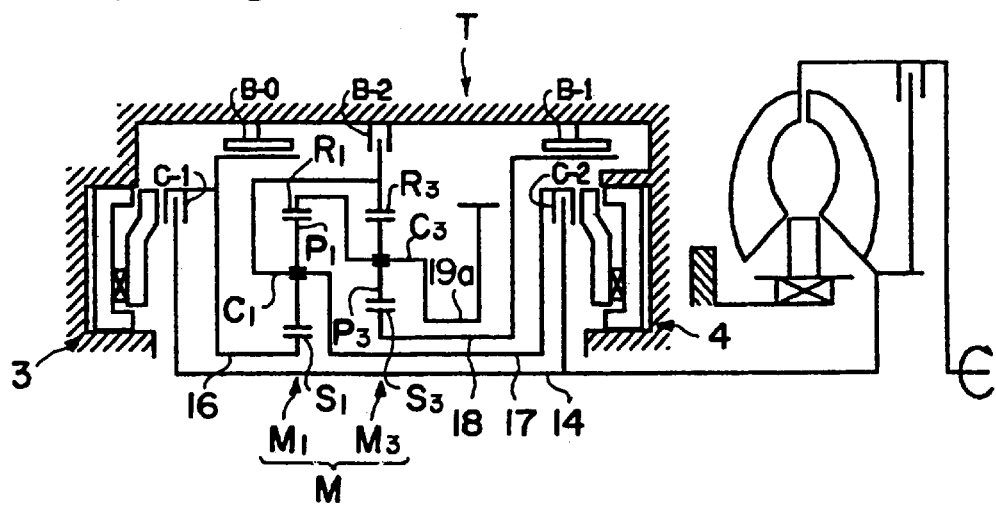
FIG. 5 is a schematic diagram showing the entire structure of a vehicular automatic transmission according to a second embodiment of the invention.

In a second embodiment, shown in FIG. 5, the forward gear stages are limited to four by eliminating the planetary gear set $M_2$ of the first embodiment. Due to this change, the brake (B-OH) for braking the sun gear $S_2$ of the gear set $M_2$ is eliminated, and the brake corresponding to the aforementioned brake (B-OL) is exemplified by a brake (B-O). The remaining structure is similar to that of the first embodiment so that description of the identical structure of the individual portions is omitted and corresponding members are designated by the same reference numerals or letters.

In this embodiment the forward gear stages are four in number, as described above, and the applying/releasing of the frictional engagement elements and the power transmission paths at the individual gear stages, including the reverse, are similar to those of the foregoing first embodiment. Hence, the description of the operations is as in the table of FIG. 2 but the brake (B-OL) is changed to the brake (B-O).

Figure 6:
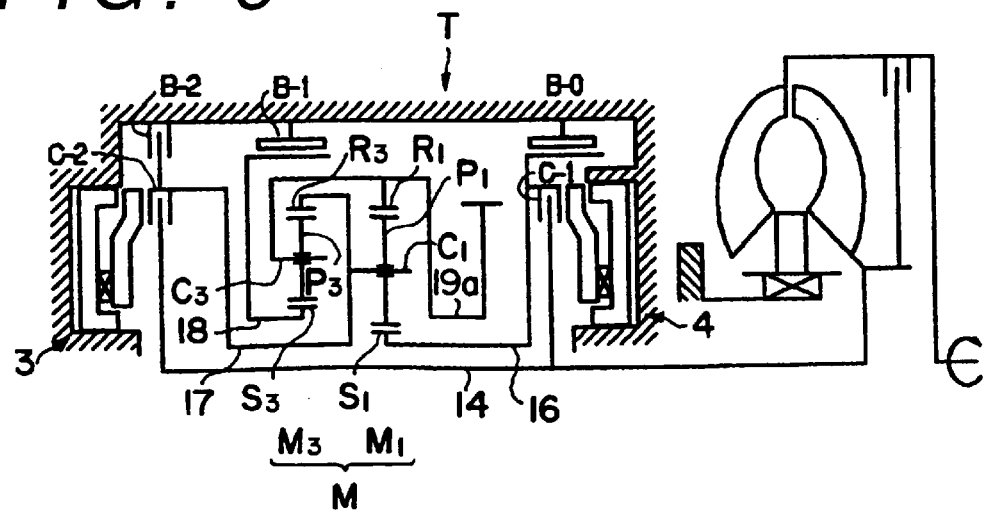
FIG. 6 is a schematic diagram showing the entire structure of a vehicular automatic transmission according to a third embodiment of the invention.

FIG. 6 is a schematic diagram showing a third embodiment of the invention. In this third embodiment, the transmission mechanisms substantially similar to those of the second embodiment are longitudinally reversed together with the two clutches (C-1 and C-2) with respect to the transmission case. The descriptions of the structures of the individual components are omitted and such components are designated by similar reference numerals and/or letters. In this embodiment, the relations of the operations and power transmission paths of the individual frictional engagement elements, as well as the effects obtained, are similar to those of the second embodiment.

Figure 7:
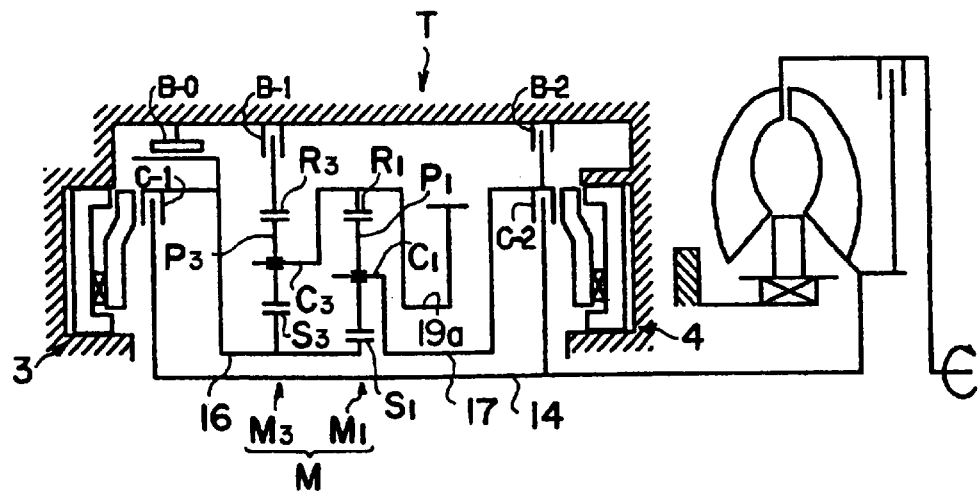
FIG. 7 is a schematic diagram showing the entire structure of a vehicular automatic transmission according to a fourth embodiment of the invention.

FIG. 7 is a schematic diagram showing a fourth embodiment of the invention. According to this fourth embodiment, the connections of the transmission elements of the two planetary gear sets $M_1$ and $M_2$ are modified from those of the foregoing embodiments. In this embodiment, the sun gears $S_1$ and $S_2$ are directly connected to each other, and the carrier $C_3$ of one planetary gear set and the ring gear $R_1$ of the other are directly connected to each other. With this structure, too, the applied and released relationships of the frictional engagement elements and the gear stages established are identical to those of the foregoing second and third embodiments. In the case of this embodiment: the first speed is the output of the carrier $C_3$ with input through the sun gear $S_3$ and reaction of the ring gear $R_3$; the second speed is the output of the carrier $C_3$ with input of the carrier $C_1$ and the reaction of the ring gear $R_3$; the third speed is the output of the ring gear $R_1$ by the direct connection of the planetary gear set $M_1$; and the fourth speed is the over-drive output of the ring gear $R_1$ with input of the carrier $C_1$ and reaction of the sun gear $S_1$. This fourth embodiment provides effects similar to those of the first embodiment.

Figure 8:
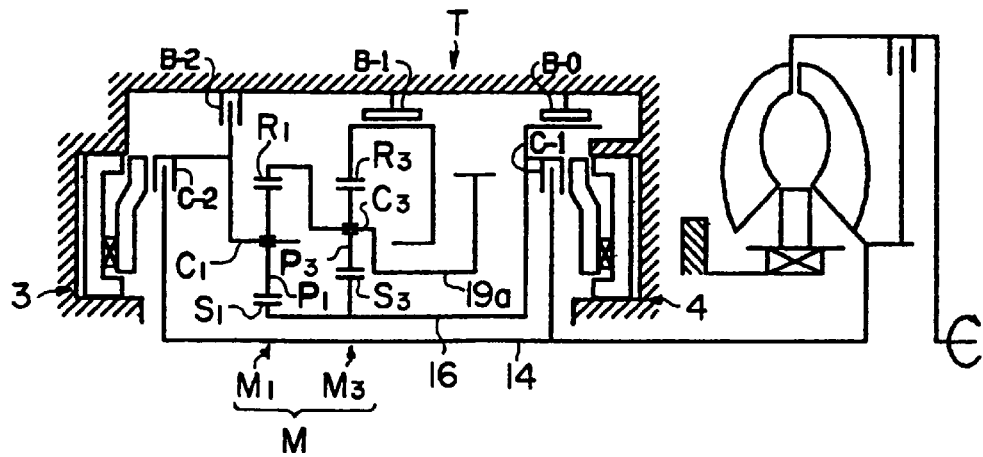
FIG. 8 is a schematic diagram showing the entire structure of a vehicular automatic transmission according to a fifth embodiment of the invention.

FIG. 8 is a schematic diagram showing a fifth embodiment of the invention. In this embodiment, the transmission mechanisms are substantially similar to those of the fourth embodiment but are longitudinally reversed together with the two clutches with respect to the transmission case. Even with this structure, the applied and released relationships and the power transmission paths of the frictional engagement elements are identical to those of the aforementioned fourth embodiment and the effects are similar to those of the first embodiment.

Figure 9:
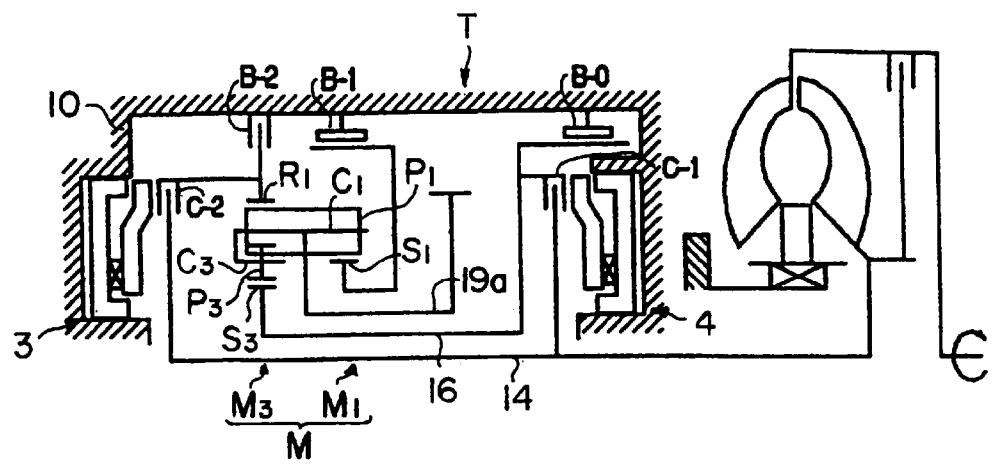
FIG. 9 is a schematic diagram showing the entire structure of a vehicular automatic transmission according to a sixth embodiment of the invention.

FIG. 9 is a schematic diagram of a sixth embodiment of the invention. This sixth embodiment employs a Ravignaux gear mechanism as the transmission mechanism M, which includes: the first planetary gear set $M_1$ composed of the sun gear $S_1$, the ring gear $R_1$ and the pinion gear $P_1$ rotatably supported by the carrier $C_1$ and meshing with them; and the second planetary gear set $M_3$ composed of the sun gear $S_3$, the ring gear $R_1$ shared with the first planetary gear set $M_1$, the pinion gear $P_1$ shared with the first planetary gear set $M_1$, and the pinion gear $P_3$ meshing with the pinion gear $P_1$ and the sun gear $S_3$, such that the carrier $C_1$ on which the pinion gear $P_1$ is rotatably mounted and the carrier $C_3$ on which the pinion gear $P_3$ is rotatably mounted are connected to each other. The sun gear $S_3$ is drivably connected to the input shaft 14 through the clutch (C-1) and can be fixed on the case 10 by the brake (B-O); the ring gear $R_1$ is drivably connected to the input shaft 14 through the clutch (C-2); and the carrier $C_1$ is connected to the output shaft 19a. The sun gear $S_2$ can be fixed on the case 10 by the brake (B-1), and the ring gear $R_1$ can be fixed on the case 10 by the brake (B-2). The remaining structure is similar to the aforementioned first embodiment so that the description of the structure of such individual components is omitted and such components are designated by similar reference numerals or letters.

The relationship between the applied and released states of the individual clutches and brakes and the gear stages established are identical to those of the second embodiment. Therefore, the following description will be limited to the power transmission between the individual transmission elements. In first speed, the input of the sun gear $S_3$ is transformed into the output of the carrier $C_1$ by the rotations of the pinion gears $P_1$ and $P_3$ meshing with each other while using the sun gear $S_1$ as the reaction element. In second speed, the input of the ring gear $R_1$ is transformed into the output of the carrier $C_1$ by the rotations of the pinion gears $P_1$ and $P_3$ meshing with each other while using the sun gear $S_1$ as the reaction element. In third speed, the inputs of the sun gear $S_3$ and the ring gear $R_1$ are used, as they are, as the output of the carrier $C_1$ by connecting the planetary gear set $M_3$ directly. In fourth speed, for over-drive, the sun gear $S_3$ acts as the reaction element against the input of the ring gear $R_1$ so that the rotation, as accelerated by the rotation of the pinion gear $P_1$, is output to the carrier $C_1$. With this transmission mechanism and arrangements of the individual clutches and brakes, it is also possible to provide effects similar to those of the aforementioned first embodiment.

Figure 10:
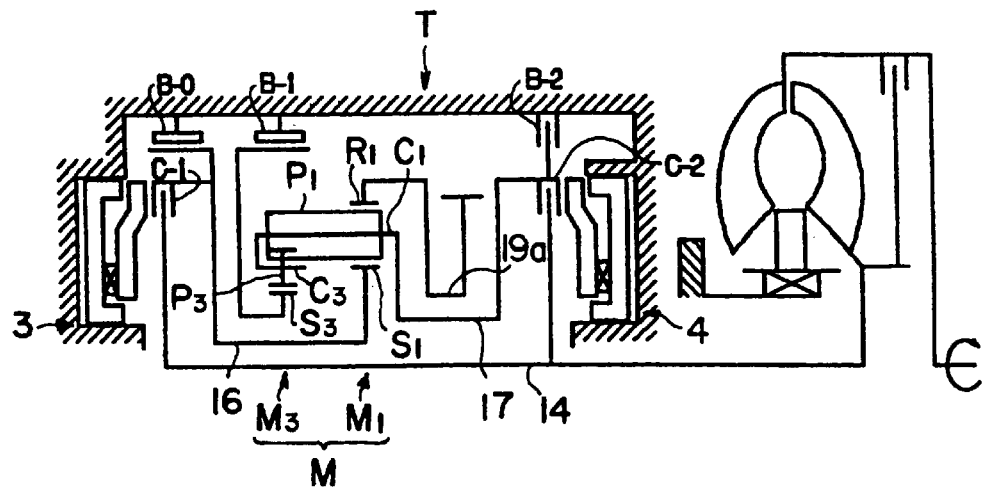
FIG. 10 is a schematic diagram showing the entire structure of a vehicular automatic transmission according to a seventh embodiment of the invention.

FIG. 10 is a schematic diagram showing a seventh embodiment of the invention. In this seventh embodiment, the input/output of transmission mechanism is substantially similar to that of the sixth embodiment but is reversed. Specifically, in first speed, the input of the sun gear $S_1$ is transferred to the ring gear $R_1$ by the rotations of the pinion gears $P_1$ and $P_3$ which mesh with each other while using the sun gear $S_3$ as the reaction element. In second speed, the input of the carrier $C_1$ is transformed into the output of the ring gear $R_1$ by the rotations of the pinion gears $P_1$ and $P_3$ which mesh with each other while using the sun gear $S_3$ as the output element. In third speed, the inputs of the sun gear $S_1$ and the carrier $C_1$ become, without change, the output of the ring gear $R_1$ with the first planetary gear set $M_1$ directly connected. In fourth speed, for over-drive, the sun gear $S_1$ acts as the reaction element against the input of the carrier $C_1$ so that the rotation, as accelerated by the rotation of the planetary gear $P_1$, is output at the ring gear $R_1$. With this structure also, it is possible to provide effects similar to those of the aforementioned sixth embodiment.

Figure 11:
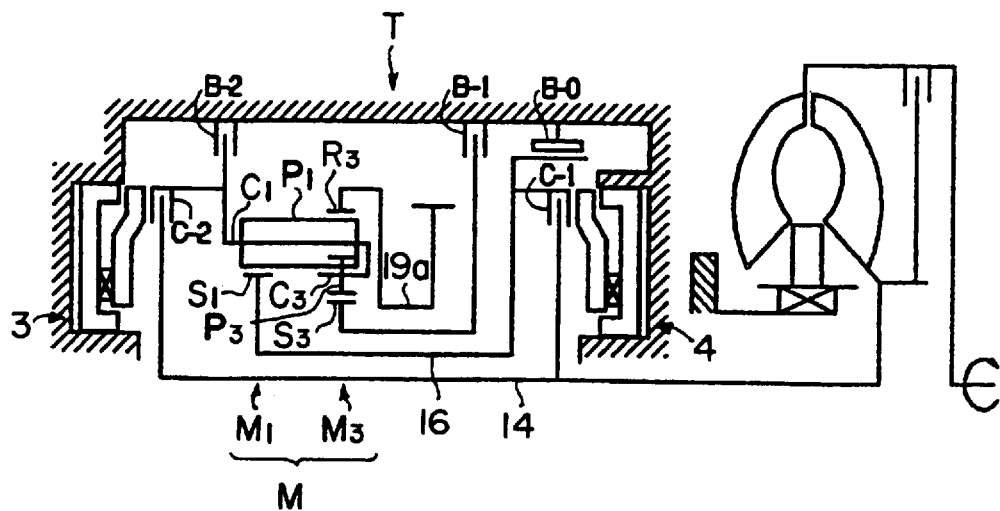
FIG. 11 is a schematic diagram showing the entire structure of a vehicular automatic transmission according to an eighth embodiment of the invention.

FIG. 11 shows an eighth embodiment of the invention. In this eighth embodiment, the transmission mechanisms are substantially similar to those of the seventh embodiment but are longitudinally reversed together with the two clutches, relative to the transmission case. This embodiment provides effects and functions similar to those of the aforementioned seventh embodiment.

Figure 12:
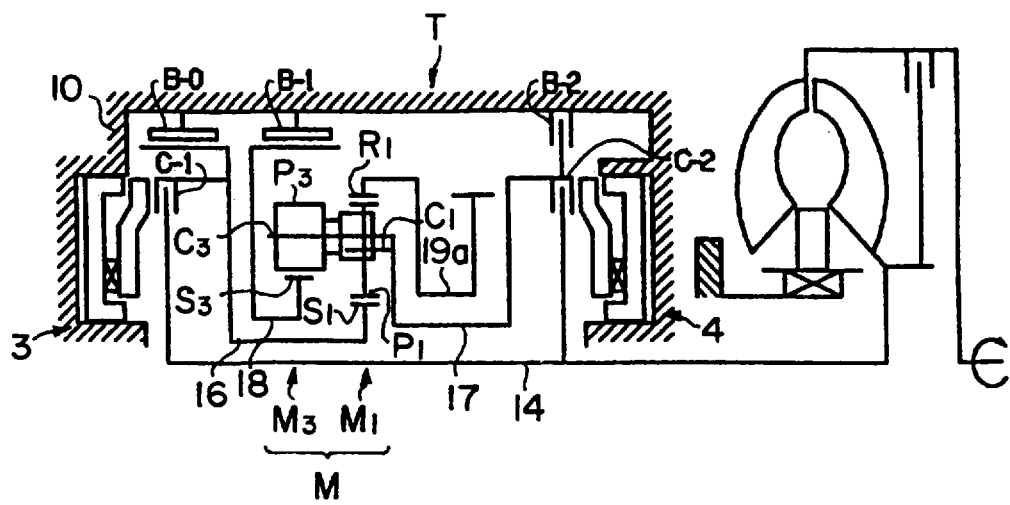
FIG. 12 is a schematic diagram showing the entire structure of a vehicular automatic transmission according to a ninth embodiment of the invention.

FIG. 12 is a schematic diagram showing a ninth embodiment of the invention. This embodiment employs a Ravignaux gear mechanism, different from that of the eighth embodiment, as the transmission mechanism M. This Ravignaux gear mechanism includes: the first planetary gear set $M_1$ composed of the sun gear $S_1$, the ring gear $R_1$ and the pinion gear $P_1$ rotatably supported by the carrier $C_1$ and meshing with them; and the second planetary gear set $M_3$ composed of the sun gear $S_3$, the stepped pinion gear $P_3$ meshing with the pinion gear $P_1$ and the sun gear $S_3$, and the carrier $C_3$ connected to the carrier $C_1$ rotatably supporting the pinion gear $P_1$, which in turn rotatably supports the pinion gear $P_3$. The sun gear $S_1$ is drivably connected to the input shaft 14 through the clutch (C-1) and can be fixed on the case 10 by the brake (B-O); the carrier $C_1$ is drivably connected to the input shaft 14 through the clutch (C-2); and the ring gear $R_1$ is connected to the output shaft 19a. The sun gear $S_3$ can be fixed on the case 10 by the brake (B-1), and the carrier $C_1$ can be fixed on the case 10 by the brake (B-2). The remaining structure is similar to that of the first embodiment so that the description of the structure of the individual members is omitted and the corresponding members are designated by similar reference numerals or letters.

With this structure also, the forward gear stages provide four speeds. In this embodiment applied and released state relationships of the individual clutches, and brakes and the gear stages established, are identical to those of the aforementioned second embodiment. With this embodiment, in first speed, the input of the sun gear $S_1$ is transformed into the output of the ring gear $R_1$ by the rotations of the pinion gears $P_1$ and $P_3$ meshing with each other while using the sun gear $S_3$ as the reaction element. In second speed, the input of the carrier $C_1$ is transformed into the output of the ring gear $R_1$ by the rotations of the pinion gears $P_1$ and $P_3$ meshing with each other while using the sun gear $S_3$ as the reaction element. In third speed, the inputs of the sun gear $S_1$ and the carrier $C_1$ are transformed, without change, into output of the ring gear $R_1$ by connecting the first planetary gear set $M_1$ directly. In fourth speed, for over-drive, the sun gear $S_1$ acts as the reaction element against the input of the carrier $C_1$ so that the rotation, as accelerated by the rotation of the pinion gear $P_1$, is output at the ring gear $R_1$. This embodiment also provides effects similar to those of the first embodiment.

Figures 13, 14:
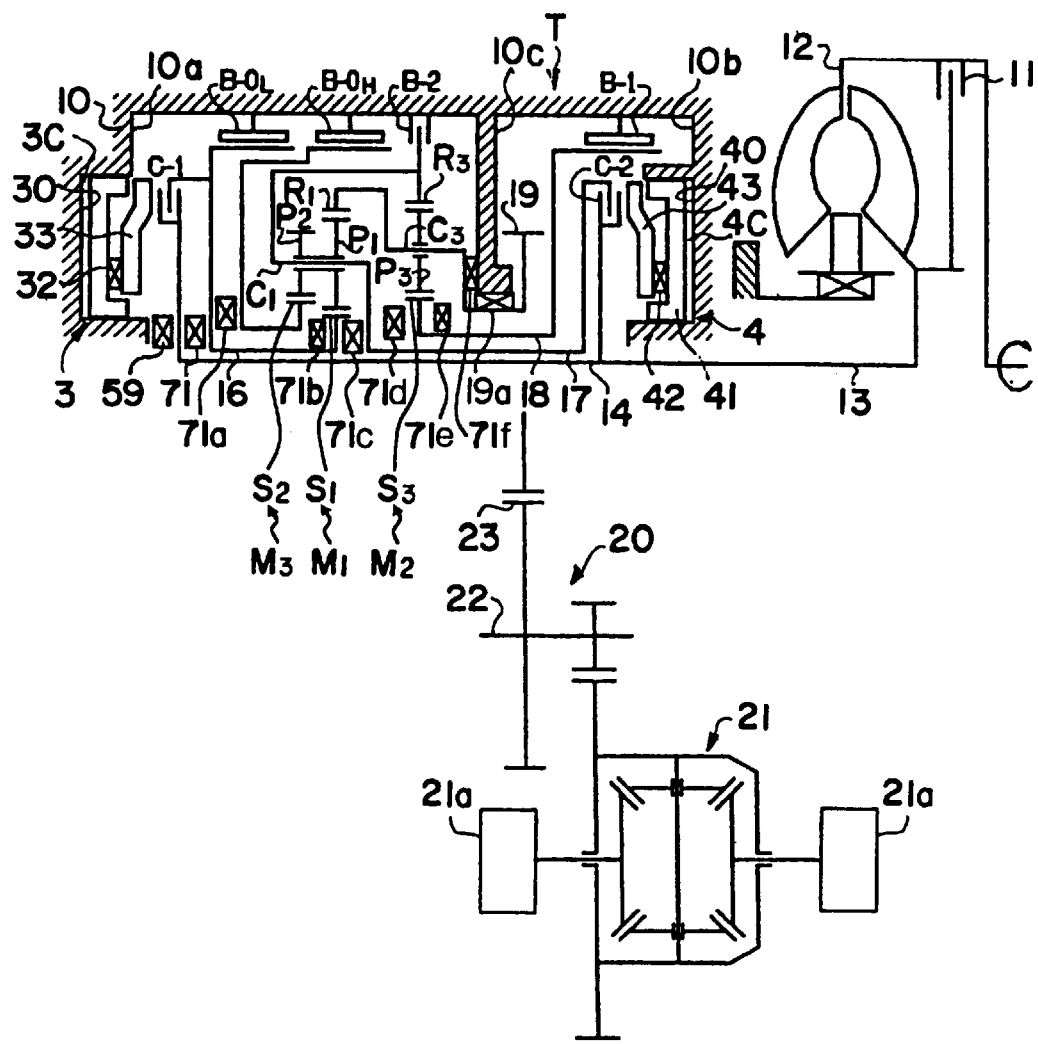
FIG. 13 is a schematic diagram showing the entire structure of a vehicular automatic transmission according to a tenth embodiment of the invention.
FIG. 14 is a table of operations of the aforementioned transmission.

FIG. 13 is a schematic diagram showing a vehicular automatic transmission T according to a tenth embodiment of the invention. This tenth embodiment has a gear train structure substantially similar to that of the foregoing first embodiment but is different in the reaction receiving structure. In this embodiment, the axial force applied to the clutch (C-1) is borne by an intermediate wall 10c which supports the output shaft 19a through a multiple stage thrust bearing interposed in the transmission mechanism M. The reason for adopting this reaction support structure will be described by comparison with the first embodiment. With axial forces in the two opposing directions, as transmitted from one clutch to the opposing clutch (C-1 and C-2) by the common input shaft 14 in the first embodiment and then to the case end walls 10a and 10b, the clutches become difficult to control because the axial force of one clutch influences operation of the other clutch in a so-called "clutch-to-clutch" shift, e.g. from the first speed (1ST) to the second speed (2ND) or vice versa, as seen from FIG. 2, in which one clutch is applied while the other is released. As an alternative to the "clutch-to-clutch" interference of the first embodiment, in the tenth embodiment, the axial force received by the clutch (C-2) from clutch (C-1) through input shaft 14 is likewise borne by the end wall 10b of the transmission case, and the axial force received by the clutch (C-1) through input shaft is borne by the intermediate wall 10c, which supports the output shaft 19a, through a multiple-stage thrust bearing.

Figure 15:
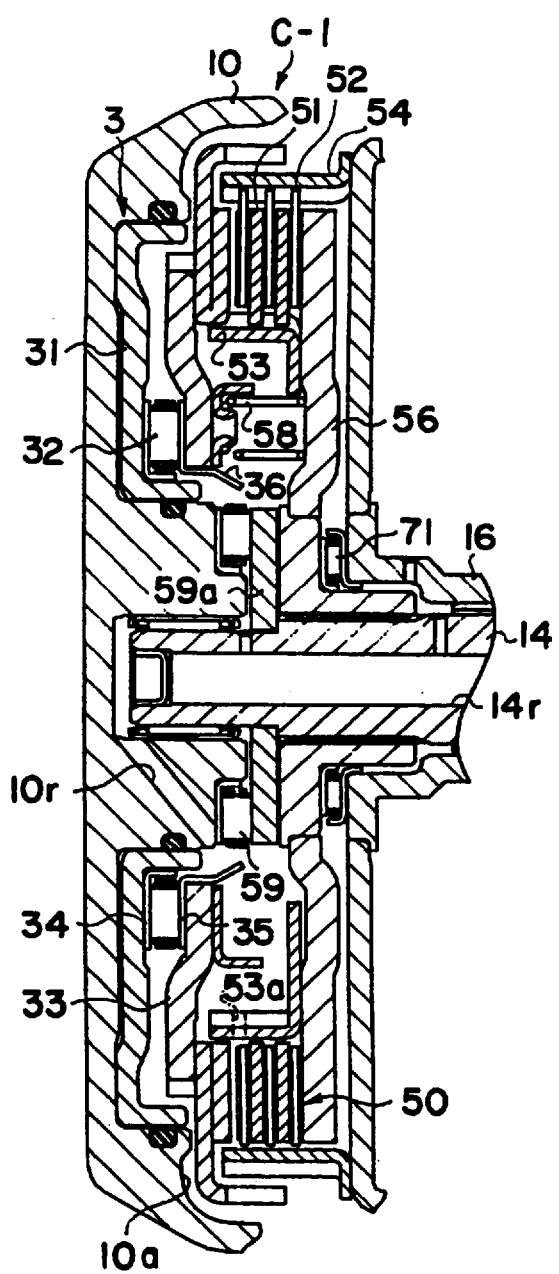
FIG. 15 is a sectional view of a portion of one clutch and its hydraulic servo of the vehicular automatic transmission according to the tenth embodiment.

In the tenth embodiment, the structure relating to the clutch (C-2) is essentially similar to that of the foregoing embodiments, as shown in detail in FIG. 4. As shown in detail in FIG. 15, on the other hand, the structure adopted for the clutch (C-1) is slightly different due to the difference in the structure bearing the reaction force. Specifically, the flange portion 56 is splined to the input shaft 14 thereby preventing relative rotation while allowing sliding movement therebetween. On the input shaft 14 a flange 59a, which acts as a reaction member, abuts against the step (shoulder) formed on the input shaft 14. This flange 59a transmits the axial force from the clutch (C-2), as received through the input shaft 14, to the end wall 10a through the thrust bearing 59 which is interposed between the flange 59a and the end wall 10a of the case 10. On the other hand, the axial force of the clutch (C-1) is transmitted, not to the aforementioned flange 59a, but to the sun gear shaft 16 from the flange portion 56 through a thrust bearing 71 and is finally received by the intermediate wall 10c through the individual thrust bearings 71a, 71b, 71c, 71d, 71e and 71f which are arranged in the transmission mechanism M, as shown in FIG. 13.

In this tenth embodiment, therefore, the input shaft 14, together with the flange portion 56 of the transmission mechanism M and the flange 59a, acts as the reaction member against the clutch (C-2), and the transmission mechanism M, together with the flange portion 56, acts as the reaction member against the clutch (C-1). The remaining structural components are similar to those of the aforementioned first embodiment, and the descriptions of those individual components will be omitted and they will be designated by corresponding reference numerals or letters.

In this tenth embodiment, the individual gear stages are similar to those of the aforementioned first embodiment, as tabulated in the operational table of FIG. 14. In the aforementioned clutch-to-clutch shift, no influence of the axial force of one clutch is exerted upon the other clutch through the input shaft 14. Thus, this embodiment is especially advantageous in the hydraulic control of the clutches (C-1 and C-2). The remaining effects are similar to those of the first embodiment.

Figure 16:
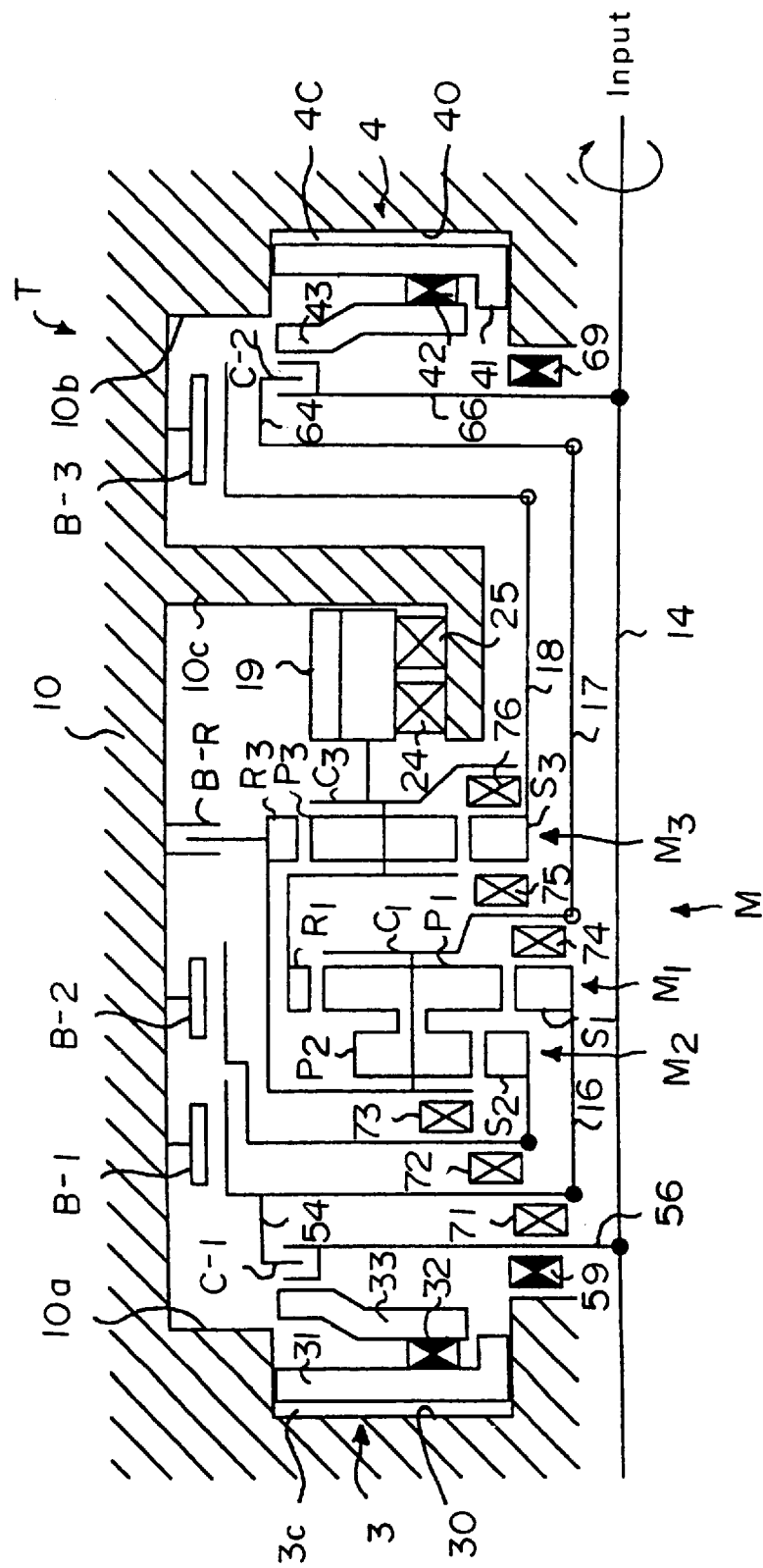
FIG. 16 is a schematic diagram showing an automatic transmission according to an eleventh embodiment of the invention.

FIG. 16 shows the gear train of an automatic transmission according to an eleventh embodiment. As shown in FIG. 16, the automatic transmission T includes: a transmission case 10; a speed change mechanism M mounted in the transmission case 10 and including two input elements (i.e., the sun gear $S_1$ and the carrier $C_1$ of a first planetary gear set $M_1$) and one output element (i.e., a carrier $C_3$ of a third planetary gear set $M_3$ connected to the ring gear $R_1$ of the same first planetary gear set $M_1$); and an input shaft 14 extending from one end to the other end of the transmission case 10 through the speed change mechanism M. First and second input clutches (C-1 and C-2) are arranged at the two ends with the speed change mechanism M inbetween and serve to connect/disconnect the individual input elements $S_1$ and $C_1$ to and from the input shaft 14. Two hydraulic servos 3 and 4 are provided for applying/releasing the individual input clutches (C-1 and C-2).

The transmission case 10 has an intermediate wall 10c between its two end walls 10a and 10b. The intermediate wall 10c supports a counter drive gear 19 acting as an output gear through bearings 24 and 25, such as tapered roller bearings or angular ball bearings capable of supporting a thrust force, so that the output rotation can be taken out from between the two input clutches (C-1 and C-2). The essential portion of the speed change mechanism M, including the planetary gear sets, is mounted between the intermediate wall 10c and one end wall 10a. In this embodiment, the speed change mechanism M includes three planetary gear sets $M_1$, $M_2$ and $M_3$, four brakes (B-1, B-2, B-3 and B-R), and members for connecting them to achieve five forward speeds and one reverse speed.

The two hydraulic servos 3 and 4 are of the stationary cylinder type, with cylinders 30 and 40 formed in the two end walls 10a and 10b of the transmission case 10, and are arranged in association with the individual input clutches (C-1 and C-2). By the actions of the individual hydraulic servos 3 and 4, the axial forces applied to the individual input clutches (C-1 and C-2) are transmitted to the opposite walls of the transmission case 10, i.e. respectively opposed to the individual hydraulic servos 3 and 4, by the reactions members which extend from the individual input clutches to the opposite walls of the transmission case 10. These walls of the transmission case 10, respectively opposed to the individual hydraulic servos 3 and 4, are exemplified by the one end wall 10a and the other end wall 10b. The reaction members, which include the input shaft 14, form a common axial force transmitting line between the two input clutches (C-1 and C-2).

The two hydraulic servos 3 and 4 of this eleventh embodiment include: the stationary type two cylinders 30 and 40 confronting the individual end walls 10a and 10b of the transmission case 10; two pistons 31 and 41 slidably arranged in cylinders 30 and 40 to define oil chambers 3C and 4C which receive the oil pressure; and bearings 32 and 42 individually arranged between the pistons 31 and 41 and the first and second clutches (C-1 and C-2) to allow relative rotation between the individual pistons 31 and 41 and the first and second clutches (C-1 and C-2) and to transmit the servo forces from the individual pistons 31 and 41, responsive to the feed of the oil pressure, to the first and second clutches (C-1 and C-2).

The input shaft 14 has flange portions 56 and 66 which are arranged adjacent to the first and second clutches (C-1 and C-2) so that the servo forces from the individual pistons 31 and 41 are individually transmitted to the flange portions 56 and 66 through the first and second clutches (C-1 and C-2). These flange portions 56 and 66 are individually connected to the input shaft 14 so as to transmit the servo forces from the pistons 31 and 41. Between the input shaft 14 and the individual end walls 10a and 10b, are interposed bearings 59 and 69 for regulating the axial movement of the input shaft in response to the servo forces from the pistons 31 and 41.

The speed change mechanism M of the eleventh embodiment includes three stages of planetary gear sets $M_1$, $M_2$ and $M_3$, and associated brakes (B-1, B-2, B-3 and B-R) and the clutches (C-1 and C-2). The two planetary gear sets $M_1$ and $M_3$ are individually composed of sun gears $S_1$ and $S_3$, ring gears $R_1$ and $R_3$, and the carriers $C_1$ and $C_3$ which rotatably support pinion gears $P_1$ and $P_3$ meshing with them. The planetary gear set $M_2$ is composed of a sun gear $S_2$ and a pinion gear $P_2$ meshing with sun gear $S_2$ and having a smaller diameter than that of the aforementioned pinion gear $P_1$. The pinion gear $P_2$ is rotatably supported by the carrier $C_1$ but connected to the pinion gear $P_1$ in a manner preventing relative rotation therebetween. The ring gears $R_1$ and $R_3$ and the carriers $C_3$ and $C_1$ of the individual two gear sets $M_1$ and $M_3$ are connected to each other, and the sun gear $S_1$ and the carrier $C_1$ of the gear set $M_1$ are individually connected through the clutches (C-1 and C-2) to the input shaft 14 so that they may act as input elements. The ring gear $R_1$ and the carrier $C_3$, which are connected to each other, are also connected to the counter drive gear 19 acting as an output gear.

The sun gear $S_1$ of the gear set $M_1$ can be braked to the transmission case 10 by the brake (B-1), and the sun gear $S_2$ of the gear set $M_2$ can also be braked on the transmission case 10 by the brake (B-2). The ring gear $R_3$, connected to the carrier $C_1$, can be fixed to the transmission case 10 by the brake (B-R). Moreover, the sun gear $S_1$ is connected to a drum 54 of the clutch (C-1) through a sun gear shaft 16 which is fitted around the input shaft 14. The carrier $C_1$ is connected to the clutch (C-2) through a carrier shaft 17 which is fitted around the input shaft 14, and the sun gear $S_3$ is connected to the brake (B-3) through a sun gear shaft 18 which is fitted around the carrier shaft 17. In addition, the individual brakes, excepting the brake (B-R), are all band brakes, whereas the brake (B-R) is a multi-disc type or meshing type, although not especially limited thereto.

Incidentally, in this speed change mechanism M, individual thrust bearings 71 to 76 are provided for regulating the gaps between the flange portion 56 and the end of the sun gear shaft 16, between the clutch drum 54 and the sun gear $S_2$, between the sun gear $S_2$ and the flange of the carrier $C_1$, between the carrier $C_1$ and the sun gear $S_3$ and between the sun gear $S_3$ and the flange of the carrier $C_3$. Connection symbols ○ appearing between members indicate connecting structure such as splines, as designated by letter A in FIG. 17, which allow axial movement but serve to transmit the rotating force. Connection symbols ● indicate either a completely fixed connection or a joint structure, as designated by letter B or C, which are locked against relative movement in the axial direction, to transmit at least the axial force, by fitting snap rings on one end of the splined connections. These symbols are likewise applied to the individual embodiments to follow.

Figures 17, 18:
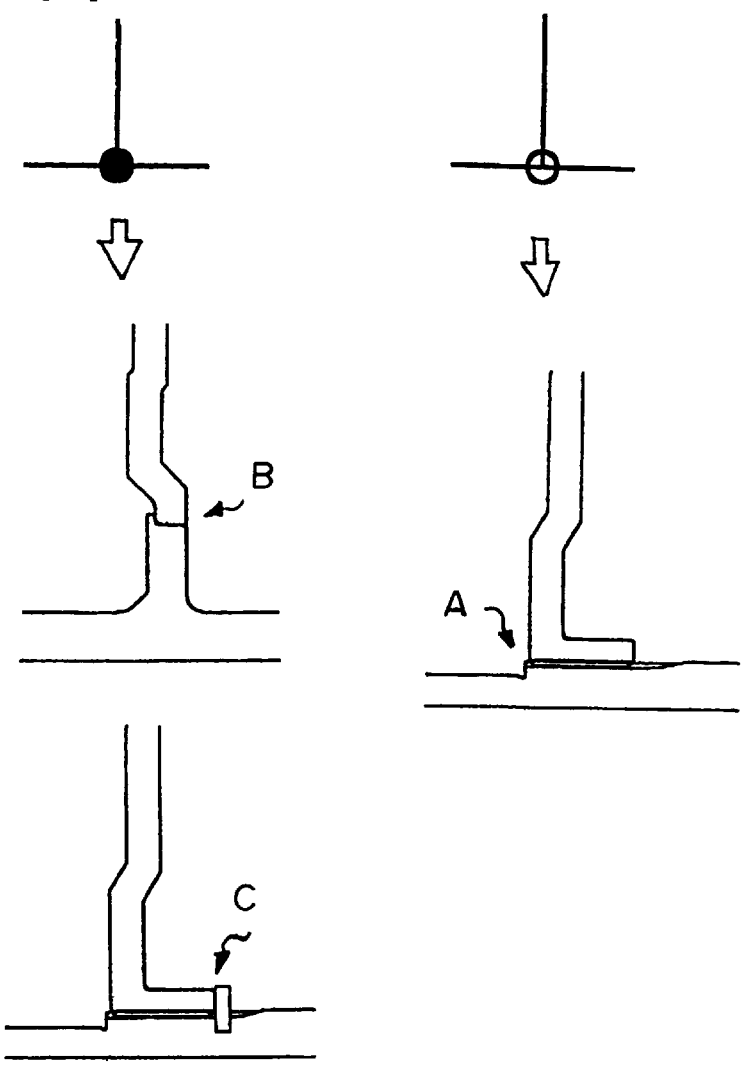
FIG. 17 is a series of diagrams explaining the symbols used in the schematic diagram of FIG. 16.
FIG. 18 is a table of operations of the automatic transmission of the eleventh embodiment.

The automatic transmission T thus structured achieves individual gear stages by feeding oil pressure under the control of the hydraulic control unit (not shown) to the hydraulic servos, associated with the individual clutches and brakes, to apply (as indicated by symbols ○) and release (as indicated by blanks) the individual clutches and brakes, as tabulated in the operation table of FIG. 18. Specifically, the first speed (1ST) is achieved when the clutch (C-1) and the brake (B-3) are applied. At this time, the rotation of the input shaft 14 enters the sun gear $S_1$ through the clutch (C-1) so that it is output as the rotation of the carrier $C_3$, which is decelerated to the greatest extent by the braking of the sun gear $S_3$ resulting from the engagement of the brake (B-3), to the counter drive gear 19. The second speed (2ND) is achieved when the clutch (C-2) and the brake (B-3) are applied. At this time, the input, having entered the carrier shaft 17 through the clutch (C-2), without change enters the ring gear $R_3$ through the carrier $C_1$ so that it is output as the differential rotation of the carrier $C_3$, which uses the sun gear $S_3$ retained by the engagement of the brake (B-3) as a reaction element, to the counter drive gear 19. The third speed (3RD) is achieved when the planetary gear set $M_1$ is directly coupled by the engagements of the two clutches (C-1 and C-2). At this time, the rotation of the input shaft 14 is output as is, as the rotation of the carrier $C_3$, to the counter drive gear 19.

The fourth speed (4TH), i.e. overdrive, is achieved when the clutch (C-2) is applied and when the brake (B-1) for braking the sun gear $S_1$ is applied. At this time, the rotation of the input shaft 14 is transmitted as the rotation of the ring gear $R_1$, which is accelerated by the rotation of the pinion gear $P_1$ on its axis relative to the rotation of the carrier $C_1$, from the carrier $C_3$ to the counter drive gear 19. On the contrary, the fifth speed is achieved when the clutch (C-2) and the brake (B-2) are applied. At this time, the rotation of the input shaft 14 is transmitted as the rotation of the ring gear $R_1$, which is accelerated by the rotation of the pinion gear $P_2$ on its axis relative to the rotation of the carrier $C_1$, from the carrier $C_3$ to the counter drive gear 19. In this speed, because the diameter of sun gear $S_2$ is larger than that of sun gear $S_1$, rotation of the ring gear $R_1$ is accelerated to a greater extent than in fourth speed.

Reverse (REV) is achieved when the clutch (C-1) and the brake (B-R) are applied. In reverse, the decelerated rotation of the ring gear $R_1$, which is reversed from the input of the sun gear $S_1$ when the carrier $C_1$ is braked, is output through the carrier $C_3$ from the counter drive gear 19.

When the two clutches (C-1 and C-2) are fed with the oil pressure from the in-housing oil passages (not shown) so that the aforementioned individual gear stages may be achieved, the pistons 31 and 41 are pushed out relative to the cylinders. However, since the bearings 32 and 42 and push members 33 and 43 are interposed between the pistons 31 and 41 and the clutches (C-1 and C-2), the servo forces from the pistons 31 and 41 can be transmitted to the friction plates while allowing the relative rotation between the clutches (C-1 and C-2) and the pistons 31 and 41, so that the clutches (C-1 and C-2) can be applied.

In these operations, the servo force from the piston 31 of the hydraulic servo 3 is transmitted through the bearing 32, the push member 33 and the frictional plate portion of the first clutch (C-1) to the flange portion 56 and further from the flange portion 56 through the input shaft 14 to the other hydraulic servo 4. At the hydraulic servo 4 side, the thrust bearing 69 is arranged between the input shaft 14 and the case end wall 10b so that the force of servo 3 is finally transmitted to the case end wall 10b. The case end wall 10a at the hydraulic servo 3 end, on the other hand, receives a reaction force in the direction opposed to that of the servo force of the piston 31. As a result, the servo force of the piston 31 and the opposing reaction force are transmitted to and offset by the two case end walls 10a and 10b, i.e., the transmission case 10. These functions can also be achieved for the other hydraulic servo 4. Thus, in this embodiment, the servo forces from the two pistons 31 and 41 are transmitted through the input shaft 14 to the two case end walls 10a and 10b so that they can exert no influence upon the speed change mechanism. Incidentally, the individual blackinked bearing symbols indicate that the servo forces are applied to the corresponding bearings, which meaning also applies to the same symbols in the embodiments to follow.

Thus, in the eleventh embodiment, the axial forces are transmitted to the walls 10a or 10b, opposed to the hydraulic servos, so that no reaction member need be disposed at the inner circumferential side of the hydraulic servo, unlike the prior art. As a result, the hydraulic servo can have a large effective pressure receiving area so that the transmission can be made more compact. Unlike the prior art in which the outer circumference of the clutch drum is supported, the diameter of the bearing need not be so large as to reduce durability of the bearing. Moreover, when the two hydraulic servos 3 and 4 apply the individual input clutches (C-1 and C-2) simultaneously, as for achieving the third speed (3RD) in this eleventh embodiment, their axial forces are offset to reduce the loads upon the walls 10a and 10b which receive the axial forces so that a further advantage is achieved with respect to durability. The axial force can be borne by the existing walls so that no additional wall is required and the automatic transmission can be made more compact. Furthermore, the number of reaction members interposed between the hydraulic servos 3 and 4 and the side walls 10a and 10b can be reduced to reduce the product error of clearances within the input clutches (C-1 and C-2). Furthermore, no hydraulic servo force acts upon the speed change mechanism M so that the bearings of the speed change mechanism M can be smaller. Yet further, the bearings to be added can be limited to those between the input shaft 14 and the end walls 10a and 10b. Thanks to the fact that no intermediate clutch is required beyond the two end input clutches (C-1 and C-2) the gear train structure can be yet more compact.

Figure 19:
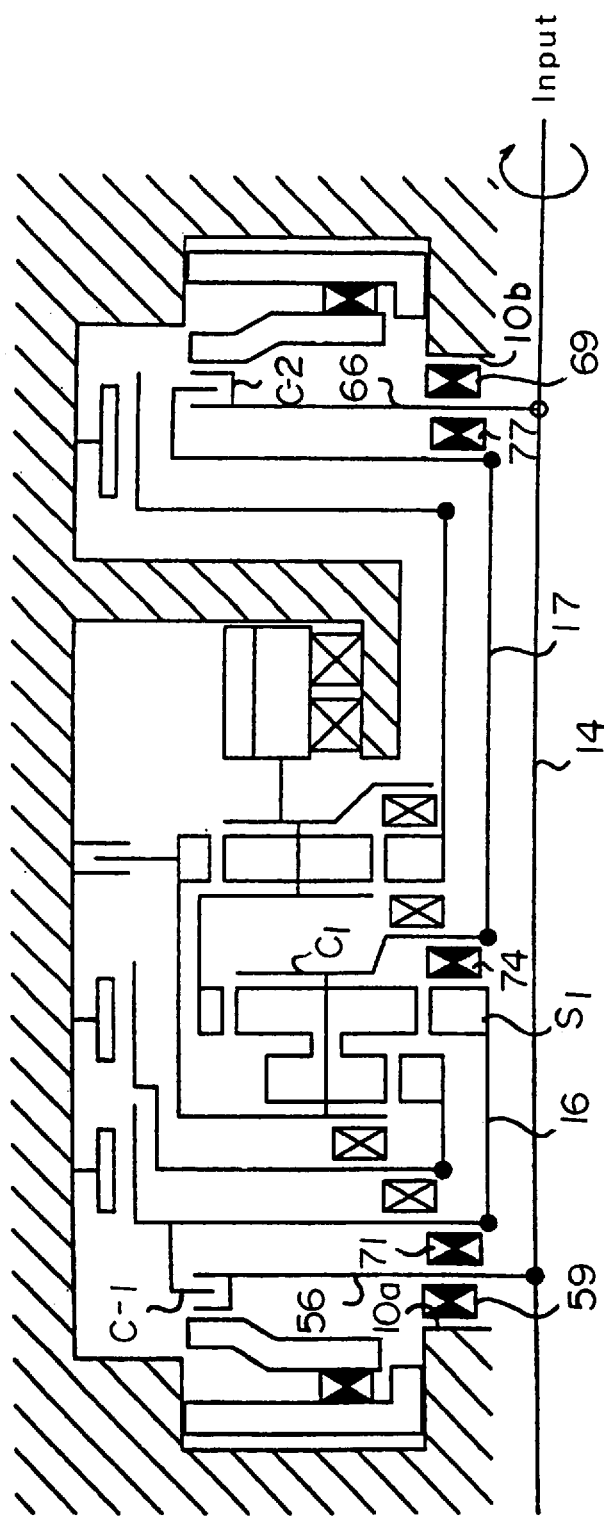
FIG. 19 is a schematic diagram of an automatic transmission according to a twelfth embodiment of the invention.

FIG. 19 shows a twelfth embodiment of the invention. This twelfth embodiment is similar to the aforementioned eleventh embodiment in that the reaction members define a common axial power transmitting line between the two input clutches (C-1 and C-2), but is different in that the transmitting line does not pass through the input shaft 14. In this embodiment, therefore, the two flange portions 56 and 66 are connected to allow for axial movement by suitable means such as a spline engagement, whereby no axial force is exerted upon the input shaft 14. The reaction members in the speed change mechanism M include bearings 71, 74 and 77 of the speed change mechanism, which are located between the flange portion 56 and the end of the sun gear shaft 16, between the sun gear $S_1$ and the flange of the carrier $C_1$, and between the end of the carrier shaft 17 and the flange portion 66, the sun gear shaft 16 including the sun gear $S_1$, and the carrier shaft 17.

In this twelfth embodiment, the servo force applied to the clutch (C-1) is received by the end wall 10b along the axial force transmitting line which extends through the flange portion 56, the bearing 71, the sun gear shaft 16 including the sun gear $S_1$, the bearing 74, the carrier shaft 17, the bearing 77, the flange portion 66 and the thrust bearing 69, in the recited order. The servo force applied to the clutch (C-2) is transmitted to the end wall 10a along the axial force transmitting line from the flange portion 66, to the bearing 77, the carrier shaft 17, the bearing 74, the sun gear shaft 16 including the sun gear $S_1$, the bearing 71, the flange portion 56 and the thrust bearing 59. According to this structure, effects similar to those of the aforementioned eleventh embodiment can be achieved, excepting that the hydraulic servo force acts upon the speed change mechanism M.

Figure 20:
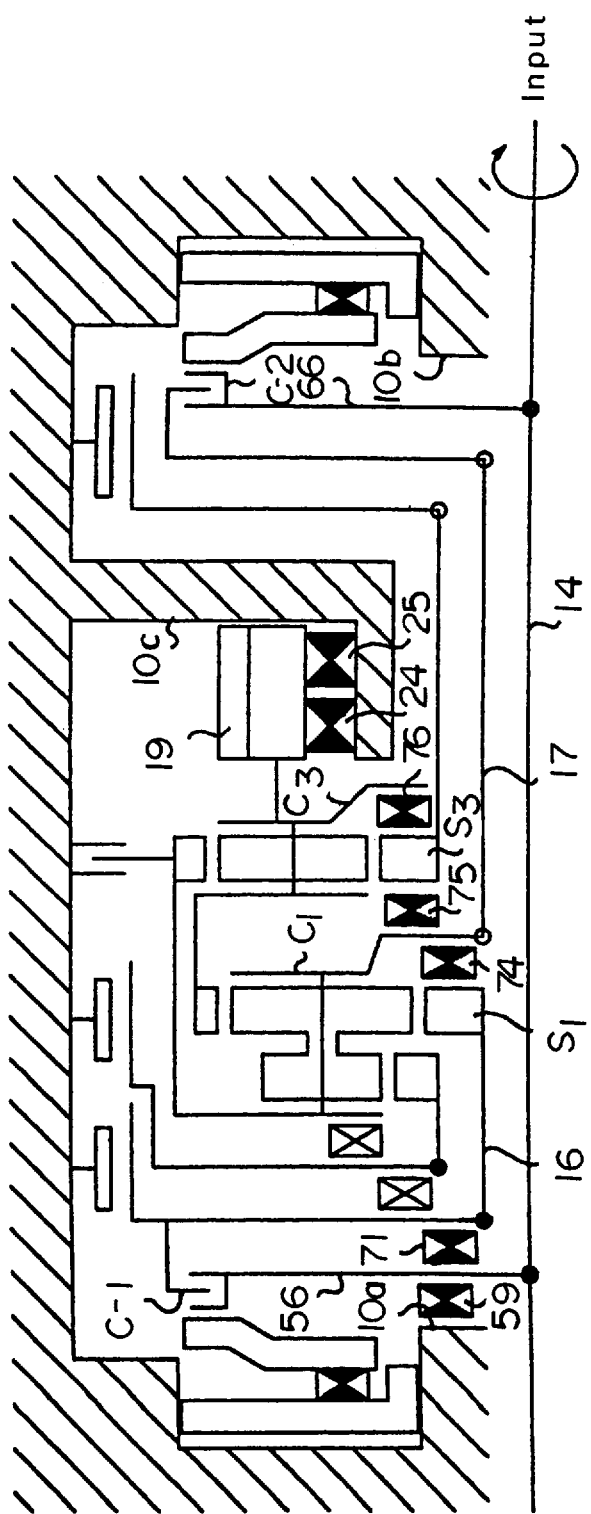
FIG. 20 is a schematic diagram of an automatic transmission according to a thirteenth embodiment of the invention.

FIG. 20 shows a thirteenth embodiment of the invention. This thirteenth embodiment is similar to the aforementioned eleventh embodiment in that the reaction force members define a common axial force transmitting line passing through the input shaft 14, between the two input clutches (C-1 and C-2), but is different in that the axial force of the input clutch (C-1) is transmitted, not to the end wall 10b, but to the intermediate wall 10c. In this embodiment, therefore, the thrust bearing is eliminated from between the flange portion 66 and the end wall 10b. In this embodiment, moreover, the reaction members are bearings 71, 74, 75 and 76 of the speed change mechanism, which are located between the flange portion and the end of the sun gear shaft 16, between the sun gear $S_1$ and the end of the carrier shaft 17, between the flange of the carrier $C_1$ and the sun gear $S_3$ and between the sun gear $S_3$ and the flange of the carrier $C_3$, the bearings 24 and 25 supporting the counter drive gear, the sun gear shaft 16 including the sun gear $S_1$, the sun gear $S_3$, the flange of the carrier $C_3$, and the counter drive gear 19.

With this structure, the servo force applied to the clutch (C-1) is borne by the intermediate wall 10c and is transmitted along the axial force transmitting line which is composed of the flange portion 56, the bearing 71, the sun gear shaft including the sun gear $S_1$, the bearing 74, the flange of the carrier $C_1$, the bearing 75, the sun gear $S_3$, the bearing 76, the flange of the carrier $C_3$, the counter drive gear 19, and the support bearings 24 and 25. The servo force applied to the clutch (C-2) is transmitted to the end wall 10a along the axial force transmitting line which is defined by the flange portion 55, the input shaft 14, the flange portion 56, and the thrust bearing 59. The common effect of the axial force transmitting line passing through such speed change mechanism is that the transmission loss can be minimized to prevent drop in the transmission efficiency, as shown in the operation table of FIG. 18, by applying the input clutch (C-1) at the low gear stage (1ST) in which the planetary gears do not rotate at high speeds, and by applying the input clutch (C-2) through the input shaft 14 at the high gear stage (2ND or higher) in which the planetary gears rotate at high speeds. Incidentally, the input clutch (C-1) at the side of the speed change mechanism is applied at the direct-coupled stage (3RD), but the efficiency is not lowered because the bearings do not operate at the direct-coupled stage. Incidentally, the input clutch (C-1) at the opposite side of the speed change mechanism is applied even at the direct-coupled stage (3RD), but the efficiency does not drop at the direct-coupled stage because the bearings do not operate.

Figure 21:
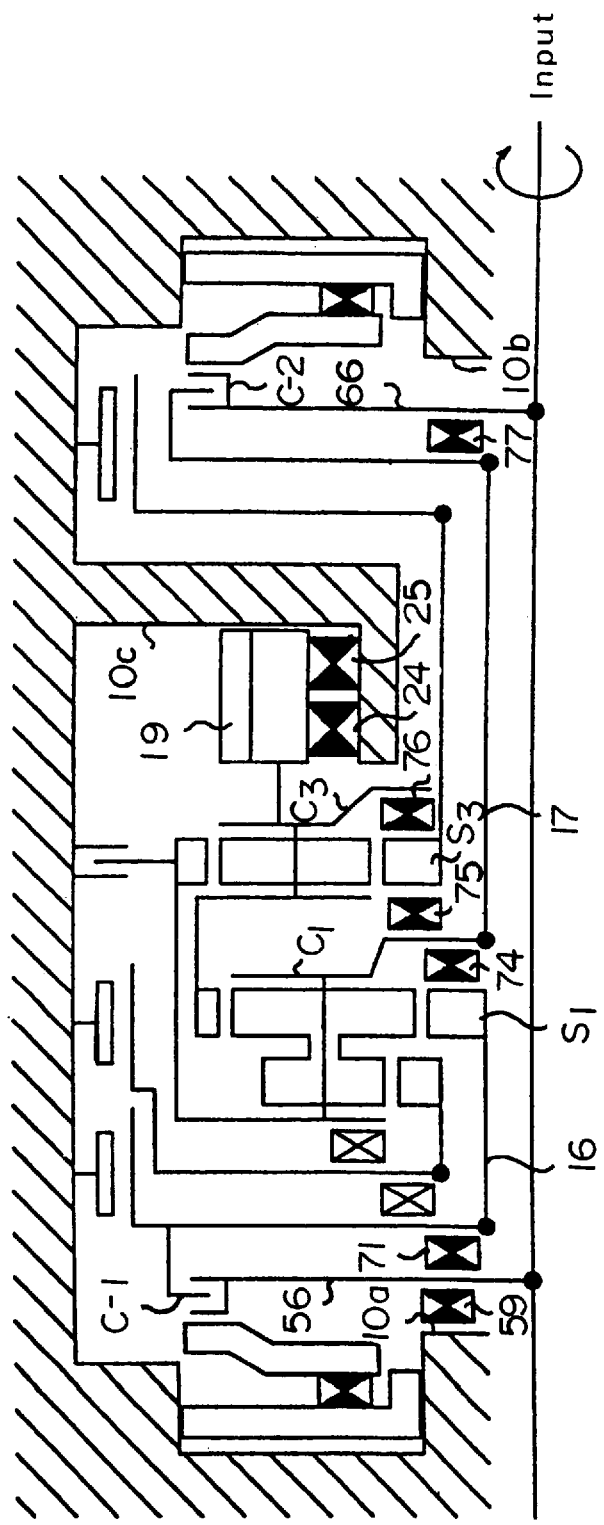
FIG. 21 is a schematic diagram of an automatic transmission according to a fourteenth embodiment of the invention.

FIG. 21 is a schematic diagram showing a fourteenth embodiment. This fourteenth embodiment is similar to the foregoing second embodiment in that the reaction members define a common axial force transmitting line, which does not pass through the input shaft 14 between the two input clutches (C-1 and C-2), but is different in that the axial force of the input clutch (C-1) is transmitted to the intermediate wall 10c. In this embodiment, therefore, the thrust bearing is eliminated from between the flange portion 66 and the end wall 10b. In this embodiment, moreover, the reaction members in the speed change mechanism are bearings 71, 74, 75, 76 and 77 of the speed change mechanism, which are located between the flange portion 56 and the end of the sun gear shaft 16, between the sun gear $S_1$ and the end of the carrier shaft 17, between the flange of the carrier $C_1$ and the sun gear $S_3$, between the sun gear $S_3$ and the flange of the carrier $C_3$ and between the end of the carrier shaft 17 and the flange portion 66, the two bearings 24 and 25 for supporting 30 the counter drive gear 19, the sun gear shaft 16, the sun gear $S_3$, the flange of the carrier $C_3$, the counter drive gear 19 and the carrier shaft 17.

In this fourteenth embodiment, the servo force applied to the input clutch (C-1) is transmitted to the intermediate wall 10c through a line similar to that of the aforementioned thirteenth embodiment, and the servo force applied to the input clutch (C-2) is transmitted to the end wall 10a through a line similar to that of the foregoing twelfth embodiment. Incidentally, the effects obtained by the subsequent individual embodiments, including this fourteenth embodiment are understandable by reference to the individual partial structures of the foregoing individual embodiments. Accordingly, their individual descriptions will be omitted here.

Figure 22:
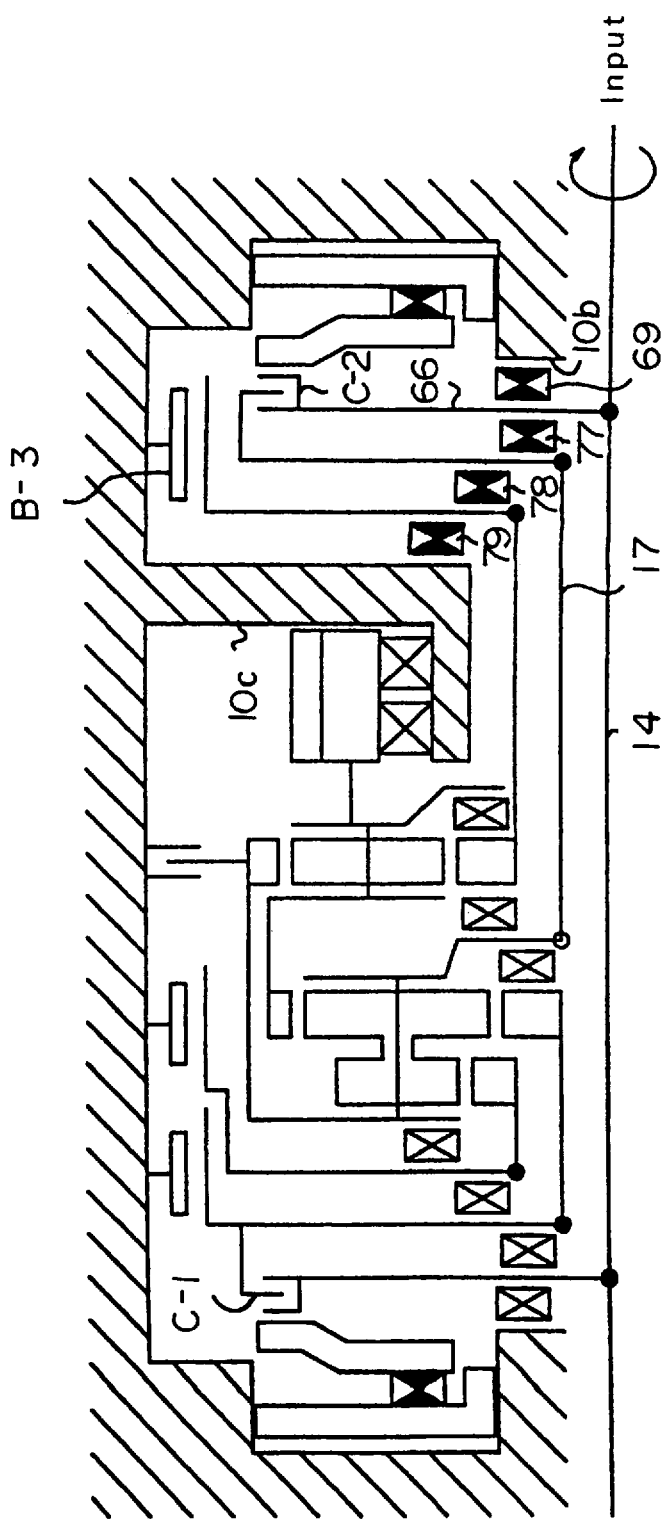
FIG. 22 is a schematic diagram of an automatic transmission according to a fifteenth embodiment of the invention.

FIG. 22 is a schematic diagram showing a fifteenth embodiment of the invention. This embodiment is similar to the foregoing eleventh embodiment in that the reaction members define the common axial force transmitting line through the input shaft 14 between the two input clutches (C-1 and C-2), but is different in that the axial force of the input clutch (C-2) is transmitted to the intermediate wall 10c. In this embodiment, therefore, bearings 77 to 79 are individually arranged between the flange portion 66 and the end of the carrier shaft 17, between the drum of the clutch (C-2) and the drum of the brake (B-3), and between the drums and the intermediate wall 10c.

In this fifteenth embodiment, the servo force applied to the input clutch (C-1) is transmitted to the end wall 10b along a line similar to that of the foregoing eleventh embodiment, and the servo force applied to the input clutch (C-2) is transmitted to the intermediate wall 10c though a line defined by the flange portion 66, the bearing 77, the drum of the clutch (C-2), the bearing 78, the drum of the brake (B-3) and the bearing 79.

Figure 23:
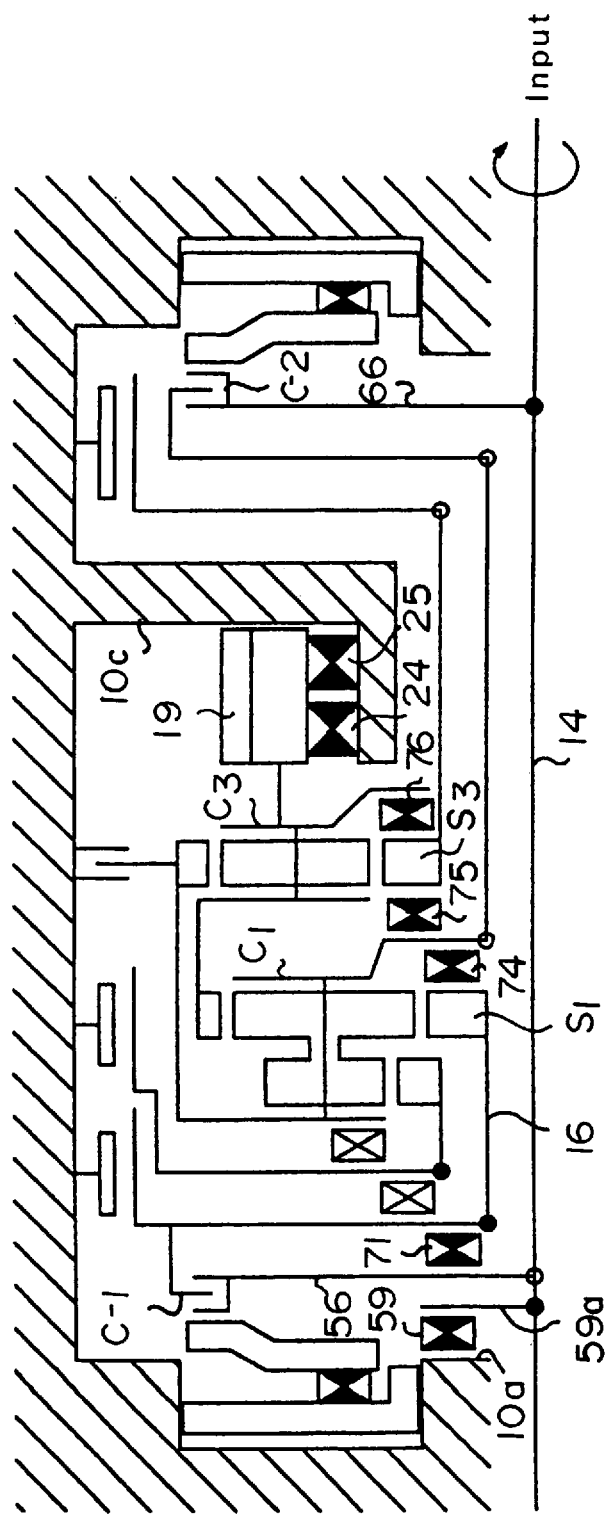
FIG. 23 is a schematic diagram of an automatic transmission according to a sixteenth embodiment of the invention.

FIG. 23 is a schematic diagram of a sixteenth embodiment of the invention. This embodiment is different from the foregoing embodiments in that the reaction members form axial force transmitting lines independent for the two input clutches (C-1 and C-2). To provide independent axial force transmitting lines, the flange portion 56 is made axially movable with respect to the input shaft 14. Instead, the race 59a of the bearing 59 is axially immovably connected to the input shaft 14. The remaining components are made substantially similar to these of the foregoing thirteenth embodiment. In this sixteenth embodiment, the servo force applied to the input clutch (C-1) is transmitted to the intermediate wall 10c through a line similar to that of the foregoing third embodiment, and the servo force applied to the input clutch (C-2) is transmitted to the end wall 10a through the race 59a of the bearing 59 and the bearing 59.

Figure 24:
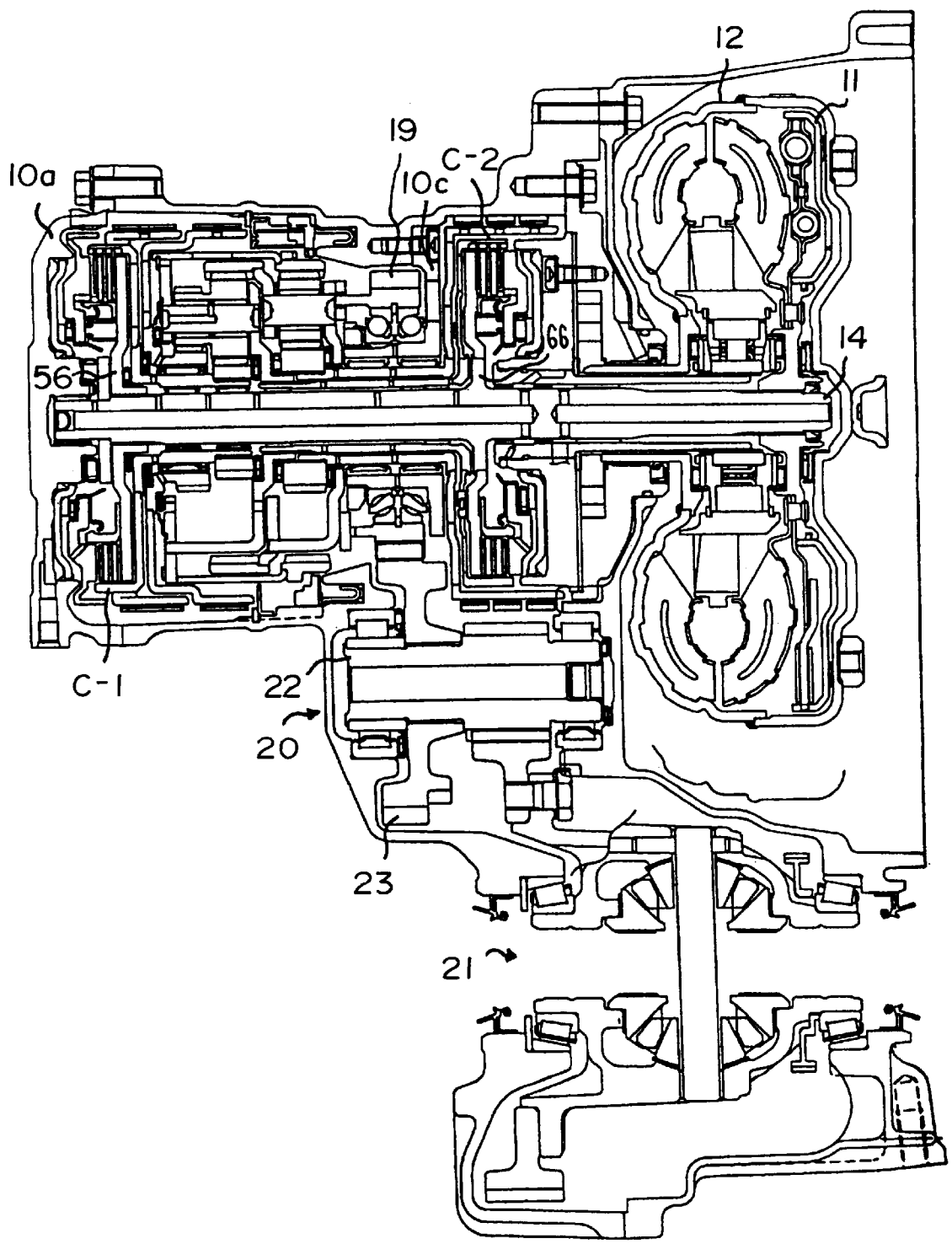
FIG. 24 is a sectional view of the entirety of the sixteenth embodiment, showing more detail.

FIG. 24 shows more detailed structure in accordance with the sixteenth embodiment, specifically a transfer axle, in which a transverse engine type automatic transmission for a front-engine/front-drive car is combined with a differential unit. This automatic transmission includes: a torque converter 12 having a lockup clutch 11 connected to the crankshaft of the engine (not shown); an input shaft 14 integrated with the turbine shaft of the torque converter 12; a speed change mechanism having the aforementioned structure; a counter gear unit 20 including a counter driven gear 23 splined thereto and meshing with a counter drive gear 19 of the speed change mechanism and a counter shaft 22 having an integral counter gear; and a differential unit 21 having a differential large gear meshing with the counter gear of the counter shaft 22 and fixed on the differential case.

Figure 25:
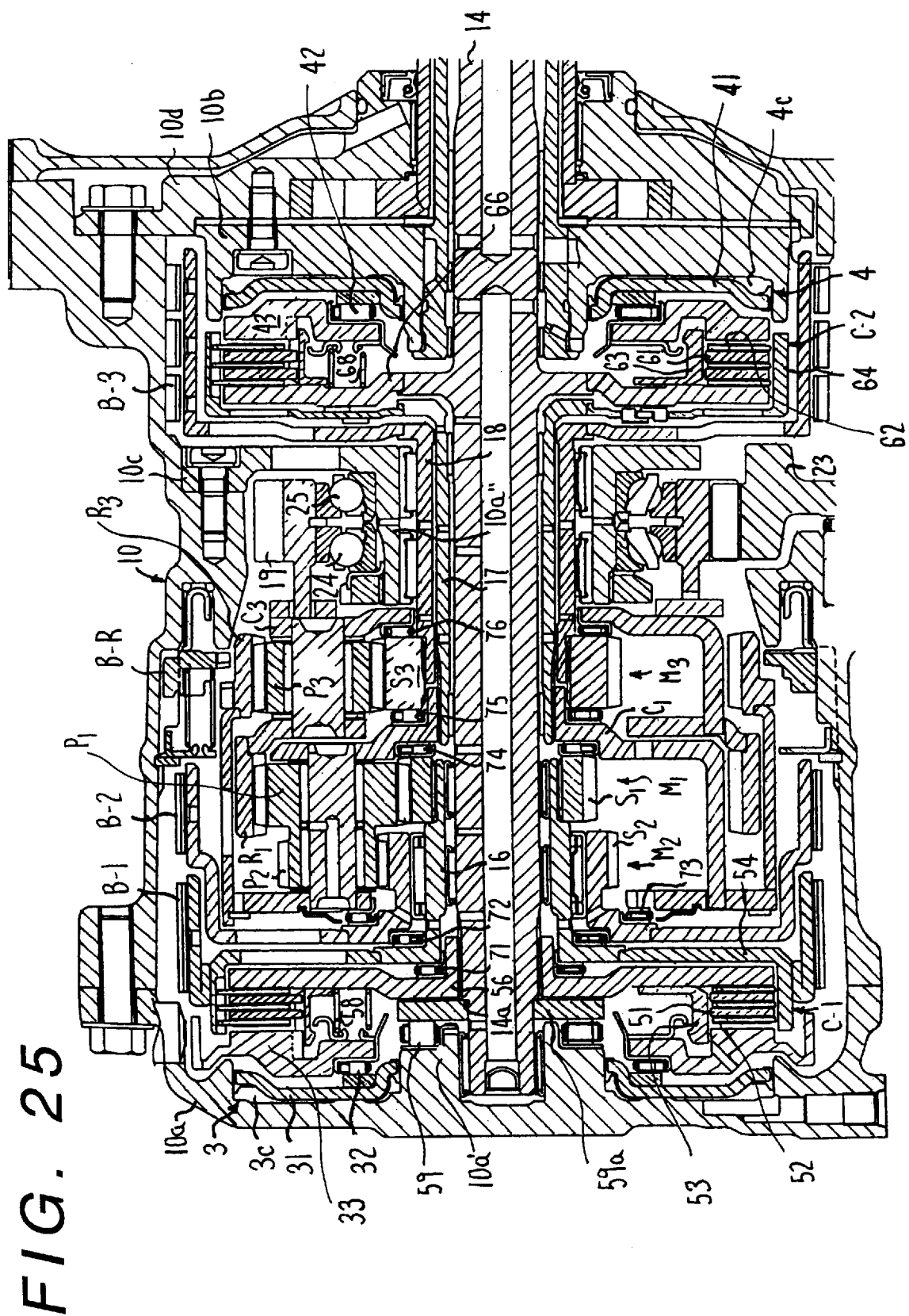
FIG. 25 is a sectional view of the speed change mechanism of the sixteenth embodiment (FIG. 24) on an enlarged scale.

As shown on an enlarged scale in FIG. 25, the transmission case 10 includes a case body, a cover fixed to one end of the case body by bolts and forming one end wall 10a, and a partition fixed by bolts on a pump case 10d, which is fixed to the other end by bolts, so that it is indirectly fixed on the case body, to form the other end wall 10b. Moreover, the transmission case 10 has an intermediate wall 10c, serving as a center support for supporting the output gear 19 which is connected to the carrier $C_3$ acting as an output element, between its two end walls 10a and 10b.

The speed change mechanism is provided with three planetary gear sets $M_1$, $M_2$ and $M_3$. The input shaft 14 extends through the insides of the three planetary gear sets $M_1$, $M_2$ and $M_3$, from one end to the other end of the transmission case 10, such that its one end is supported through a needle bearing by the aforementioned cover whereas its other end is supported through a bushing by a stator support shaft which is fixed in the inner circumferential portion of the aforementioned partition.

The first and second hydraulic servos and the two input clutches (C-1 and C-2) associated with the former are structured such that the first and second hydraulic servos 3 and 4 are located between the bearings 32 and 42 and the input clutches (C-1 and C-2) with the push members 33 and 43, which are held against rotation but axially slidable on the outer circumferences of hubs 53 and 63. Return springs 58 and 68 act against the movements of the pistons 31 and 41 responsive to the feed of the oil pressure to the oil chambers 3C and 4C. The return springs 58 and 68 individually abut against the push members 33 and 43 and the flange portions 56 and 66 acting as the reaction members.

The push members 33 and 43 have inner circumferential portions confronting the bearings 32 and 42 and outer circumferential portions confronting the input clutches (C-1 and C-2). The push members 33 and 43 are provided at their radially outer side with abutment portions for bearing against friction members 52 and 62, and the inner circumferences of the abutment portions are splined, like separator plates 51 and 61, to the hubs 53 and 63 connected to the input shaft 14.

The two input clutches (C-1 and C-2) are equipped with the hubs 53 and 63, which are individually connected through the flange portions 56 and 66 to the input shaft 14. Drum 54 is drivably connected through the sun gear shaft 16 to the sun gear $S_1$, serving as one of a plurality of speed change elements, by engagement of input clutch (C-1) and drum 64 is drivably connected through the carrier shaft 17 to the carrier $C_1$ by the input clutch (C-2).

The frictional plate portions of the two input clutches (C-1 and C-2) are composed of a plurality of friction members 52 and 62, having friction facings adhered to their two faces, and a plurality of separator plates 51 and 61 alternating in the axial direction with the friction members 52 and 62. These friction members 52 and 62 are splined at their radially outer edges to the inner circumferential surfaces of the drums 54 and 64, and the separator plates 51 and 61 are splined at their radially inner edges to the outer circumferential surfaces of the hubs 53 and 63.

In association with the three planetary gear sets $M_1$, $M_2$ and $M_3$, and arranged in the same radial positions as the sun gears $S_1$, $S_2$ and $S_3$ (having the same radius) are a plurality of thrust bearings 71, 74, 75 and 76, through which the axial force of the first input clutch (C-1) is transmitted to the intermediate wall 10c. The axial force is transmitted by the thrust bearings, which have the same radii as the individual sun gears $S_1$, $S_2$ and $S_3$, to thereby reduce the circumferential speeds of the same. This makes it possible to retain the durability of the bearings.

The speed change mechanism is equipped with the band brakes (B-1 and B-2) for braking predetermined rotary elements, i.e., the sun gear $S_1$ and the sun gear $S_2$ on the transmission case 10. The drum of the band brake (B-1) is connected to the sun gear shaft 16 and supported by the input shaft 14. The drum of the band brake (B-2) is connected to the sun gear $S_2$ and supported by the input shaft 14 through the sun gear shaft 16 at the inner circumferential side. The first input clutch (C-1) is applied, as seen with reference to the operation diagram of FIG. 18, only at the gear stages (the reverse (REV), the first speed (1ST), the second speed (2ND) and the third speed (3RD)) in which the band brakes (B-1 and B-2) are not applied. Thus, loss of durability of the bearings can be prevented by avoiding the simultaneous engagement of the input clutch (C-1), which is associated with the first hydraulic servo 3, at the time of engagement of the band brakes (B-1 and B-2). Simultaneous engagement is avoided because engagement of the band brakes applies an eccentric load to the band drums. When the band drums are axially supported, eccentricity may incline the rotary members resulting in eccentric abutment against the thrust bearings 71, 72 and 73. If the input clutch (C-1) is applied to transmit the axial force through the speed change mechanism, the eccentric abutment against the thrust bearings will occur under the action of a high servo force.

In this example, the power to the automatic transmission is transmitted from the end at which the input clutch (C-2) is located to the input shaft 14 through the torque converter 12 (as shown in FIG. 24). In order to transmit the axial force from the input clutch (C-2) to the end wall 10a, the input shaft 14 portion between the end wall 10a and the flange portion 56 at the input clutch (C-1) end is radially reduced to form a step portion (shoulder) 14a, against which the race 59a of the bearing 59 abuts for transmitting the axial force to the end wall 10a. Thus, the axial force can be simply transmitted without providing any snap Ring.

In this sixteenth embodiment, the reaction members receive the axial forces from the individual input clutches (C-1 and C-2) and include the two flange portions for transmitting the rotating force from the input shaft 14 to the individual input clutches (C-1 and C-2). The flange portion 66 is so arranged with respect to the input clutch (C-2) that the axial force is transmitted through the input shaft 14 to the end wall 10a and is axially fixed on a flange of the input shaft 14 by welding. The flange portion 56 at the input clutch (C-1) side is arranged so that the axial force is transmitted through the speed change mechanism to the intermediate wall 10c and is slidably connected to the input shaft 14 by a splined connection.

The cover forming the end wall 10a is provided with an annular boss portion 10a' for supporting the input shaft 14. The outer circumference of the boss portion 10a' forms one cylinder wall of the hydraulic servo of the input clutch (C-1), and the end face of the boss portion 10a' forms an abutment for the bearing 59 through which the axial force is transmitted to the end wall 10a. Thus, the shaft supporting portion, the servo cylinder and bearing portion of the first hydraulic servo are integrated and rationally arranged without any wasted space to give a compact transmission structure.

The center support forming the intermediate wall 10c is made separate of the body of the transmission case 10, and includes a radially extending flange portion extending from the inner circumference of the case body to the vicinity of the outer circumference of the sun gear shaft 18. Intermediate wall 10c also includes a cylindrical portion 10a" extending in the axial direction from the radially inner end of the flange portion. The wall 10c is fixed to the body of the case 10 by bolts with an outer circumferential portion of the radial flange portion in abutment against a step portion (shoulder) formed on the inner circumference of the case body. The outer circumference of the cylindrical portion 10a" of the intermediate wall 10c supports the counter drive gear 19 through a pair of angular ball bearings 24 and 25. The counter drive gear 19 is engaged with the output element of the speed change mechanism, i.e., the carrier $C_3$, through a loose comb-shaped meshing arrangement providing automatic centering, so as to transmit the axial force from the first input clutch (C-1) to the intermediate wall 10c. Thus, the counter drive gear 19 is supported on the outer circumferential side of the cylindrical portion 10a" of the intermediate wall 10c so that the connection between the counter drive gear 19 and the carrier $C_3$ can be radially positioned further out to lower the facial pressure applied to the engaging portions forming the connection in transmitting the axial force. Since a high drive torque from the speed change mechanism acts upon that connection, the load can be minimized by reducing the axial force so that torque transmission function and the axial force transmission function can be integrated into this one connection, furthering the objective of compactness.

The counter drive gear 19 is a helical gear having teeth slanted with respect to the axis and in meshing engagement with the counter driven gear 23 made of a similar helical gear. The thrust force, established in drive by the helical gears, is oriented in the direction (i.e., leftward in the drawings) opposing the axial force from the input clutch (C-1). Thus, the axial force and the thrust force offset each other so that the thrust force which acts upon the bearings 24 and 25 supporting the counter drive gear 19 can be reduced to retain the durability of the bearings.

Thus, thanks to the fact that no clutch other than the two input clutches (C-1 and C2) is required, this sixteenth embodiment is capable of achieving the five forward and one reverse stages to maximize the advantage of compactness deriving from the use of stationary cylinder type hydraulic servos.

Figure 26:
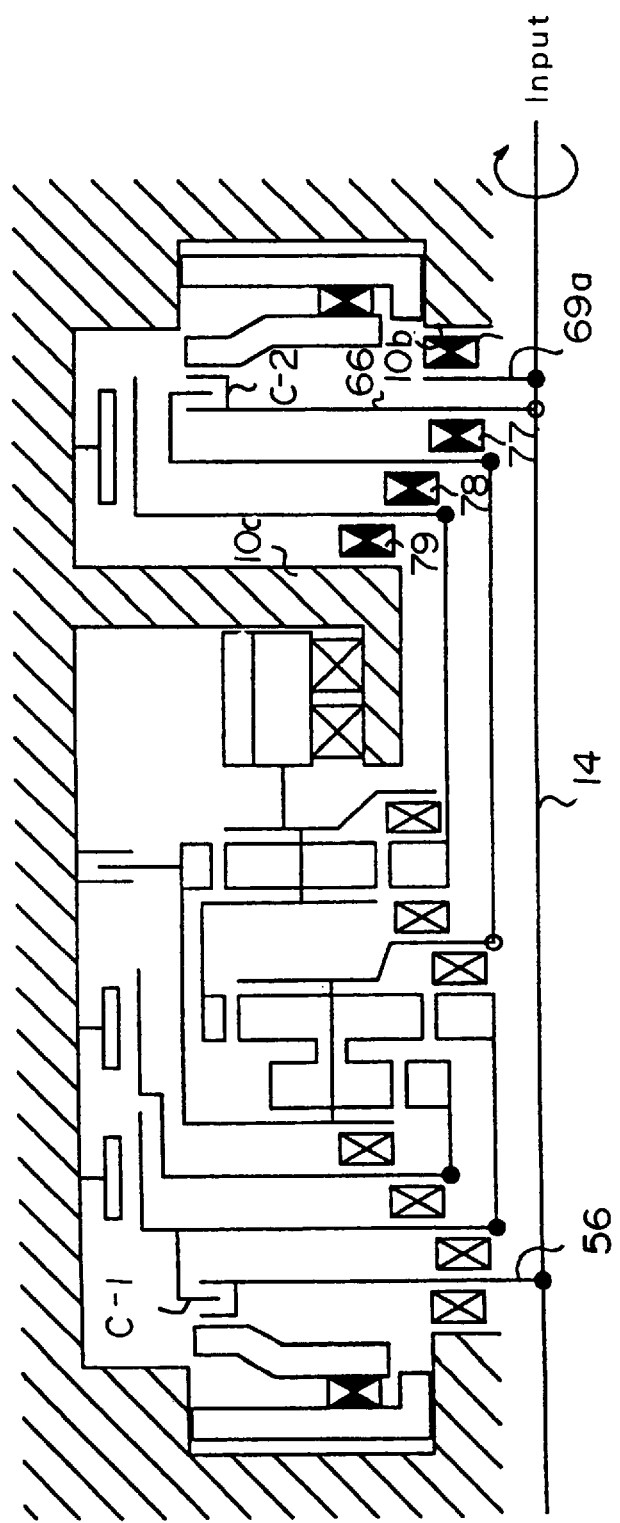
FIG. 26 is a schematic diagram of an automatic transmission according to a seventeenth embodiment of the invention.

Next, FIG. 26 is a schematic diagram showing a seventeenth embodiment of the invention. In this seventeenth embodiment, as in the aforementioned sixteenth embodiment, the reaction members form independent axial force transmitting lines for the individual two input clutches (C-1 and C-2), and the relationships between the two input clutches (C-1 and C-2) and the opposing walls are reversed from those of the sixteenth embodiment so that the axial force of the input clutch (C-1) is transmitted to the end wall 10b whereas the axial force of the input clutch (C-2) is transmitted to the intermediate wall 10c. For this, in this embodiment, the flange portion 66 is slidably connected to the input shaft 14, but the race 69a of the bearing 69 is fixed against axial movement relative to the input shaft 14. The other structure is made substantially similar to that of the foregoing fifteenth embodiment.

In this seventeenth embodiment, the servo force applied to the input clutch (C-1) is transmitted to the end wall 10b through the flange portion 56, the input shaft 14, the race 69a and the bearing 69, and the servo force applied to the input clutch (C-2) is transmitted to the intermediate wall 10c through the flange portion 66, the bearing 77, the drum of the clutch (C-2), the bearing 78, the drum of the 5 brake (B-3) and the bearing 79.

Figure 27:
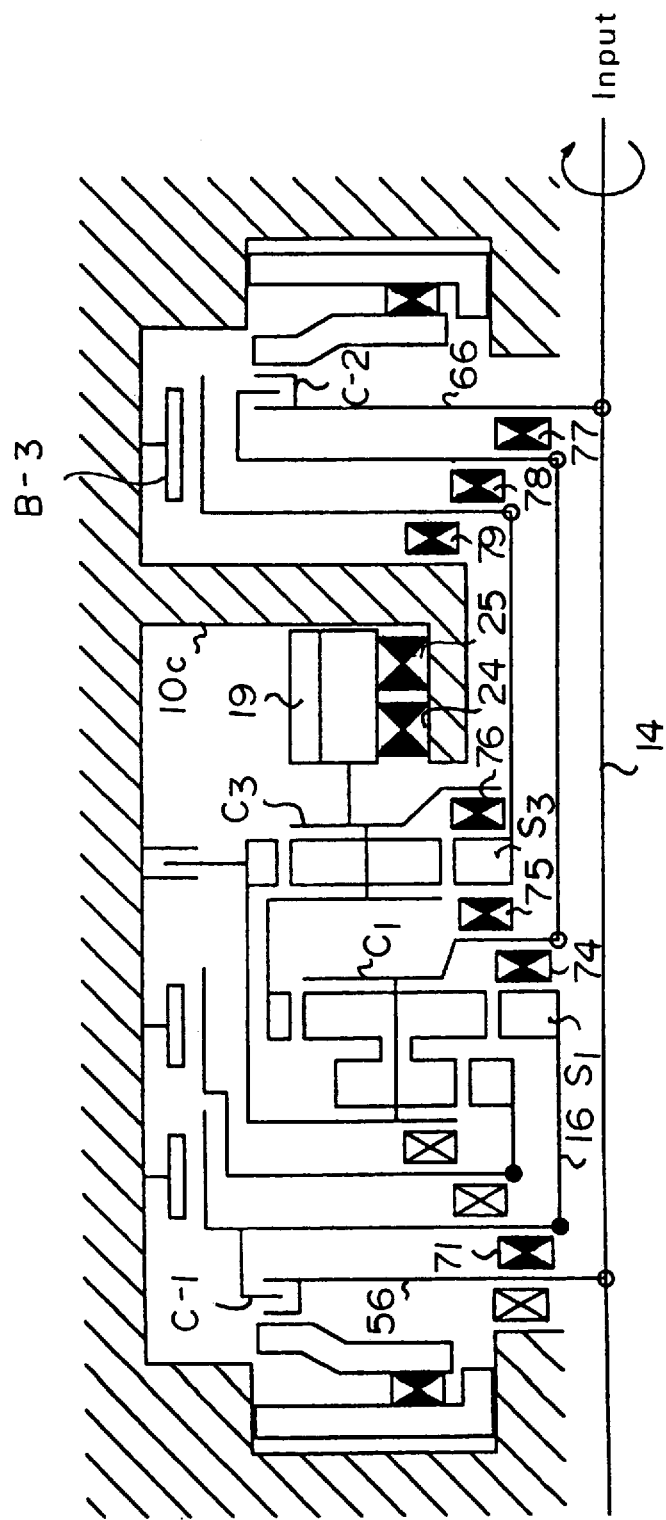
FIG. 27 is a schematic diagram of an automatic transmission according to an eighteenth embodiment of the invention.

FIG. 27 is a schematic diagram showing an eighteenth embodiment of the invention. In this eighteenth embodiment, the reaction members form independent axial force transmitting lines for the individual two input clutches (C-1 and C-2), and the intermediate wall 10c serves to oppose both the input clutches (C-1 and C-2). In this embodiment, therefore, the two flange portions 56 and 66 are slidably connected to the input shaft 14, and the individual bearings are arranged as in the fifteenth embodiment.

In this eighteenth embodiment, the servo force applied to the input clutch (C-1) is transmitted to the intermediate wall 10c through the flange portion 56, the bearing 71, the sun gear shaft 16 including the sun gear $S_1$, the bearing 74, the flange of the carrier $C_1$, the bearing 75, the sun gear $S_3$, the bearing 76, the flange of the carrier $C_3$, the counter drive gear 19 and the bearings 24 and 25. The servo force applied to the input clutch (C-2) is transmitted to the intermediate shaft 10c through the flange portion 66, the bearing 77, the drum of the clutch (C-2), the bearing 78, the drum of the brake (B-3) and the bearing 79.

Figure 28:
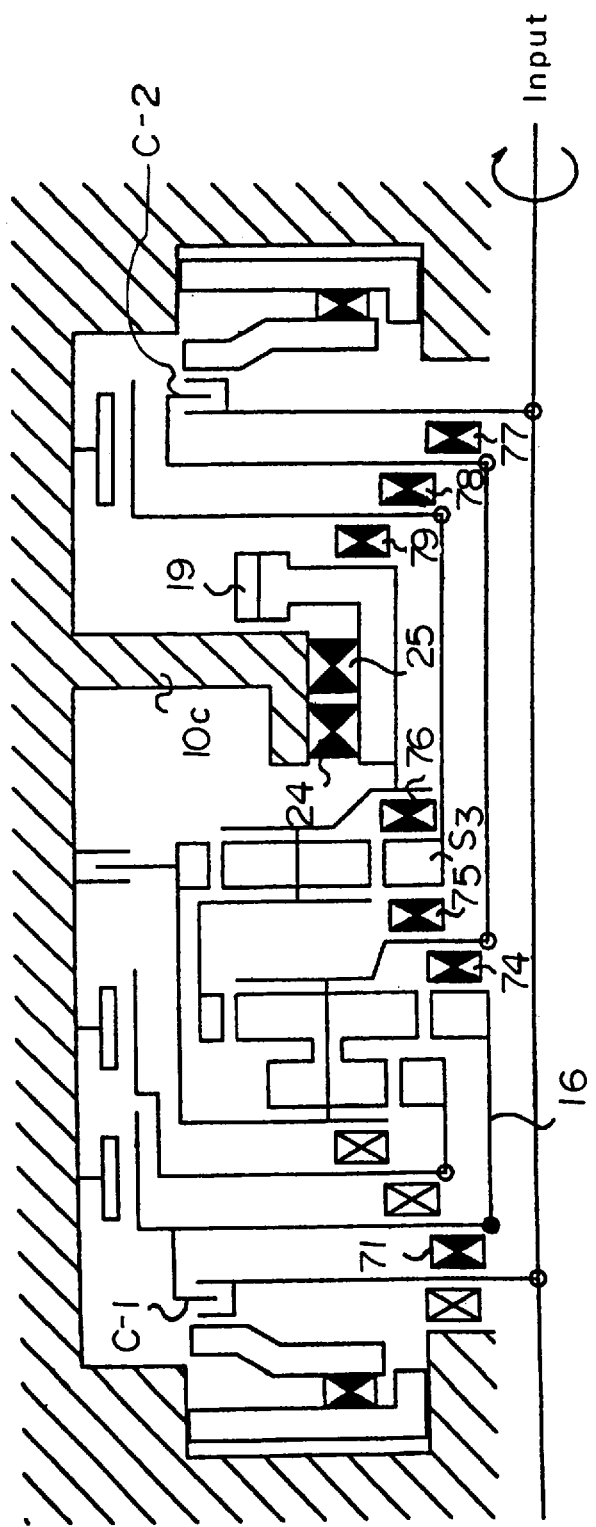
FIG. 28 is a schematic diagram of an automatic transmission according to a nineteenth embodiment of the invention.

FIG. 28 is a schematic diagram showing a nineteenth embodiment of the invention. This embodiment is substantially similar to the eighteenth embodiment, excepting that the axial force transmitting line is partially modified according to the change in the support structure of the counter drive gear in the intermediate wall 10c. In this embodiment, the counter drive gear 19 is supported through the bearings 24 and 25 on the inner circumferential surface of the cylindrical portion of the intermediate wall 10c. Accordingly, the bearing 79 is held in abutment against the end face of the counter drive gear 19.

Figure 29:
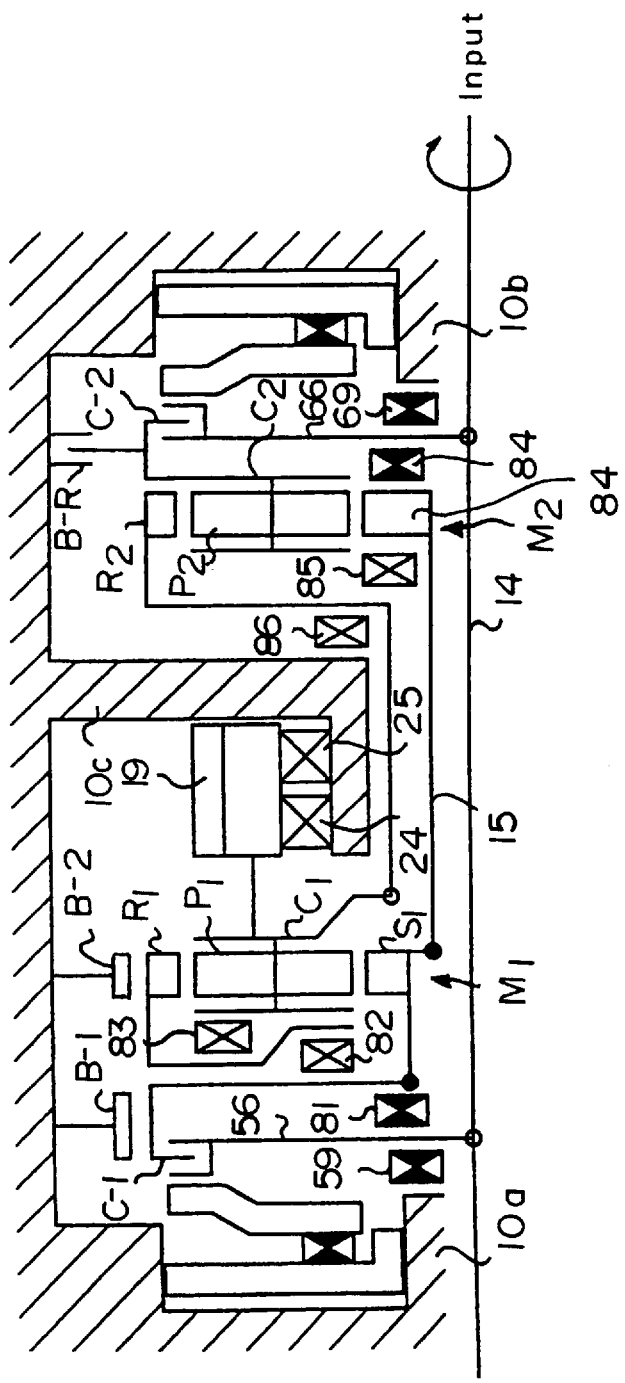
FIG. 29 is a schematic diagram of an automatic transmission according to a twentieth embodiment of the invention.

FIG. 29 is a schematic diagram showing a twentieth embodiment of the invention. This embodiment is different from the foregoing embodiments in the structure of the speed change mechanism and in the arrangement of same in the case. The speed change mechanism including the planetary gear set $M_1$, which is composed of three elements, i.e., the sun gear $S_1$, the ring gear $R_1$ and the pinion gear $P_1$ meshing with the former, and the planetary gear set $M_2$, which is composed of three elements, i.e., the sun gear $S_2$, the ring gear R2 and the pinion gear $P_2$ meshing with the former, is arranged between the end wall 10a and the intermediate wall 10c and between the intermediate wall 10c and the end wall 10b of the transmission case 10. The sun gear $S_1$ and the sun gear $S_2$ are connected to each other through a sun gear shaft 15; the carrier $C_1$ supporting the pinion gear $P_1$ is connected to the ring gear R2; the sun gear $S_1$ and a carrier C2 supporting the pinion gear $P_2$ can be connected/disconnected to and from the input shaft 14, respectively, through the clutch (C-1) and the clutch (C-2); and the carrier $C_1$ is connected to the counter drive gear 19. The sun gear $S_1$ can be braked on the transmission case 10 by the band brake (B-1) which engages the drum of the clutch (C-1) connected thereto; the carrier $C_2$ can be braked on the transmission case 10 by the multi-disc brake (B-R) engaging the drum of the clutch (C-2) connected thereto; and the ring gear $R_1$ can be braked on the transmission case 10 by the band brake (B-2).

In this speed change mechanism of the twentieth embodiment, at the side of the planetary gear set $M_1$, a thrust bearing 82 is arranged between the axially movable flange portion and the axial extension of the sun gear $S_1$ and a thrust bearing 83 is arranged between the drum of the brake (B-2) and the flange of the carrier $C_1$. At the side of the planetary gear set $M_2$, a thrust bearing 84 is arranged between the axially movable flange portion 66 and the sun gear $S_2$, a thrust bearing 85 is arranged between the sun gear $S_2$ and the ring gear carrier connecting member, and a thrust bearing 86 is interposed between the ring gear carrier connecting member and the intermediate wall 10c.

The transmission of this twentieth embodiment achieves the individual gear stages by feeding the oil pressures to the hydraulic servos which operate the various individual clutches and brakes, under the control of the hydraulic control unit (not shown), thereby applying (as indicated by symbols ◯) and releasing (as indicated by blanks) the individual clutches and brakes, as operationally tabulated in FIG. 30. Specifically, the first speed (1ST) is achieved when the clutch (C-1) and the brake (B-2) are applied. At this time, the rotation of the input shaft 14 is transmitted to the sun gear $S_1$ through the clutch (C-1) so that it is output as the rotation of the carrier $C_1$, which is decelerated from the rotation of the pinion gear $P_1$ by the braking of the ring gear $R_1$ as a result of the engagement of the brake (B-2), to the counter drive gear 19. On the other hand, the second speed (2ND) is achieved when the clutch (C-2) and the brake (B-2) are applied. At this time, the input to the carrier $C_2$ through the clutch (C-2), is output as the differential rotation of the carrier $C_1$, with the reaction element being the ring gear $R_1$ braked by the engagement of the brake (B-2), at the counter drive gear 19. The third speed (3RD) is achieved by the direct-coupling of the planetary gear set $M_2$, through engagements of the two input clutches (C-1 and C-2). At this time, the rotation of the input shaft 14 is output without change as the rotation of the carrier $C_1$ to the counter drive gear 19.

The fourth speed (4TH) (overdrive) in the twentieth embodiment is achieved by applying the clutch (C-2) and by applying the brake (B-1) for braking the two sun gears $S_1$ and $S_2$. At this time, the rotation of the input shaft 14 is output as the rotation of the ring gear $R_2$, which is accelerated by the rotation of the pinion gear $P_2$ relative to the carrier $C_2$, from the carrier $C_1$ to the counter drive gear 19.

Reverse (REV) is achieved by applying the clutch (C-1) and the brake (B-R). At this time, the rotation of the ring gear $R_2$, which is reversed and decelerated by the braking of the carrier $C_2$ from the input of the sun gear $S_2$, is output from the counter drive gear 19 through the carrier $C_1$.

In this embodiment, the servo force applied to the input clutch (C-1) is transmitted to the end wall 10b through the flange portion 56, the bearing 81, the sun gear $S_1$, the sun gear shaft 15 including the sun gear $S_2$, the bearing 84 and the flange portion 66, and the servo force applied to the input clutch (C-2) is transmitted from the flange portion 66 in reverse along the same line to the end wall 10b through the bearing 59. This twentieth embodiment provides advantages similar to those of the foregoing twelfth embodiment.

Figure 31:
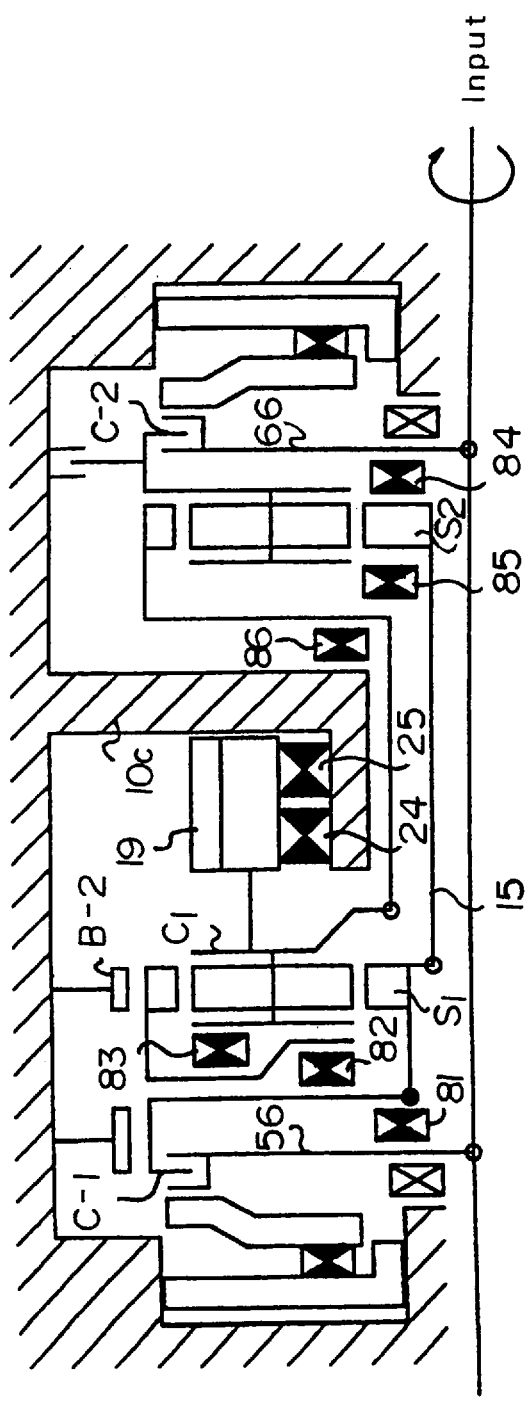
FIG. 31 is a schematic diagram of an automatic transmission according to a twenty-first embodiment of the invention.

FIG. 31 is a schematic diagram showing a twenty-first embodiment of the invention. In this embodiment, the speed change mechanism is structured so that the individual servo forces applied to the input clutches (C-1 and C-2) are independently transmitted to the intermediate wall 10c. In accordance with this change, the connection between the sun gear $S_1$ and the sun gear shaft 15 is changed to a slidable connection.

In the structure of this twenty-first embodiment also, the servo force applied to the input clutch (C-1) is transmitted through the flange portion 56, the bearing 81, the drum of the clutch (C-1) axially fixed to the sun gear $S_1$, the bearing 82, the drum of the brake (B-2), the bearing 83, the flange of the carrier $C_1$, and the counter drive gear 19, in the recited order, and finally to the intermediate wall 10c through the paired bearings 24 and 25 supporting the counter drive gear 19. In addition, the servo force applied to the input clutch (C-2) is transmitted to the intermediate wall 10c through the flange portion 66, the bearing 84, the sun gear $S_2$, the bearing 85 and the carrier ring gear connection member and further through the bearing 86. This twenty-first embodiment offers advantages similar to those obtained from the foregoing eighteenth embodiment.

Figure 32:
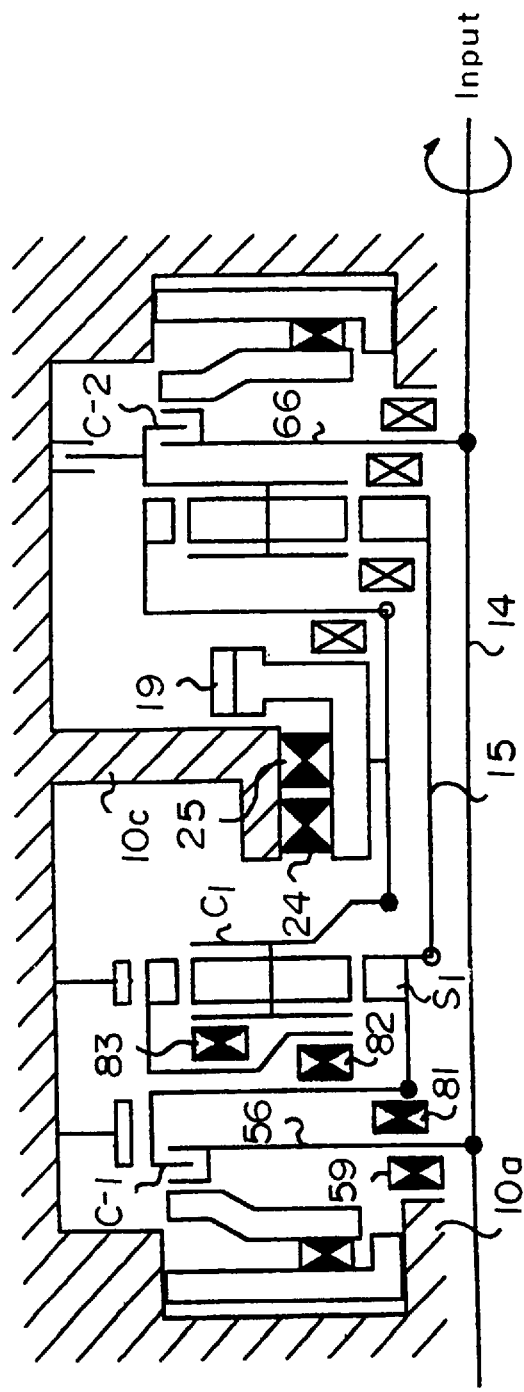
FIG. 32 is a schematic diagram of an automatic transmission according to a twenty-second embodiment of the invention.

FIG. 32 shows a twenty-second embodiment of the invention. This embodiment has a speed change mechanism which is similar to the foregoing twentieth embodiment in that the individual servo forces applied to the input clutches (C-1 and C-2) are commonly applied through the input shaft 14, but which differs in that one of the servo forces is transmitted to the end wall 10a whereas the other is transmitted to the intermediate wall 10c. In this embodiment, moreover, the counter drive gear 19 is supported by the inner circumferential surface the cylindrical portion of the intermediate wall 10c through the paired support bearings 24 and 25. As compared with the foregoing twentieth embodiment, therefore: the two flange portions 56 and 66 are axially fixed to the input shaft; the connection between the sun gear $S_1$ and the sun gear shaft 15 is changed to a slidable connection; and the carrier $C_1$ is axially fixed to the counter drive gear 19 through the carrier ring gear connection member.

This twenty-second embodiment is different from the aforementioned twenty-first embodiment in that the force applied to the input clutch (C-1) is transmitted midway from the flange of the carrier $C_1$ through the carrier ring gear connection member to the counter drive gear 19. In addition, the servo force applied to the input clutch (C-2) is transmitted to the end wall 10a through the flange portion 66, the input shaft 14 and the flange portion 56 and further through the bearing 59. This embodiment offers advantages similar to those obtained from the foregoing thirteenth embodiment.

Figure 33:
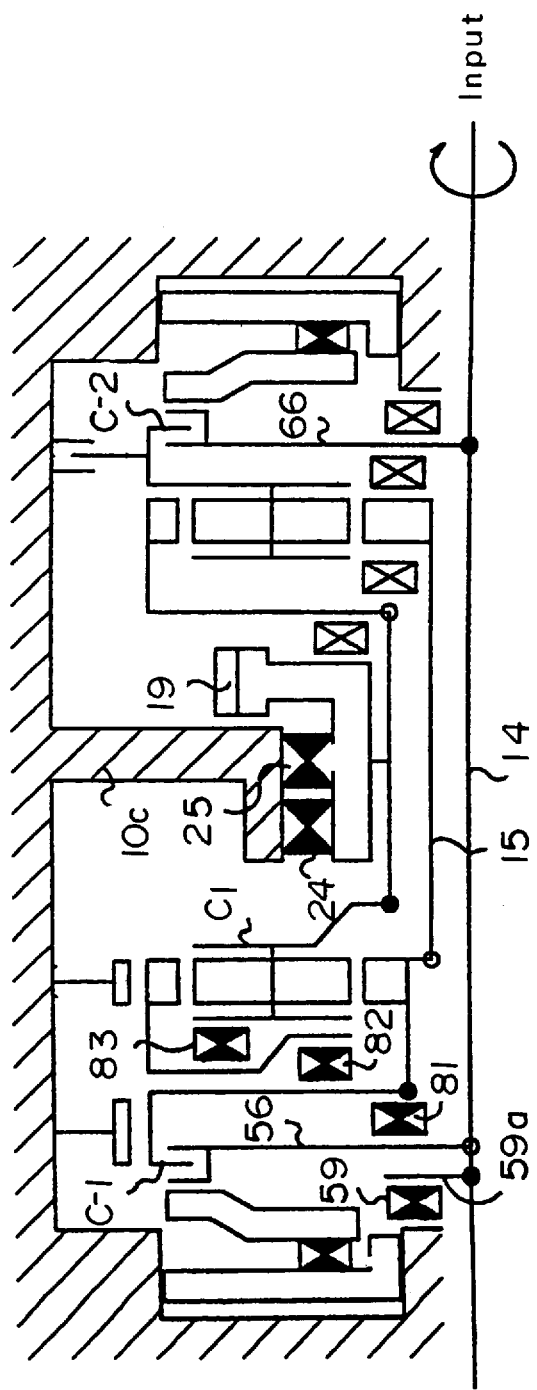
FIG. 33 is a schematic diagram of an automatic transmission according to a twenty-third embodiment of the invention.

FIG. 33 shows a twenty third embodiment of the invention. In this embodiment, the speed change mechanism is modified from that of the foregoing twentieth embodiment to provide an axial force transmitting line similar to that of the foregoing sixth embodiment. As apparent from FIG. 23, the race 59a of the bearing 59 is axially fixed to the input shaft 14, and the connection between the flange portion 56 and the input shaft 14 is changed to a slidable connection. The other structure is substantially similar to that of the aforementioned twenty-second embodiment, and the description of the same will be omitted while identifying the equivalent structure with identical reference numerals. Moreover, the transmission of the axial force generated by the servo for clutch (C-1) is similar to the aforementioned twenty-second embodiment, and is different only in that the servo force applied to the input clutch (C-2) is transmitted through the bearing race 59a in place of the flange portion 56. This twenty-third embodiment offers advantages similar to those obtained from the foregoing sixteenth embodiment.

Figure 34:
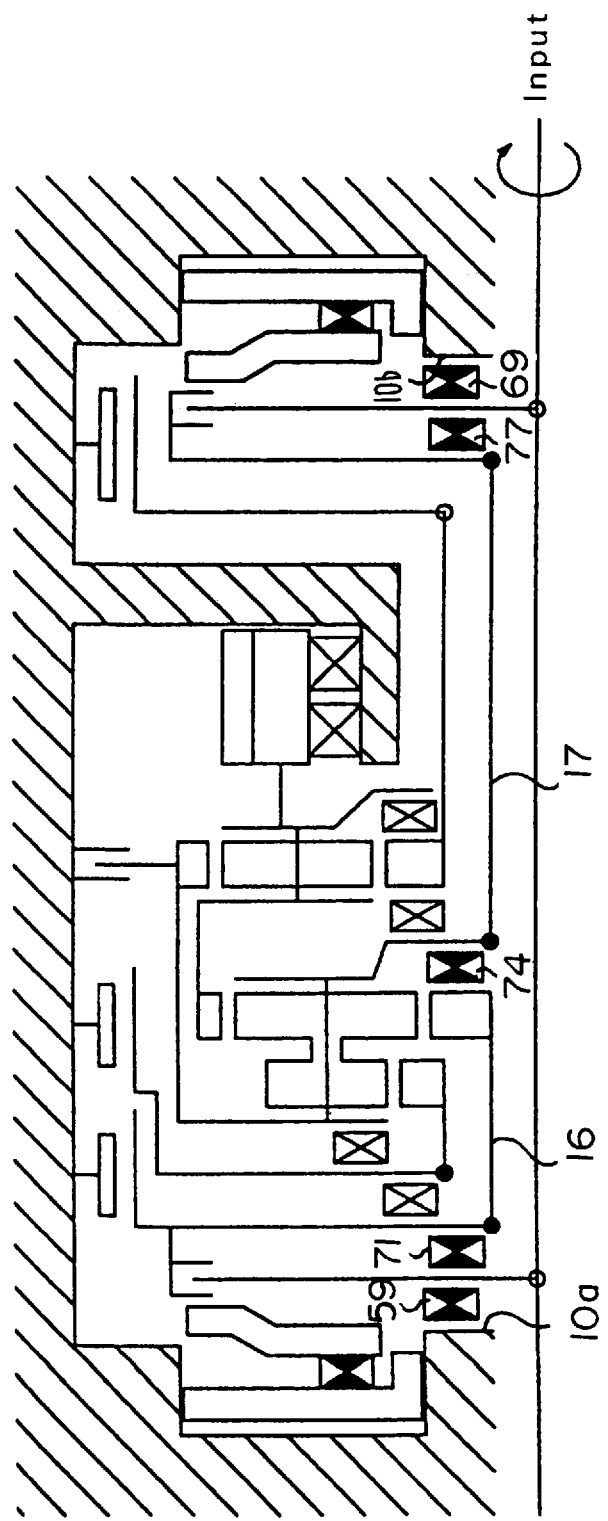
FIG. 34 is a schematic diagram of an automatic transmission according to a twenty-fourth embodiment of the invention.

FIG. 34 shows a twenty-fourth embodiment of the invention. This embodiment is substantially similar to the foregoing twelfth embodiment. In all the foregoing embodiments, the axial force generated by the servo is applied to the input member side (i.e., hub side) of the input clutch, but in this twenty-fourth embodiment and the embodiments to follow, the input clutches (C-1 and C-2) are different in that the axial force is applied to the output member side (i.e., drum side) thereof.

Figure 35:
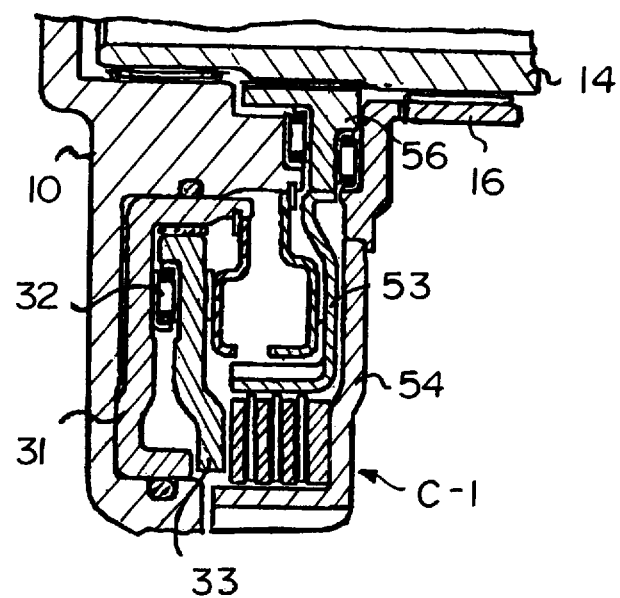
FIG. 35 is a sectional view of the clutch of the automatic transmission of the twenty-fourth embodiment.

FIG. 35 shows a specific example of the clutch mechanism of the type in which the servo force is applied to such clutches. FIG. 35 shows an example with illustration of the clutch (C-1) side. The hub 53 is connected through the flange portion 56 to the input shaft 14 and the drum 54 is connected to the sun gear shaft 16. The description of the remaining structure is omitted and the members which are substantially the same as those of the foregoing embodiment shown in FIG. 25, are identified by similar reference numerals. Incidentally, the structure of the clutch (C-2) is symmetrical to the one shown in FIG. 25.

Reverting to the twenty-fourth embodiment of FIG. 34, even with the input Clutch of this type, an axial force transmitting line similar to that of the twelfth embodiment is formed without changing the manner of connection of the individual members or the bearing arrangement. However, the servo forces are transmitted, not through the individual flange portions 56 and 66, but directly to the shaft ends of the sun gear shaft 16 and the carrier shaft 17.

Figure 36:
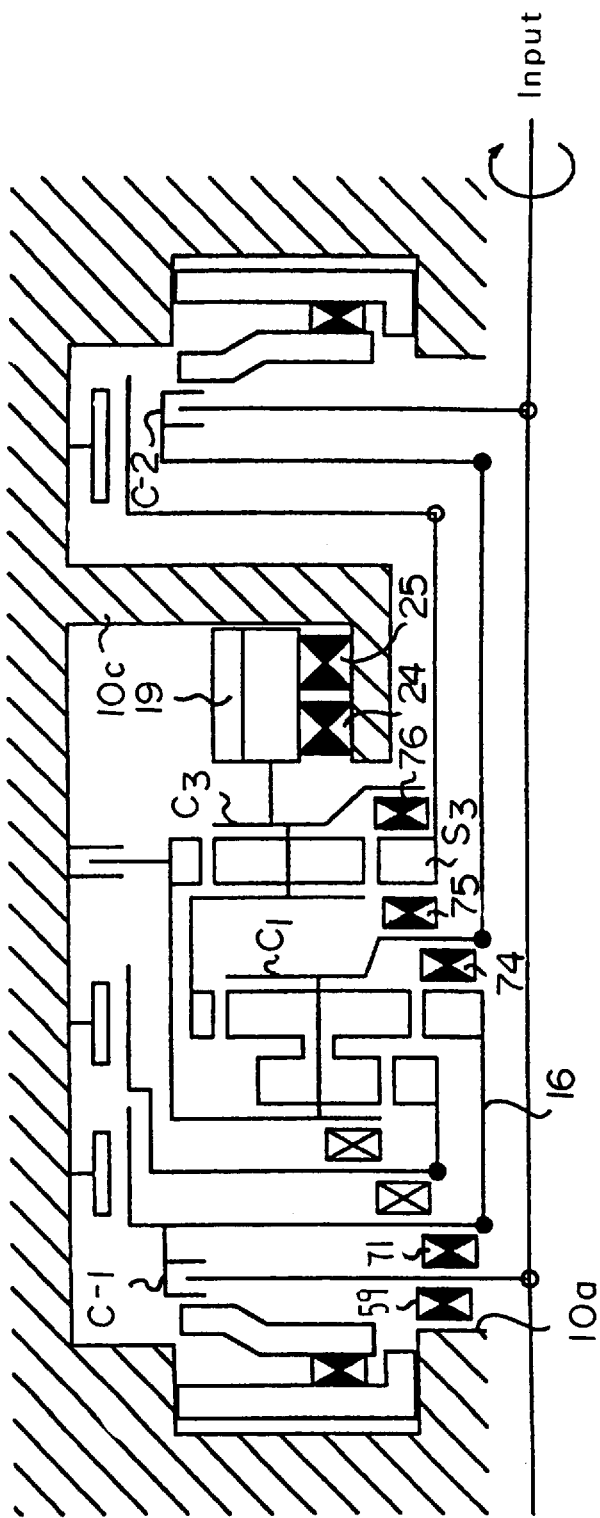
FIG. 36 is a schematic diagram of an automatic transmission according to a twenty-fifth embodiment of the invention.

FIG. 36 shows a twenty-fifth embodiment of the invention. This embodiment is also of the type in which the servo force is applied to the drum side of the clutch, and the servo force of the input clutch (C-1) is applied to the intermediate wall 10c, whereas the servo force of the input clutch (C-2) is applied to the end wall 10a. As seen from the comparison with the foregoing fourth embodiment, in this case, the servo force of the input clutch (C-2), as described above, is not transmitted through the flange portion 66 so that no support member corresponding to the bearing 77 in the fourteenth embodiment is required.

Figure 37:
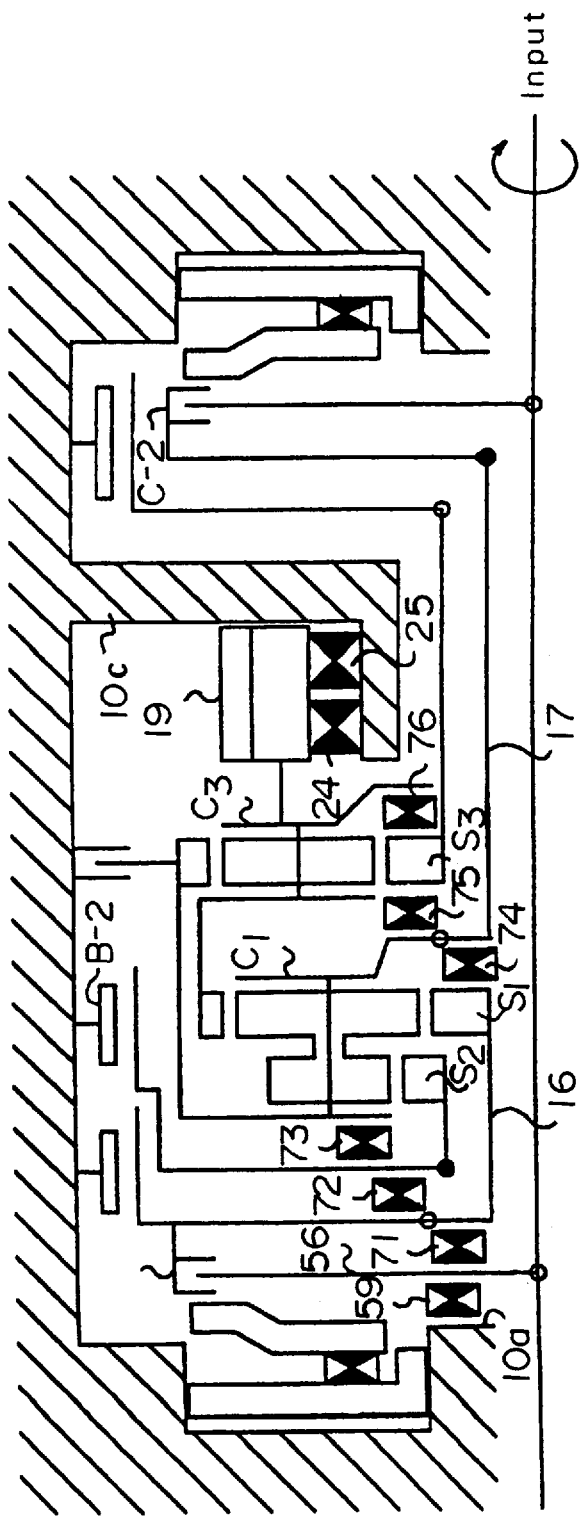
FIG. 37 is a schematic diagram of an automatic transmission according to a twenty-sixth embodiment of the invention.

FIG. 37 shows a twenty-sixth embodiment of the invention. This embodiment is also of the type in which the servo force is applied to the drum side of the Clutch so that the servo force of the input clutch (C-1) is applied to the intermediate wall 10c whereas the servo force of the input Clutch (C-2) is applied to the end wall 10a, but is different in that these force transmitting lines are independent of each other. In this case, the difference in the structure from the aforementioned twenty-fifth embodiment is that the drum of the Clutch (C-1) and the sun gear shaft 16 are slidably connected across the bearing 71 and the bearing 72, and that the flange of the carrier $C_1$ and the carrier shaft 17 are slidably connected across the bearing 74 and the bearing 75. With this structure, the servo force applied to the input clutch (C-1) is transmitted from the drum of the clutch (C-1) to the intermediate wall 10c through the bearing 72, the drum of the brake (B-2), the bearing 73, the carrier $C_1$, the bearing 75, the sun gear $S_3$, the bearing 76, the flange of the carrier $C_3$, the counter drive gear 19 and the two bearings 24 and 25. On the other hand, the servo force applied to the input Clutch (C-2) is transmitted from the drum of the Clutch (C-2) to the end wall 10a through the carrier shaft 17, the bearing 74, the sun gear shaft 16, the bearing 71, the flange portion 56 and the bearing 59.

Figure 38:
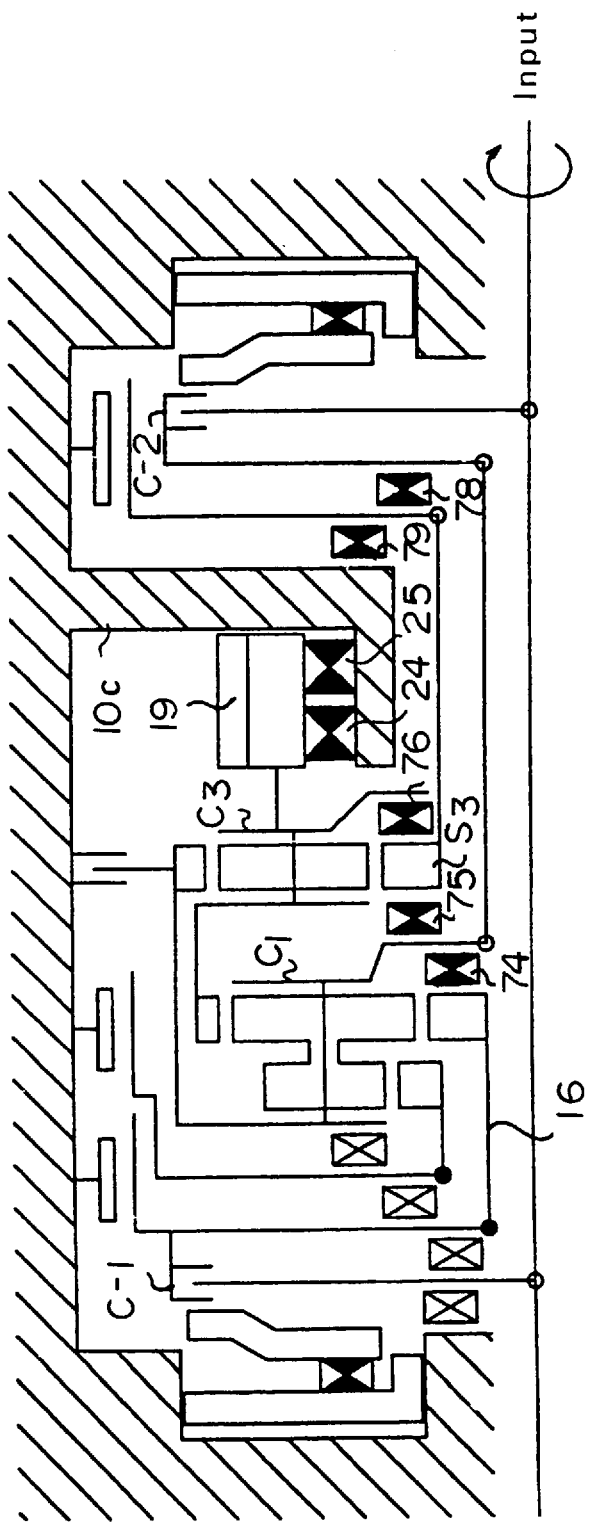
FIG. 38 is a schematic diagram of an automatic transmission according to a twenty-seventh embodiment of the invention.

Finally, FIG. 38 is a schematic diagram showing a twenty-seventh embodiment of the invention. This embodiment is also of the type in which the servo force is applied to the drum side of the clutch, such that the servo forces of the two input clutches (C-1 and C-2) are applied to the intermediate wall 10c independently of each other. This embodiment is similar to the foregoing eighteenth embodiment in that the servo force is applied to the drum side but is different in that the member corresponding to the bearing 77 can be dispensed with. In this case, too, the servo forces to the sun gear shaft 16 and the bearing 78 are transmitted in the initial transmitting line directly through the individual flange portions 56 and 66.

In summary, no matter which of the speed change mechanisms M of the foregoing embodiments might be adopted, the hydraulic servos 3 and 4 of the two input clutches (C-1 and C-2) are of the stationary cylinder type which do not require a centrifugal oil pressure offsetting chamber, and the clutch mechanism can be located at the two ends of the speed change mechanism M and in a smaller space than that of the ordinary rotary servo type, by utilizing the case end walls 10a and 10b as the servo cylinders to provide a compact and highly efficient automatic transmission. The disposition of the hydraulic servos 3 and 4 at the case end walls 10a and 10b is also advantageous from the viewpoint of facilitating location of the band brakes on the outer circumferences of the planetary gears and on the outer circumferences of the clutches.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicular automatic transmission for establishing a plurality of forward gear stages, comprising: a transmission case; an input shaft; a transmission mechanism connected to said input shaft and including a plurality of transmission elements; an output shaft connected to said transmission mechanism; first and second clutches drivably connecting said input shaft to at least one of said transmission elements; and first and second hydraulic servos for applying said first and second clutches responsive to feed of an oil pressure, wherein said transmission case encloses said transmission mechanism, said first and second clutches and said first and second hydraulic servos and includes individual end walls at both its axial ends, wherein said first and second clutches are arranged across said transmission mechanism at the respective axial ends, and wherein said first and second hydraulic servos individually include:

first and second stationary cylinders formed on the individual end walls of said transmission case so as to confront each other;

first and second pistons slidably arranged in said first and second cylinders, respectively, and individually defining, together with said first and second cylinders, oil chambers for receiving the feed of oil pressure; and first and second bearings arranged between said first and second pistons and said first and second clutches, respectively, for allowing the relative rotation between said first and second pistons and said first and second clutches, respectively, and for transmitting axial forces, generated by said first and second hydraulic servos responsive to the feed of oil pressure, to said first and second clutches, respectively.

2. A vehicular automatic transmission comprising:

a transmission case having two axially spaced end walls;

a speed change mechanism arranged in the transmission case and including two input elements and one output element;

an input shaft extending from one end of the transmission to a second end of the transmission case, axially opposite said one end, through the speed change mechanism;

first and second input clutches arranged at axially opposite ends of the speed change mechanism for connecting/disconnecting the individual input elements of the speed change mechanism to and from the input shaft; and two hydraulic servos for applying/releasing the individual input clutches, wherein the two hydraulic servos include stationary cylinders formed in the two end walls of the transmission case and are arranged in association with the individual input clutches, and wherein the axial force applied to the individual input clutches by the action of each individual hydraulic servo is transmitted to a wall of the transmission case, opposite that individual hydraulic servo, by reaction members which are arranged between each of the individual input clutches and the wall of said transmission case opposed to that individual hydraulic servo.

3. An automatic transmission according to claim 2, wherein the walls of said transmission case, opposing the individual hydraulic servos, are the two end walls of said transmission case.

4. An automatic transmission according to claim 2, further comprising:

an output gear connected to the output element;

an intermediate wall formed integral with the transmission case and located between the two end walls, said intermediate wall supporting said output gear; and wherein one of the end walls of the transmission case opposes one hydraulic servo whereas the wall of said transmission case opposing the other hydraulic servo is said intermediate wall of said transmission case.

5. An automatic transmission according to claim 2, further comprising:

an output gear connected to the output element;

an intermediate wall formed integral with the transmission case and located between the two end walls, said intermediate wall supporting said output gear;

wherein said intermediate wall of the transmission case serves as the opposing wall for both of said hydraulic servos; and wherein said reaction members define axial force transmitting lines for individually transmitting the axial forces, generated by the hydraulic servos, to said intermediate wall of the transmission case.

6. An automatic transmission according to claim 3, wherein said reaction members define a common axial force transmitting line between the two input clutches.

7. An automatic transmission according to claim 4, wherein said reaction members form a common axial force transmitting line between the two input clutches.

8. An automatic transmission according to claim 4, wherein said reaction members define axial force transmitting lines independent of each other for the individual input clutches.

9. An automatic transmission according to claim 5, wherein said reaction members define axial force transmitting lines, independent of each other, for the individual input clutches.

10. An automatic transmission according to claim 6, wherein said reaction members include the input shaft, and wherein the common axial force transmitting line passes through said input shaft.

11. An automatic transmission according to claim 7, wherein said speed change mechanism includes at least one planetary gear unit and is arranged between said intermediate wall and the one end wall, wherein said reaction members include the speed change mechanism and said input shaft, and wherein axial force generated by the hydraulic servo associated with the first input clutch is transmitted to the intermediate wall through said speed change mechanism and the axial force generated by the hydraulic servo associated with the second input clutch is transmitted to one of said end walls through said input shaft.

12. An automatic transmission according to claim 7, wherein said speed change mechanism is arranged between said intermediate wall and said one end wall, wherein said reaction members include said input shaft, and wherein the axial force generated by the hydraulic servo associated with the second input clutch and transmitted to the intermediate wall does not pass through the speed change mechanism and wherein the axial force generated by the hydraulic servo associated with the first input clutch is transmitted to the end walls through said input shaft.

13. An automatic transmission according to claim 8, wherein said speed change mechanism is arranged between said intermediate wall and said one end wall, wherein said reaction members include said speed change mechanism and said input shaft, and wherein the axial force generated by the hydraulic servo associated with the first input clutch is transmitted to the intermediate wall through said speed change mechanism and the axial force generated by the hydraulic servo associated with the second input clutch is transmitted to the other end wall through said input shaft.

14. An automatic transmission according to claim 8, wherein said speed change mechanism is arranged between said intermediate wall and said one end wall, wherein said reaction members include said input shaft, and wherein the axial force generated by the hydraulic servo associated with said second input clutch and transmitted to said intermediate wall does not pass through said speed change mechanism and wherein the axial force generated by the hydraulic servo associated with said first input clutch is transmitted to the other end wall through said input shaft.

15. An automatic transmission according to claim 9, wherein said speed change mechanism includes two planetary gear units separated by said intermediate wall, wherein said reaction members include said speed change mechanisms, and wherein axial forces generated by said hydraulic servos are transmitted to the intermediate wall through the planetary gear units.

16. An automatic transmission according to claim 11, wherein said first input clutch is applied at a low gear stage and/or a direct-coupled stage whereas said second input clutch is applied at a high gear stage.

17. An automatic transmission according to claim 11, wherein said first input clutch is applied only for establishing a low gear stage and/or a direct-coupled stage.

18. An automatic transmission according to claim 13, wherein said first input clutch is applied only for establishing a low gear stage and/or a direct-coupled state whereas said second input clutch is applied only for establishing a high gear stage.

19. An automatic transmission according to claim 13, wherein said first input clutch is applied only for establishing a low gear stage and/or a direct-coupled stage.

20. An automatic transmission according to claim 2, wherein said speed change mechanism is a gear train which establishes all forward gear stages and the reverse gear stage through use of only the first and second input clutches.

21. An automatic transmission according to claim 13, wherein said reaction members include two flange portions, mounted on said input shaft, for receiving the axial forces from the hydraulic servos associated with said input clutches and for transmitting torque from said input shaft to said input clutches, and wherein one of said flange portions is located adjacent the second input clutch and is axially fixed on said input shaft, whereas the other of said flange portions is located adjacent the first input clutch and is slidably connected to the input shaft.

22. An automatic transmission according to claim 21, wherein power to the automatic transmission is introduced to said input shaft at the end of the transmission where said second input clutch is located, and wherein, in order to transmit axial force from said second input clutch to said input shaft, said input shaft is provided with a section of reduced diameter located between an adjacent end wall and the flange portion associated with said first input clutch, said section of reduced diameter forming a step against which is abutted a race of a bearing for transmitting the axial force to the end wall.

23. An automatic transmission according to claim 13, wherein power to the automatic transmission is introduced to said input shaft at its end where the second input clutch is located, and wherein the end wall adjacent said first input clutch has an annular boss portion for supporting the input shaft, said boss portion having an outer circumferential surface forming a cylinder wall of the hydraulic servo associated with the first input clutch and having an end face abutting a bearing for transmitting axial force to the adjacent end wall.

24. An automatic transmission according to claim 13, wherein said speed change mechanism includes a plurality of planetary gear units including sun gears and a plurality of thrust bearings having radial dimensions equal to those of the sun gears, and wherein the axial force of the first input clutch is transmitted through the thrust bearings to the intermediate wall.

25. An automatic transmission according to claim 13, wherein said output gear is supported on said intermediate wall through said bearing, and wherein said output gear is so connected to the output element of the speed change mechanism that the axial force from said first input clutch is transmitted to the intermediate wall.

26. An automatic transmission according to claim 25, wherein said output gear is a helical gear, whereby a thrust force established in drive by the helical gear directed against and offsetting the axial force from the first input clutch.

27. An automatic transmission according to claim 25, wherein said intermediate wall has an axially extending cylindrical portion providing an outer circumferential surface supporting said output gear.

28. An automatic transmission according to claim 13, wherein said speed change mechanism includes a band brake for braking a predetermined one of said rotary elements on the transmission case, wherein said band brake includes a drum axially supported by said input shaft, and wherein said first input clutch is applied only at a gear stage at which said band brake is not applied.

29. A vehicular automatic transmission according to claim 1,
   wherein said first and second hydraulic servos include: first and second return springs providing axial spring forces opposing movements of said first and second pistons to apply said clutches responsive to the feed of oil pressure to said oil chambers; and first and second thrust members between said first and second bearings and said first and second clutches, respectively, and
   wherein said first and second return springs abut against said first and second thrust members and said first and second reaction members, respectively.

30. A vehicular automatic transmission according to claim 1,
   wherein said input shaft extends between said end walls, through said transmission mechanism,
   wherein said transmission mechanism includes first and second flange portions arranged adjacent said first and second clutches, respectively, so that the axial forces from said first and second pistons are transmitted thereto through said first and second clutches, respectively,
   wherein said first and second clutches are actuated by said first and second hydraulic servos, respectively, to drive said input shaft and one or more of said transmission elements,
   wherein said first and second clutches include: hubs connected to said input shaft through said first and second flange portions, respectively; rims, each rim being drivably connected to one of said transmission elements and arranged around an outer circumferential surface of one of said hubs, and a friction plate portion arranged between each rim and an associated hub,
   wherein the friction plate portion of at least one of said first and second clutches includes: a plurality of friction members having two opposing faces, to which friction facings are adhered; and a plurality of separator plates arranged axially alternating with said friction members,
   wherein said friction members have radially outer edges splined to an inner circumferential surface of one of said rims,
   wherein said separator plates have radially inner edges splined to an outer circumferential surface of one of said hubs,
   wherein at least one of said first and second hydraulic servos includes a thrust member splined to the outer circumferential surface of said one hub, between the first or second bearing of said hydraulic servo and the clutch corresponding to said one hydraulic servo, and
   wherein said thrust member and said flange portions are confronted by friction members of said friction plate portions.

31. A vehicular automatic transmission according to claim 1,
   additionally comprising a rotation sensor, and
   wherein said input shaft extends between said end walls, through said transmission mechanism,
   wherein said first and second clutches are actuated by said first and second hydraulic servos, respectively, to drive said input shaft and one or more of said transmission elements,
   wherein said first and second clutches include:
   first and second hubs connected to said input shaft;
   rims, each rim being drivably connected to one of said transmission elements and arranged around an outer circumferential surface of one of said hubs, and a friction plate portion arranged between each rim and an associated hub,
   wherein one of said first and second hydraulic servos includes a thrust member between the first or second bearing of said one hydraulic servo and the clutch corresponding to said hydraulic servo, and
   wherein said thrust member is axially slidably connected to said hub in a manner preventing relative rotation and includes a rotor portion having a circumferential portion with a plurality of notches extending to the radially outer side of said rim and confronting said rotation sensor.

32. A vehicular automatic transmission according to claim 1,
   wherein said first and second clutches are actuated by said first and second hydraulic servos, respectively, to drive said input shaft and one or more of said transmission elements,
   wherein said first and second clutches include: hubs connected to said input shaft through said first and second flange portions, respectively; rims, each rim being drivably connected to one of said transmission elements and arranged around an outer circumferential surface of one of said hubs, and a friction plate portion arranged between each rim and an associated hub,
   wherein said hubs each have an oil passage for providing communication between inner and outer circumferential surfaces of the hub to introduce lubricating oil from the inner circumferential surface to said friction plate portions.

33. A vehicular automatic transmission according to claim 1, further comprising:
   a counter shaft arranged in parallel with said output shaft and drivably connected to wheels of the vehicle;
   a counter drive gear connected integrally to said output shaft; and a counter driven gear meshing with said counter drive gear and integrally connected to said counter shaft,
   wherein said first and second clutches are actuated by said first and second hydraulic servos, respectively, to connect said input shaft and at least one of said transmission elements, and
   wherein said counter drive gear is interposed between said first and second clutches.

34. Vehicular automatic transmission according to claim 1,
   wherein said transmission mechanism comprises:
   a first planetary gear set including: a first ring gear; a first carrier rotatably supporting a first pinion gear meshing with said first ring gear; and a first sun gear meshing with said first pinion gear; and
   a second planetary gear set including: a second ring gear connected to said first carrier; a second carrier rotatably supporting a second pinion gear meshing with said second ring gear and connected to said first ring gear; and a second sun gear meshing with said second pinion gear,
   wherein said first ring gear and said second carrier are connected to said output shaft,
   wherein said first sun gear is selectively connected to said input shaft by said first clutch and braked on said case by a first brake,
   wherein said second sun gear is braked on said case by a second brake, and wherein said first carrier and said second ring gear are braked on said case by a third brake and selectively connected to said input shaft by said second clutch.

35. A vehicular automatic transmission according to claim 1, wherein said transmission mechanism comprises:

a first planetary gear set including: a first ring gear; a first carrier rotatably supporting a first pinion gear meshing with said first ring gear; and a first sun gear meshing with said first pinion gear; and a second planetary gear set including: a second ring gear; a second carrier rotatably supporting a second pinion gear meshing with said second ring gear and connected to said first ring gear; and a second sun gear meshing with said second pinion gear and connected to said first sun gear, wherein said first ring gear and said second carrier are connected to said output shaft, wherein said first sun gear and said second sun gear are connected to said input shaft by said first clutch and retained on said case by a first brake, wherein said second ring gear is braked on said case by a second brake, and wherein said first carrier is braked on said case by a third brake and selectively connected to said input shaft by said second clutch.

36. A vehicular automatic transmission according to claim 1, wherein said transmission mechanism comprises a planetary gear set including: a ring gear; a carrier rotatably supporting a first pinion gear meshing with said ring gear and a second pinion gear meshing with said first pinion gear; a first sun gear meshing with said first pinion gear; and a second sun gear meshing with said second pinion gear, wherein said carrier is connected to said output shaft, wherein said second sun gear is selectively connected to said input shaft by said first clutch and braked on said case by a first brake, wherein said first sun gear is braked on said case by a second brake, and wherein said ring gear is braked on said case by a third brake and selectively connected to said input shaft by said second clutch.

37. A vehicular automatic transmission according to claim 1, wherein said transmission mechanism comprises a planetary gear set including: a ring gear; a carrier rotatably supporting a first pinion gear meshing with said ring gear and a second pinion gear meshing with said first pinion gear; a first sun gear meshing with said first pinion gear; and a second sun gear meshing with said second pinion gear, wherein said ring gear is connected to said output shaft, wherein said first sun gear is connected to said input shaft by said first clutch and braked on said case by a first brake, wherein said second sun gear is braked on said case by a second brake, and wherein said carrier is braked on said case by a third brake and selectively connected to said input shaft by said second clutch.

38. A vehicular automatic transmission according to claim 1, wherein said transmission mechanism comprises:

a planetary gear set including: a first ring gear; a first carrier rotatably supporting a first pinion gear meshing with said first ring gear; a first sun gear meshing with said first pinion gear; a second ring gear connected to said first carrier; a second carrier rotatably supporting a second pinion gear meshing with said second ring gear and connected to said first ring gear; a second sun gear meshing with said second pinion gear; and a third sun gear meshing with a third pinion gear borne by said first carrier and which is connected to said first pinion gear in a manner prohibiting relative rotation therebetween and which has a smaller diameter than that of said first pinion gear, wherein said first ring gear and said second carrier are connected to said output shaft, wherein said first sun gear is selectively connected to said input shaft by said first clutch and braked on said case by a first brake, wherein said second sun gear is braked on said case by a second brake, wherein said first carrier and said second ring gear are braked on said case by a third brake and selectively connected to said input shaft by said second clutch, and wherein said third sun gear is braked on said case by a fourth brake.

* * * * *